(12) United States Patent
Hull et al.

(10) Patent No.: US 7,215,436 B2
(45) Date of Patent: May 8, 2007

(54) DEVICE FOR GENERATING A MULTIMEDIA PAPER DOCUMENT

(75) Inventors: Jonathan J. Hull, San Carlos, CA (US); Jamey Graham, San Jose, CA (US); Peter E. Hart, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 817 days.

(21) Appl. No.: 10/175,540

(22) Filed: Jun. 18, 2002

(65) Prior Publication Data

US 2005/0216919 A1    Sep. 29, 2005

Related U.S. Application Data

(63) Continuation-in-part of application No. 10/001,895, filed on Nov. 19, 2001, which is a continuation-in-part of application No. 09/149,921, filed on Sep. 9, 1998, now Pat. No. 6,369,811.

(51) Int. Cl.
*G06F 15/00* (2006.01)
(52) U.S. Cl. .................... 358/1.15; 358/1.15; 715/512
(58) Field of Classification Search ............... 358/1.15, 358/1.16, 453; 715/500, 526, 512, 527, 517; 714/752; 705/39, 77; 340/531, 530.2; 709/203, 709/200
See application file for complete search history.

(56) References Cited

U.S. PATENT DOCUMENTS

| | | | |
|---|---|---|---|
| 4,417,239 A | 11/1983 | Demke et al. | |
| 4,481,412 A | 11/1984 | Fields | |
| 4,823,303 A | 4/1989 | Terasawa | |
| 5,153,831 A | 10/1992 | Yianilos | |
| 5,250,787 A | 10/1993 | Arii et al. | |
| 5,258,880 A | * 11/1993 | Takahashi | ..................... 386/95 |
| 5,309,359 A | 5/1994 | Katz et al. | |
| 5,349,658 A | 9/1994 | O'Rourke et al. | |
| 5,382,776 A | 1/1995 | Arii et al. | |
| 5,384,703 A | 1/1995 | Withgott et al. | |
| 5,404,295 A | 4/1995 | Katz et al. | |
| 5,418,948 A | 5/1995 | Turtle | |

(Continued)

FOREIGN PATENT DOCUMENTS

EP    248 403 A2    12/1987

(Continued)

OTHER PUBLICATIONS

"About Tehus investors glossary," pp. 1-7 downloader from http://about.telus.com/investors/glossary.html on Apr. 14, 2005.

(Continued)

*Primary Examiner*—King Y. Poon
*Assistant Examiner*—Saeid Ebrahimi
(74) *Attorney, Agent, or Firm*—Townsend and Townsend and Crew LLP

(57) ABSTRACT

Techniques for generating a printable representation of multimedia information that can be printed on a paper medium to provide a paper-based interface for the multimedia information. An output device is configured to print the printable representation of multimedia information on a paper medium to generate a multimedia paper document. The multimedia information for which the multimedia paper document is generated in stored on the output device.

48 Claims, 38 Drawing Sheets

U.S. PATENT DOCUMENTS

| | | |
|---|---|---|
| 5,442,795 A | 8/1995 | Levine et al. |
| 5,467,288 A | 11/1995 | Fasciano et al. |
| 5,479,600 A | 12/1995 | Wroblewski et al. |
| 5,481,666 A | 1/1996 | Nguyen et al. |
| 5,485,554 A | 1/1996 | Lowitz et al. |
| 5,596,700 A | 1/1997 | Darnell et al. |
| 5,600,775 A | 2/1997 | King et al. |
| 5,638,543 A | 6/1997 | Pedersen et al. |
| 5,675,752 A | 10/1997 | Scott et al. |
| 5,680,636 A | 10/1997 | Levine et al. |
| 5,694,559 A | 12/1997 | Hobsen et al. |
| 5,706,097 A * | 1/1998 | Schelling et al. ............ 358/296 |
| 5,721,897 A | 2/1998 | Rubinstein |
| 5,737,599 A | 4/1998 | Rowe et al. |
| 5,745,756 A | 4/1998 | Henley |
| 5,748,805 A | 5/1998 | Withgott et al. |
| 5,751,283 A | 5/1998 | Smith |
| 5,758,037 A | 5/1998 | Schroeder |
| 5,761,655 A | 6/1998 | Hoffman |
| 5,778,397 A | 7/1998 | Kupiec et al. |
| 5,781,785 A | 7/1998 | Rowe et al. |
| 5,784,616 A | 7/1998 | Horvitz |
| 5,790,114 A | 8/1998 | Geaghan et al. |
| 5,809,318 A | 9/1998 | Rivette et al. |
| 5,819,301 A | 10/1998 | Rowe et al. |
| 5,832,474 A | 11/1998 | Lopresti et al. |
| 5,838,317 A | 11/1998 | Bolnick et al. |
| 5,857,185 A | 1/1999 | Yamamura |
| 5,860,074 A | 1/1999 | Rowe et al. |
| 5,870,770 A | 2/1999 | Wolfe |
| 5,873,107 A | 2/1999 | Borovoy et al. |
| 5,892,536 A | 4/1999 | Logan et al. |
| 5,894,333 A | 4/1999 | Kanda et al. |
| 5,895,476 A | 4/1999 | Orr et al. |
| 5,898,166 A | 4/1999 | Fukuda et al. |
| 5,898,709 A | 4/1999 | Imade et al. |
| 5,933,829 A | 8/1999 | Durst et al. |
| 5,933,841 A | 8/1999 | Schumacher et al. |
| 5,943,679 A | 8/1999 | Niles et al. |
| 5,946,678 A | 8/1999 | Aalbersberg |
| 5,950,187 A | 9/1999 | Tsuda |
| 5,978,773 A | 11/1999 | Hudetz et al. |
| 5,986,692 A | 11/1999 | Logan et al. |
| 5,987,454 A | 11/1999 | Hobbs |
| 5,999,173 A | 12/1999 | Ubillos |
| 6,005,562 A | 12/1999 | Shiga et al. |
| 6,006,218 A | 12/1999 | Breese et al. |
| 6,021,403 A | 2/2000 | Horvitz et al. |
| 6,026,409 A | 2/2000 | Blumenthal |
| 6,028,601 A | 2/2000 | Machiraju et al. |
| 6,055,542 A | 4/2000 | Nielsen et al. |
| 6,061,758 A | 5/2000 | Reber et al. |
| 6,094,648 A | 7/2000 | Aalbersberg |
| RE36,801 E | 8/2000 | Logan et al. |
| 6,098,082 A | 8/2000 | Gibbon et al. |
| 6,101,503 A | 8/2000 | Cooper et al. |
| 6,108,656 A | 8/2000 | Durst et al. |
| 6,125,229 A | 9/2000 | Dimitrova et al. |
| 6,151,059 A | 11/2000 | Schein et al. |
| 6,160,633 A | 12/2000 | Mori |
| 6,182,090 B1 | 1/2001 | Peairs |
| 6,199,048 B1 | 3/2001 | Hudetz et al. |
| 6,211,869 B1 | 4/2001 | Loveman et al. |
| 6,262,724 B1 | 7/2001 | Crow et al. |
| 6,369,811 B1 | 4/2002 | Graham et al. |
| 6,421,067 B1 | 7/2002 | Kamen et al. |
| 6,430,554 B1 | 8/2002 | Rothschild |
| 6,434,561 B1 | 8/2002 | Durst, Jr. et al. |
| 6,505,153 B1 | 1/2003 | Van Thong et al. |
| 6,518,986 B1 | 2/2003 | Mugura |
| 6,542,933 B1 | 4/2003 | Durst, Jr. et al. |
| 6,546,385 B1 | 4/2003 | Mao et al. |
| 6,567,980 B1 | 5/2003 | Jain et al. |
| 6,596,031 B1 | 7/2003 | Parks |
| 6,608,563 B2 | 8/2003 | Weston et al. |
| 6,623,528 B1 | 9/2003 | Squilla et al. |
| 6,636,869 B1 | 10/2003 | Reber et al. |
| 6,647,535 B1 | 11/2003 | Bozdagi et al. |
| 6,651,053 B1 | 11/2003 | Rothschild |
| 6,675,165 B1 | 1/2004 | Rothschild |
| 6,684,368 B1 | 1/2004 | Hull et al. |
| 6,745,234 B1 | 6/2004 | Philyaw et al. |
| 6,760,541 B1 | 7/2004 | Ohba |
| 6,766,363 B1 | 7/2004 | Rothschild |
| 6,781,609 B1 | 8/2004 | Barker et al. |
| 6,865,608 B2 | 3/2005 | Hunter |
| 6,865,714 B1 | 3/2005 | Liu et al. |
| 6,993,573 B2 | 1/2006 | Hunter |
| 2001/0005203 A1 | 6/2001 | Wiernik |
| 2001/0013041 A1 | 8/2001 | Beck et al. |
| 2001/0044810 A1 | 11/2001 | Timmons |
| 2002/0036800 A1 | 3/2002 | Nozaki |
| 2002/0047870 A1 | 4/2002 | Carro |
| 2002/0059342 A1 | 5/2002 | Gupta et al. |
| 2002/0070982 A1 | 6/2002 | Hill et al. |
| 2002/0095460 A1 | 7/2002 | Benson |
| 2002/0099452 A1 | 7/2002 | Kawai |
| 2002/0116575 A1 | 8/2002 | Toyomura et al. |
| 2002/0135808 A1 | 9/2002 | Parry |
| 2002/0199149 A1 * | 12/2002 | Nagasaki et al. ............ 714/752 |
| 2003/0052897 A1 | 3/2003 | Lin |
| 2003/0065665 A1 | 4/2003 | Kinjo |
| 2003/0156589 A1 | 8/2003 | Suetsugu |
| 2004/0006577 A1 | 1/2004 | Rix |
| 2004/0008209 A1 | 1/2004 | Adams et al. |
| 2004/0015524 A1 | 1/2004 | Chalstrom et al. |
| 2004/0037540 A1 | 2/2004 | Frohlich et al. |
| 2004/0064338 A1 | 4/2004 | Shiota et al. |
| 2004/0064339 A1 | 4/2004 | Shiota et al. |
| 2004/0071441 A1 | 4/2004 | Foreman et al. |
| 2004/0100506 A1 | 5/2004 | Shiota et al. |
| 2004/0181747 A1 | 9/2004 | Hull et al. |
| 2004/0181815 A1 | 9/2004 | Hull et al. |
| 2004/0247298 A1 | 12/2004 | Ohba |

FOREIGN PATENT DOCUMENTS

| | | |
|---|---|---|
| EP | 378 848 A2 | 7/1990 |
| EP | 737 927 A2 | 10/1996 |
| EP | 459 174 B1 | 11/1996 |
| EP | 762 297 A2 | 3/1997 |
| EP | 788 063 A2 | 6/1997 |
| EP | 788 064 A2 | 6/1997 |
| EP | 802 492 A1 | 10/1997 |
| GB | 2 137 788 A | 10/1984 |
| GB | 2 156 118 A | 10/1985 |
| GB | 2 234 609 A | 2/1991 |
| GB | 2 290 898 A | 1/1996 |
| JP | 04-021165 A | 1/1992 |
| JP | 8-297677 A | 11/1996 |

OTHER PUBLICATIONS

Choi et al, "An Integrated Data Model and a Query Language for Content-Based Retrieval of Video," *MIS '98 INCS 1508*, Springer Verlag Berlin Heidelberg, pp. 192-198 (1998).

"Computer Terms", pp. 1-8 downloaded from http:www.park-meadow.org/computer_terms.htm on Apr. 14, 2005.

"Glossary for computer hardware and micro scope," p. 1-11 downloaded from http://www.mumbeicyber.com/glossary_com_hardware_micro.asp on Apr. 14, 2005.

"Glossary: What Does It Mean?," pp. 1-3 downloaded from http://www.fairfield.k12.ct.us/fairfieldhs/cfairfieldhs03/glossary.htm on Apr. 14, 2005.

"IT&T Talk", pp. 1-4 dopwnloaded from http://www.iib.qld.gov.an/itcareers/talk.asp on Apr. 14, 2005.

"Multimedia" pp. 1-2 downloaded from http://en.wikipedia.org/wiki/Multimedia on Apr. 14, 2005.

Ohmori, Y., "A Tool for Programmable Access to Organized Multimedia Data—Enhanced Multimedia Recorder (EMMR)," *Joho Shori Gakkai Kenkyu Hokoku*, 98(35[HI-78]):39-44 (1998).

Phillips, R. L., "MediaView: A General Multimedia Digital Publication System," *Communications of the ACM*, 34(7):75-83 (1991).

Rochelle et al., "VideoNoter: A productivity too for video data analysis," *Behavior Research Methods, Instruments & Commuters*, 23(2):219-224 (1991).

Saur et al., "Automated Analysis and Annotation of Basketball Video," *SPIE*, 3022:176-187 (1997).

Web pages from PaperClick.com printed from http://www.paperclip.com on Jun. 14, 2006.

Product Brochure, Shutterfly, downloaded from http://www.shutterfly.com on Mar. 15, 2005 (10 pages).

Product Brochure, YesVideo, downloaded from http://www.yesvideo.com/code on Mar. 15, 2005 (20 pages).

U.S. Appl. No. 10/001,895, filed Nov. 19, 2001.

U.S. Appl. No. 10/645,821, filed Aug. 20, 2003.

U.S. Appl. No. 10/001,894, filed Nov. 19, 2001.

U.S. Appl. No. 10/001,849, filed Nov. 19, 2001.

U.S. Appl. No. 10/001,891, filed Nov. 19, 2001.

U.S. Appl. No. 10/001,893, filed Nov. 19, 2001.

U.S. Appl. No. 11/021,303, filed Dec. 23, 2004.

U.S. Appl. No. 11/054,122, filed Feb. 8, 2005.

"c:\...\9149920c.wpd—unmodified" Screen Shots of document created in Corel WordPerfect, 4 pages, (Apr. 30, 2002).

"Flexible JAMM Screenshots," downloaded from internet site http://simon.cs.ct.edu/-jamm May 4, 2000.

Begole et al., "Flexible Collaboration Transparency," doc. ID: ncstrl.vatech_cs/TR-98-11, Virginia Polytechnic Institute and State University (1998).

Begole et al., "Supporting Worker Independence in Collaboration Transparency," doc. ID: ncstrl.vatech_cs/TR-98-12, Virginia Polytechnic Institute and State University (1998).

Byrd, D., "A Scrollbar-based Visualization for Document Navigation," doc. ID: xxx.cs.IR/9902028, Computing Research Repository: Information Retrieval (1999).

Drucker et al. "SmartSkip: Consumer Level Browsing and Skipping of Digital Video Content," Paper: Technology to Help People Find Information, vol. No. 4, Issue No. 1, pp. 219-226, Minneapolis, Minnesota, USA, (Apr. 20-25, 2002).

"Fujitsu Markets Facsimile Connection System for Computer I/O," *Comline Telecommunications*, Nov. 1989, p. 5.

Grunin, L., "Action," *PC Magazine*, 12(15):240 (1993).

"Hang on—Blue Sky's WinHelp is on the way," *PC Week*, p. 59, Jul. 1995.

IBM Technical Disclosure Bulletin, "Quick Selection of Window Environment Coordinates," 35:57-60, ISS #4B, (1992).

"IBM, Partners Team On Web-Based Image Search, Printing Sep. 29, 1995," Newsbytes News Network, Sep. 1995.

Identitech, "Identitech announces FYI 2.5.2 release with NT object server, SmartForm, and ODBC," Business Editors, Jul. 1996.

"IDENTITECH UNYSIS: Unysis wins Florida Housing Finance Agency Contract; Identitech provides workflow software solution," Business Editors/Computer Writer, Jun. 1995.

Lam et al. "Automatic document classification based on probabilistic reasoning: model and performance analysis," *IEEE*, 3:2719-2723 (1997).

Lison et al., "Sight and Sound," *Unix Review*, 7(10):76-86 (1989).

Okada et al., "Development of Application Programs for Distributed Processing Equipment," *Review of the Electrical Communication Laboratories*, 34(4):465-471 (1986).

"SPRY Inc.'s Internet Front End Picked for PSI Cable Internet Service," *Information & Interactive Services Report*, 15(7), (1994).

Strautner, A., "HP poineers I-TV peripheral market," *Computer Shopper*, 14(2):71 (1994).

Sodergard et al., "Integrated multimedia publishing—combining TV and newspaper content on personal channels," downloaded from http:www8.org/w8-papers/1b-multimedia/integrated/integrated.html on Apr. 4, 2002, pp. 1-22.

Van Horn-Christopher, "Have you talked to your computer today?," *Business Forum*, 19(3):10-11 (1994).

"VNR firm offers Storyboards" PR News, Dec. 4, 1995, downloaded from http://proquest.umi.com/pqdlink?index=20&did=000000010830394&SrchMode=3&sid=1&F on Aug. 9, 2004.

"WC3 issues first public draft of Synchronized Multimedia Integration Language (SMIL)," *Information Today*, 15(2):27, 30 (1998).

Acrobat Reader Version 2.0 (software application), Adobe Systems Incorporated, screenshots Figures 1-10 (1994).

Adobe Premiere (video editing software) from Http://www.adobe.com (2002).

Adobe Acrobat Reader 3.0 screen dumps (fig. 1-3), (1996).

Adobe Systems, Inc., "Adobe Photoshop 4.0 User Guide for Macintosh and Windows," pp. 30-31 (1996).

Apple Macintosh system 7 refrence manual, pp. 30-31 (1991).

Ball et al. "Software Visualization in the Large", IEEE Computer, 29: 33:43 (1996).

Bobick et al. "A State Based Approach to the Representation and Recognition of Gesture," IEEE Trans. on Pattern Analysis and Machine Intelligence, pp. 1325-1337 (1997).

Boguraev et al. "Salience-Based Content Characterisation of Text Documents," *Proceedings of the ACL/EACL Workshop on Intellegent [Sic] Scalable Text Summarization*, 1997. Topic identification, Discourse-based summarization. pp. 1-12 (1997).

Boreczky, J. et al. "An Interactive Comic Book Presentation for Exploring Video," Conference on Human factors in Computing Systems (CHI 2000), ACM Press, pp. 185-192, 2000.

Boykin et al., "Improving Broadcast News Segmentation Processing," IEEE Multimedia '99 (1999).

Boykin et al., "Machine learning of Event Segmentation for News on Demand," Communications of the ACM, 43:35-41 (2000).

Brandow et al. "Automatic Condensation of Electronic Publications by Sentence Selection," *Information Processing and Management*, 31(5):675-685 (1995).

Brown et al. "Automatic Content-Based Retrieval of Broadcast News," ACM Multimedia 5, San Francisco, CA (1995).

CAJ et al. "Integrated Multimedia Publishing—Combining TV and Newspaper Content on Personal Channels," WWW8 Conference, 1999.

Chen et al. "Emotion Recognition from Audiovisual Information," Proc. IEEE Workshop on Multimedia Signal Processing, Los Angeles, CA, USA, pp. 83-88 (1998).

Chen et al. "ViBE: A Video Indexing and Browsing Environment," Proceedings of the SPIE Conference on Multimedia Storage and Archiving Systems Sep. 20-22, 1999, Boston 3846:148-164 (1999).

Chiu et al. "NoteLook: Taking Notes in Meetings with Digital Video and Ink," ACM Multimedia 99 Orlando, (1999).

Chiu et al. "Automatically linking multimedia meeting documents by image matching," Proceedings of Hypertext '00. ACM, New York, pp. 244-245 (2000).

Christel et al. "Evolving Video Skims into Useful Multimedia Abstractions," Proceedings of the CHI '98 Conference on Human Factors in Computing Systems (Los Angeles, CA, Apr. 1998), pp. 171-178 (1998).

Christel et al. "Information Visualization within a Digital Video Library," Journal of Intelligent Information Systems 11:35-257 (1998).

Dellaert et al. "Recognizing emotion in speech," Proceedings ICSLP 96. Fourth International Conference on Spoken Language Processing New York (Cat. No. 96TH8206). IEEE. vol. 1970-1973 (1996).

Dimitrova et al. "Video Keyframe Extraction and Filtering: A Keyframe is not a Keyframe to Everyone," CIKM 1997:113-120 (1997).

Doermann et al. "Applying Algebraic and differential invarients for logo recognition," Machine Vision and Applications 9:73-86 (1996).

Donato et al. "Classifying Facial Actions", IEEE Trans. on Pattern Analysis and Machine Intelligence, 21:974-989 (1999).

Essa et al. Coding Analysis Interpretation and Recognition of Facial Expressions, IEEE Trans. on Pattern Analysis and Machine Intelligence, 19:757-763 (1997).

Face recognition techniques described at web site http://www.visionics.com (2002).

Foote, Jonathan, et al. "An Intelligent Media Browser using Automatic Multimode Analysis," ACM Multimedia 8, Bristol, UK (1998).

Furui et al. "Japanese Broadcast News Transcription and Information Extraction," Communications of the ACM, 43(2):71-73, Feb. 2000.

Gauvain et al. "Transcribing Broadcast News for Audio and Video Indexing," Communications of the ACM, 43:64-70 (2000).

Gibbon "Generating Hypermedia Documents from Transcriptions of Television Programs Using Parallel Text Alignment," *Handbook of Internet and Multimedia Systems and Applications*, David C. Gibbon; CRC Press, (1998).

Gliedman "Virtual Office Managers," Computer Shopper, 18:290 (1998).

Gordon "Using annotated video as an information retrieval interface," ACM Proceedings of the 5th international Conference on Intelligent User Interfaces New Orleans pp. 133-140 (2000).

Greenberg et al., "Sharing fisheye views in relaxed-WYSIWIS groupware applications," *Proceedings of Graphics Interface*, Toronto, Canada, May 22-24, 1995, Distributed by Morgan-Kaufmann, pp. 28-38, http://www.cpsc.ucalgary.ca/grouplab/papers/1996/96-Fisheye.GI/gi96 fisheye.html.

Hauptmann et al. "Text, speech and vision for video segmentation: the informedia project," Proc. AAAI Fall Symp. Computational Models for Integrating Language and Vision, Boston, MA, Nov. 10-12, 1995.

Hauptmann et al. "Story Segmentation and Detection of Commercials in Broadcast News Video," Advances in Digital Libraries Conference, Santa Barbara, CA, Apr. 22-23, 1998.

HE et al. "Comparing Presentation Summaries: Slides vs. Reading vs. Listening," Conference on Human factors in Computing Systems (CHI 2000), Apr. 1-6, 2000.

Hearts et al. "TileBars: Visualization of Term Distribution Information in Full Text Information Access," *Proceedings of the ACM SIGCHI Conference on Human Factors in Computing Systems (CHI)*, Denver, CO., May 1995, pp. 1-8, http://www.acm.org/sigchi/chi95/Electronic/documents/papers/mah bdy.htm.

Hecht "Embedded data glyph Technology for Hardcopy Digital Documents," Proc. SPIE 2171:341-352 (1994).

HECHT "Printed Embedded Data Graphical User Interfaces," IEEE Computer, Mar. 2001.

Hill et al. "Edit Wear and Read Wear", ACM, pp. 3-9 (May 3-7, 1992).

Hu et al. "Multimedia Description Framework (MDF) for content descriptions of Audio/Video Documents," Fourth ACM Conference on Digital Libraries (DL '99) Aug. 11-14,1999.

Ioffe et al. "Finding people by sampling," Proc. International Conference on Computer Vision, pp. 1092-1097 (1999).

Jin et al. "Topic Tracking for Radio, TV Broadcast, and Newswire," Proceedings of the DARPA Broadcast News Workshop, Feb. 28-Mar. 3, 1999, Herndon, VA.

Komlodi et al. "Key Frame Preview Techniques for Video Browsing," (Proceedings of the 3rd ACM International Conference on Digital Libraries, Jun. 23-26, 1998, Pittsburgh, pp. 118-125 (1998).

Langley "An Analysis of Bayesian Classifiers," Proceedings of the Tenth National Conference on Artificial Intelligence, pp. 223-228, 1992.

Langley "Induction of Selective Bayesian Classifiers," Proceedings of the Tenth National Conference on Uncertainty in Artificial Intelligence, pp. 400-406, (1994).

Li et al. "Automatic Text Detection and Tracking in Digital Video," IEEE Transactions on Image Processing—Special Issue on Image and Video Processing for Digital Libraries, 9:147-156 (2000).

Li et al. "Text Extraction and Recognition in Digital Video," Proceedings of Third IAPR Workshop on Document Analysis Systems, pp. 119-128, 1998.

Li et al. "Vision: a digital video library," Proceedings of the 1st ACM International Conference on Digital Libraries, pp. 19-27, 1996.

Liang et al. Practical video indexing and retrieval system SPIE 3240:294-303, (1988).

Lienhart et al. "On the Detection and Recognition of Television Commercials," Proc. IEEE Conf. on Multimedia Computing and Systems, Ottawa, Canada, pp. 509-516, Jun. 1997.

Ma et al. "An Indexing and Browsing System For Home Video," Invited paper, EUSIPCO '2000, 10th European Signal Processing Conference, Sep. 5-8, 2000, Tampere, Finland.

Manber "The Use of Customized Emphasis in Text Visualization," *Proceedings of 1997 IEEE Conf. on Information Visualization*, pp. 132-138, (1997).

Maybury "News on Demand," Communications of the ACM, 43:33-34 (2000).

Maybury et al. "Segmentation, Content Extraction and Visualization of Broadcast News Video Using Multistream Analysis," AAAI Paper (1997).

Maybury et al. "Multimedia Summaries of Broadcast News," International Conference on Intelligent Information Systems pp. 447-449 (1997).

Maybury et al. "Multimedia Summaries of Broadcast News," International Conference on Intelligent Information Systems, Dec. 8-10, 1997.

Merialdo et al. "Automatic Construction of Personalized TV News Programs," Seventh ACM International Multimedia Conference, Orlando Nov. 1999.

Merlino et al. "Broadcast News Navigation using Story Segmentation," Advanced Information Systems Center, The MITRE Corporation (1997).

Merlino et al. "Broadcast News Processing Techniques," MITRE Technical Report, MTR 99B0000031, Apr. 1999.

Mohan "Text-based search of TV news stories," Proc. SPIE 2916:2-13 (1996 ).

Myers et al. "Multi-View Intelligent Editor for Digital Video Libraries," First ACM and IEEE Joint Conference on Digital Libraries, Jun. 24-28, 2001, Roanoke, VA, pp. 106-115.

OH et al. "Efficient and Cost-effective Techniques for Browsing and Indexing Large Video Databases," SIGMOD Conference 2000: 415-426.

Photina et al. "Improving acoustic models with captioned multimedia speech," Proceedings IEEE International Conference on Multimedia Computing and Systems, 2:767-71 (1999).

Rowley et al. "Neural network-based face detection," IEEE Transactions on Pattern Analysis and Machine Intelligence, 20:23-38 (1998).

Schweighofer et al. "The Automatic Generation of Hypertext Links in Legal Documents," *Lecture Notes in Computer* Science, vol. 1134, Wagner et al., eds., from 7th Int. Conf., DEXA 96', held Sep. 1996 in Zurich, Switzerland (1996).

Shahraray et al. "Automated Authoring of Hypermedia Documents of Video Programs," *ACM Multimedia 95*, Nov. 5-9, 1995, San Francisco, CA (1995).

Shahraray et al. "Automatic generation of pictorial transcripts of video programs," Proceedings of the SPIE- Int. Soc. Opt. Eng. 2417:512-518 (1995).

Shahraray et al. "Pictorial transcripts: multimedia processing applied to digital library creation," 1997 IEEE First Workshop on Multimedia Signal Processing pp. 581-586 (1997).

Smith et al. "Video Skimming and Characterization through the Combination of Image and Language Understanding," Computer Vision and Pattern Recognition IEEE 1997.

Sonmez et al. "Multiple speaker tracking and detection: handset normailzation and duration scoring," Digital Signal Processing 10:133-143 (2000).

Suda et al. "Logo and word matching using a general approach to signal registration," Fourth International Conference on Document Analysis and Recognition, Ulm, Germany, Aug. 18-20, 1997, pp. 61-65.

Sumita et al. "Document Structure Extraction for Interactive Document Retrieval Systems," *Proceedings of SIGDOC 93*, pp. 301-310, (1993).

Taghva et al. "An Evolution of an Automatic Markup System," SPIE, 2422:317-327 (1995).

Taxt "Segmentation of Document Images," IEEE 11:1322-1329 (1989).

Tennenhouse et al. "A software-oriented approach to the design of media processing environments," Proceedings of the IEEE International Conference on Multimedia Computing and Systems, pp. 435-444 (1994).

Tonomura et al. "VideoMAP and VideoSpaceIcon : tools for anatomizing video content," Proc: INTERCHI '93 ACM pp. 131-136 (1993).

Uchihashi et al. "Summarizing Video Using a Shot Importance Measure and a Frame-Packing Algorithm," Proceedings of the International Conference on Acoustics, Speech, and Signal Processing (Phoenix, AZ) 6:3041-3044 (1999).

Uchihashi et al. "Video Manga: Generating Semantically Meaningful Video Summaries," *ACM Multimedia 99*, Orlando, Florida, Oct. 30-Nov. 5, 1999.

Video content management and publishing software from Virage http://www.virage.com (2002).

"Video Mail Retrieval Using Voice" Cambridge University Engineering Department Computer Laboratory and Olivetti Research Laboratory summary of research found at http://svr-www.eng.cam.ac.uk/research/projects/vmr/ (1997).

Wactlar et al. "Complementary Video and Audio Analysis for Broadcast News Archives," Communications of the ACM, 43:42-47 (2000).

Wactler et al. "Intelligent access to digital video: Informedia project," Computer 29:46-52 (1996).

Weiss et al. "Composition and Search with a Video Algebra," IEEE Multimedia 2:12-25 (1995).

Wittenburg et al. "Browsing with Dynamic Key Frame Collages in Web-Based Entertainment Video Services," In Proceedings of IEEE International Conference on Multimedia Computing and Systems, Jun. 7-11, 1999, Florence, Italy 2:913-918 (1999).

Zhang et al. "Detection of text Captions in Compressed domain Video," International Multimedia Conference Proceedings of the 2000 ACM workshops on Multimedia 2000 , Los Angeles, California, United States pp. 201-204.

\* cited by examiner

```
<TEMPLATE>
<ID>   3267   </ID>
<PAPER_SIZE>    letter  </PAPER_SIZE>
<PAPER_COLOR>   white   </PAPER_COLOR>
<PAPER_WEIGHT> 24 lb    </PAPER_WEIGHT>

<TITLE_ZONES>   1        </TITLE_ZONES>
<TEXT_ZONES>    2        </TEXT_ZONES>
<VIDEO_ZONES>   1        </VIDEO_ZONES>

<TITLE_ZONE>
<ZONE_ID>     0          </ZONE_ID>
<LEFT_MARGIN>    3.0     </LEFT_MARGIN>
<RIGHT_MARGIN>   3.0     </RIGHT_MARGIN>
<TOP_MARGIN>     0.75    </RIGHT_MARGIN>
<BOTTOM_MARGIN>  9.6     </BOTTOM_MARGIN>
<LANGUAGE>       English </LANGUGE>
<SOURCE>         header  </SOURCE>
<FONT>
    <NAME>         Times
    </NAME>
    <POINT_SIZE>   14       </POINT_SIZE>
    <COLOR>        black    </COLOR>
    <LINE_SPACE>   1        </LINE_SPACE>
    <LINE_LAYOUT>  center   </LINE_LAYOUT>
</FONT>
</TITLE_ZONE>

<TEXT_ZONE>
<ZONE_ID>        1         </ZONE_ID>
<LEFT_MARGIN>    1.1       </LEFT_MARGIN>
<RIGHT_MARGIN>   5.4       </RIGHT_MARGIN>
<TOP_MARGIN>     1.5       </RIGHT_MARGIN>
<BOTTOM_MARGIN>  1.0       </BOTTOM_MARGIN>
<LANGUAGE>       English   </LANGUGE>
<SOURCE>         Ccaption  </SOURCE>
<FONT>
    <NAME>         Garamond
    </NAME>
    <POINT_SIZE>   10       </POINT_SIZE>
    <COLOR>        black    </COLOR>
    <LINE_SPACE>   1        </LINE_SPACE>
</FONT>

<SUBJECT_CHANGE>
    <LINE_SKIP>    1.5      </LINE_SKIP>
    <EMPHASIS>     bold 3   </EMPHASIS>
</SUBJECT_CHANGE>
<SPEAKER_CHANGE>
    <LINE_SKIP>    1.0      </LINE_SKIP>
    <EMPHASIS>     none     </EMPHASIS>
</SPEAKER_CHANGE>
<ANNOTATIONS>
    <STYLE>        italic     </STYLE>
    <METHOD>       underline  </METHOD>
    <COLOR>        blue       </COLOR>
    <WEIGHT>       3          </WEIGHT>
</ANNOTATIONS>
</TEXT_ZONE>

<TEXT_ZONE>
<ZONE_ID>        2         </ZONE_ID>
<LEFT_MARGIN>    4.6       </LEFT_MARGIN>
<RIGHT_MARGIN>   1.9       </RIGHT_MARGIN>
<TOP_MARGIN>     1.5       </RIGHT_MARGIN>
<BOTTOM_MARGIN>  1.0       </BOTTOM_MARGIN>
<LANGUAGE>       Japanese  </LANGUGE>
<SOURCE>
    <NAME>         translation
    </NAME>
</SOURCE>
```

FIG. 5A

```
<CORRESPONDING_ZONE> 1
</CORRESPONDING_ZONE>
<FONT>
        <NAME>          AsianGaramond
        </NAME>
        <POINT_SIZE>    10         </POINT_SIZE>
        <COLOR>         black      </COLOR>
        <LINE_SPACE>    1          </LINE_SPACE>
</FONT>

<SUBJECT_CHANGE>
        <LINE_SKIP>     1.5        </LINE_SKIP>
        <EMPHASIS>      bold 3     </EMPHASIS>
</SUBJECT_CHANGE>
<SPEAKER_CHANGE>
        <LINE_SKIP>     1.0        </LINE_SKIP>
        <EMPHASIS>      none       </EMPHASIS>
</SPEAKER_CHANGE>
<ANNOTATIONS>
        <STYLE>         italic     </STYLE>
        <METHOD>        underline  </METHOD>
        <COLOR>         blue       </COLOR>
        <WEIGHT>        3          </WEIGHT>
</ANNOTATIONS>
</TEXT_ZONE>

<VIDEO_ZONE>
<ZONE_ID>           3          </ZONE_ID>
<LEFT_MARGIN>       3.2        </LEFT_MARGIN>
<RIGHT_MARGIN>      4.5        </RIGHT_MARGIN>
<TOP_MARGIN>        1.5        </RIGHT_MARGIN>
<BOTTOM_MARGIN>     1.0        </BOTTOM_MARGIN>
<LANGUAGE>          English </LANGUGE>

<SOURCE>
        <NAME>          keyframes
        </NAME>
        <METHOD>        time       </METHOD>
        <SAMPLING_RATE> 1          </SAMPLING_RATE>
        <ANNOTATION>
                <TYPE>          text
                </TYPE>
                <METHOD>        box        </METHOD>
                <COLOR>         red        </COLOR>
                <WEIGHT>        3          </WEIGHT>
        </ANNOTATION>
</SOURCE>

<FRAME_SET>
<WIDTH>         0.4        </WIDTH>
<HEIGHT>        0.3        </HEIGHT>
<LAYOUT>        packed     </LAYOUT>
<GROUPING>
        <SIZE>          4          </SIZE>
        <ANNOTATION>
                <TYPE>          bar code
                </TYPE>
                <PLACEMENT> under        </PLACEMENT>
                <STYLE>     interleaved 2 of 5 </STYLE>
                <WIDTH>     0.8          </WIDTH>
                <HEIGHT>    0.15         </HEIGHT>
        </ANNOTATION>
</GROUPING>
</FRAME_SET>

</VIDEO_ZONE>

</TEMPLATE>
```

900 the majority of people here who are negative
36% of sexually active adults are H I V -positive
I or the population as a whole, the number is
about 20%
  We want to keep the 80% of the general
population who's H I V-negative, we want to
keep them that way The key is knowing your
status
  Reporter: to that end, rapid testing centers like
this one are being set up around the country
Young health workers are also going out into the
country to urge people to get tested under a
program called "total community mobilization "
The goal is to reach every household in
Botswana. The man who was the main target of
this visit had already been tested. He politely
answered questions about whether he
understands the dangers of aids, and then left to
take his cattle to water He told us he knows aids
kills, and is using a condom when he has sex,
but his friends aren't.
  Reporter: the government is also actively
working to stop the transmission of the virus
from mother to child, which happens in the
uterus, at birth, or while nursing
  Well, approximately 60,000 deliveries occur
each year Of those, 40% of those women are
H I V-positive, so we have 24,000 H I V-
positive women delivering a baby each year The
risk of transmission from mother to baby is
around 40%, so that gives us 9,600 babies who
are born each year with H.I.V infection
  Reporter: the main public hospital in
Francistown has been providing an anti-
transmission drug-- retrovir or A.Z.T -- As part
of a pilot program for the past two years.
Botswana got the drug cheaply with help from
the manufacturer, Glaxo Smith Kline, and
UNICEF. Loeto Mazhani is the doctor in charge
of the Natialal mother- to-child program. So
when is your plan to have it available to mothers
through the whole country?
  We are working on a target of december 2001,
and so far, we have covered seven districts out
of 24 health districts, so we still have a long way
to go.
  Reporter: he said they also have a long way to
go in getting women to agree to be tested. Did
you decide to get tested for H.I.V/AIDS?
  No, I didn't.
  Reporter: why not?
  I don't want to frustrate myself.

Reporter: you'd rather not know?
  Yes.
  Reporter: why?
  If I know. I can kill myself, so I don't want to
know
  Reporter: so even though it's possible that by
not knowing, you're transmitting it to the baby,
you still don't want to know?

No, I don't want
  Reporter: nearly all the women in the pre-
natal ward-- who asked us not to show their
faces-- also refused to be tested. They said if a
mother has H I V, a doctor will tell her not to
breast-feed Then families and neighbors will
know she tested positive, and because H I V is
stigmatized here, she could be rejected. To deal
with these concerns, the government announced
late last month that it will give an anti-
transmission drug to all women to want it at the
time they give birth, whether or not they've been
tested. This means some women who don't have
the disease may end up taking the drug, but the
consensus was that the risks a outweighed by the
benefits. But these mothers raised still another
concern The drug is to save the baby, not the
mother

*asking myself why the mother is not protected.*  ⎫
  *She the one who is supposed to take care of that baby*  ⎬ 920
  *What about if she dies?*  ⎭

} 908

It doesn't make much sense to save the baby
and let the parents die
  Reporter: Patricia Bakwinya runs a volunteer
organization that works with children of AIDS
victims
  We used to depend on extended families, but
now the extended families are overextended
themselves. Some of the people, the relatives
who are left with the children, are dying
themselves. And finally, the whole family gets
wiped out.

( Singing )

Reporter: these are some of those children.
They sing, "my mother died before I could know
her. My mother died before I could even see her
face."

( Singing )

The kids are part of a program called shining
stars, which Patricia Bakwinya and a group of
volunteers have set up on the edge of
Francistown with some help from the U.S.
Embassy. Most of the kids are orphans. The rest
are what Bakwinya calls "vulnerable children "
  Some of the vulnerable children are those
children whose parents have tested positive, but
they're still alive, and they want their children to
be prepared for come what may. Every day, we
have people bringing in children.

Play Skip   FastForward 10sec   Rewind 10sec   Enhanced Mode   Show Closed caption   Show Title
Page 6                                                              26 18mn  35 39mn

FIG. 9B the majority of people here who are negative
36% of sexually active adults are H.I V-positive
For the population as a whole, the number is
about 20%
   We want to keep the 80% of the general
population who's H I V-negative, we want to
keep them that way The key is knowing your
status
   Reporter to that end, rapid testing centers like
this one are being set up around the country
Young health workers are also going out into the
country to urge people to get tested under a
program called "total community mobilization"
The goal is to reach every household in
Botswana The man who was the main target of
this visit had already been tested. He politely
answered questions about whether he
understands the dangers of aids, and then left to
take his cattle to water. He told us he knows aids
kills, and is using a condom when he has sex,
but his friends aren't.
   Reporter: the government is also actively
working to stop the transmission of the virus
from mother to child, which happens in the
uterus, at birth, or while nursing
   Well, approximately 60,000 deliveries occur
each year Of those, 40% of those women are
H I V-positive, so we have 24,000 H I V-
positive women delivering a baby each year The
risk of transmission from mother to baby is
around 40%, so that gives us 9,600 babies who
are born each year with H.I V infection
   Reporter: the main public hospital in
Francistown has been providing an anti-
transmission drug—retrovir or A.Z.T.— As part
of a pilot program for the past two years.
Botswana got the drug cheaply with help from
the manufacturer, Glaxo Smith Kline, and
UNICEF. Loeto Mazhani is the doctor in charge
of the Natialal mother- to-child program. So
when is your plan to have it available to mothers
through the whole country?
   We are working on a target of december 2001,
and so far, we have covered seven districts out
of 24 health districts, so we still have a long way
to go.
   Reporter: he said they also have a long way to
go in getting women to agree to be tested. Did
you decide to get tested for H.I.V./AIDS?
   No, I didn't.
   Reporter: why not?
   I don't want to frustrate myself.

Reporter: you'd rather not know?
   Yes
   Reporter. why?
   If I know, I can kill myself, so I don't want to
know.
   Reporter: so even though it's possible that by
not knowing, you're transmitting it to the baby,
you still don't want to know?

No, I don't want
   Reporter nearly all the women in the pre-
natal ward-- who asked us not to show their
faces-- also refused to be tested They said if a
mother has H I V, a doctor will tell her not to
breast-feed Then families and neighbors will
know she tested positive, and because H I V is
stigmatized here, she could be rejected To deal
with these concerns, the government announced
late last month that it will give an anti-
transmission drug to all women to want it at the
time they give birth, whether or not they've been
tested This means some women who don't have
the disease may end up taking the drug, but the
consensus was that the risks a outweighed by the
benefits But these mothers raised still another
concern The drug is to save the baby, not the
mother.

```
   Im asking myself why the
      another is not protected.
   She's the one who is supposed
   to take care of that baby.
      What about if she dies?
              930
```
} 908

It doesn't make much sense to save the baby
and let the parents die
   Reporter Patricia Bakwinya runs a volunteer
organization that works with children of AIDS
victims
   We used to depend on extended families, but
now the extended families are overextended
themselves. Some of the people, the relatives
who are left with the children, are dying
themselves. And finally, the whole family gets
wiped out.
( Singing ) — 910

Reporter these are some of those children
They sing, "my mother died before I could know
her. My mother died before I could even see her
face."
( Singing ) — 910

The kids are part of a program called shining
stars, which Patricia Bakwinya and a group of
volunteers have set up on the edge of
Francistown with some help from the U.S
Embassy. Most of the kids are orphans. The rest
are what Bakwinya calls "vulnerable children"
   Some of the vulnerable children are those
children whose parents have tested positive, but
they're still alive, and they want their children to
be prepared for come what may Every day, we
have people bringing in children

FIG. 9C

| TOPIC OF INTEREST | KEYWORD & PHRASES | VIDEO FEATURES | WEIGHT |
|---|---|---|---|
| TERRORISM | OSAMA | FACE RECOGNITION: OSAMA BIN LADEN | 0.7 |
| | AFGHANISTAN | TEXT RECOGNITION: AFGHANISTAN | 0.6 |
| | * | BUILDING RECOGNITION: * OR CROWD RECOGNITION: * | 0.1 |
| COMPANY XYZ | SUZUKI | FACE RECOGNITION: JOHN SUZUKI | 0.8 |
| | * | BUILDING RECOGNITION: * AND (LOGO RECOGNITION: XYZ OR TEXT RECOGNITION: XYZ) | 0.75 |
| FOOTBALL | BUFFALO BILLS | FACE RECOGNITION: JIM KELLY OR FACE RECOGNITION: MARV LEVY | 0.9 |

FIG. 11

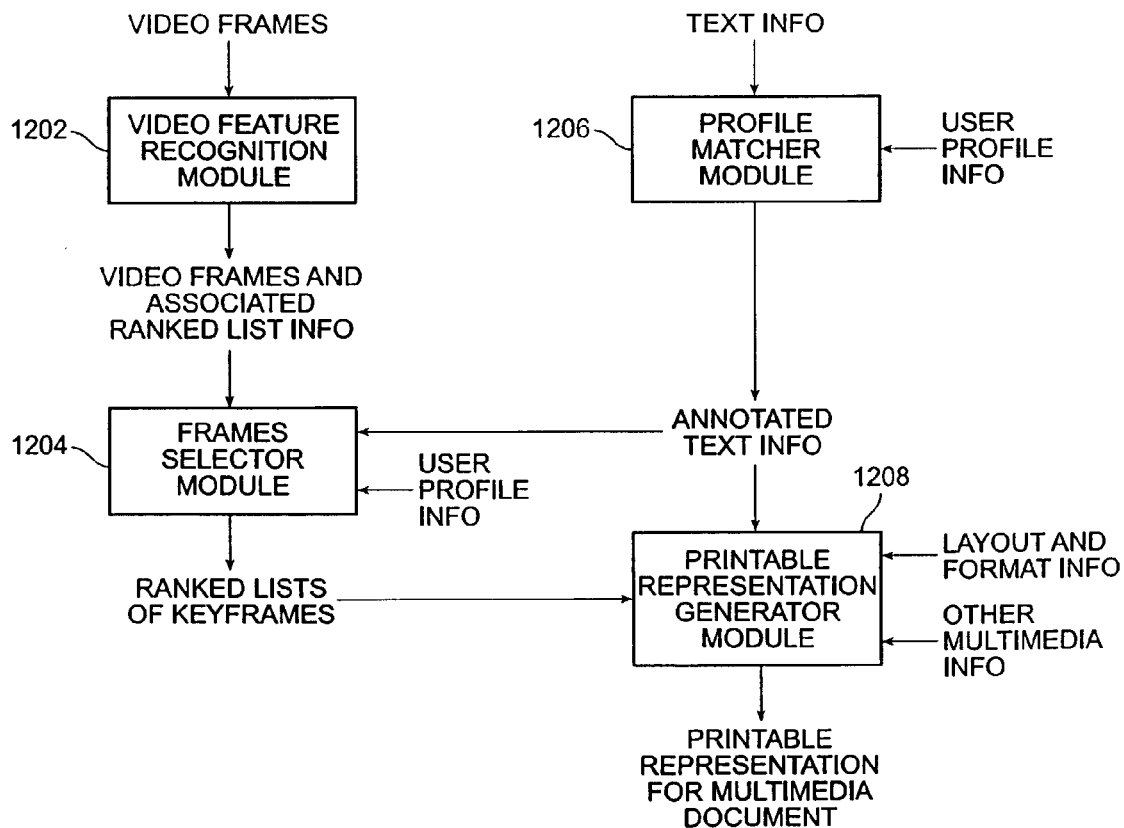

FIG. 12

The Newshour, (PBS, Channel 233)
Start Time: 6:01pm - Record Time: 00:54:49min
June 5, 2001

The comeback of Silvio Berlusconi in Italy. It all follows our summary of the news this Tuesday. Major funding for the Newshour with Jim Lehrer has been provided by imagine a world where we're not diminishing resources, we're growing them. Ethanol, a cleaner burning fuel made from corn. A.D.M., The nature of what's to come. And by the Corporation for Public Broadcasting. This program was also made possible by contributions to your pbs station from viewers like you. Thank you.

Lehrer: the Federal Reserve cut a key interest rate again today. Its open market committee lowered the federal funds rate half a point to 4%— the lowest in seven years. Banks charge that rate on overnight loans to each other. It was the fifth reduction this year. In a statement, the fed said it still saw weakness in the economy, leaving open the possibility it might cut rates again. House Democrats today announced their alternative to President Bush's energy plan. They gathered at a gas station near the Capitol, and said they'd increase production and reduce demand. They called for federal caps on electricity prices, restrictions on drilling in federal lands, and tax incentives for energy-efficient cars and homes. House minority leader Gephardt said it was a balanced approach.

We believe we can have more than adequate supplies of energy and save our environment at the same time if we do the right things in research on renewables, on conservation, and on new sources of energy in high technology. We do not accept the belief that this administration apparently has that we have to drill our way out of this problem.

Lehrer: President Bush is to announce his plan on Thursday. It's expected to put greater emphasis on finding more energy and building more production capacity, plus taking a new look at nuclear power. He has opposed price controls.

A runaway freight train rolled across northwest Ohio for nearly an hour today. It was unmanned as it crossed at least two counties and downtown Bowling Green at speeds of up to 45 miles per hour. Police said the southbound C.S.X. train got away while the engineer was operating a switch at a stop near Toledo. It finally slowed, and a company official managed to climb on and stop it, about 55 miles from columbus. C.S.X. Said the cargo aboard the 47 car train included a non- explosive industrial acid No one was injured.

In the middle east today, thousands of Palestinians protested the anniversary of Israel's founding in 1948, and fierce fighting erupted across the West Bank and Gaza. We have a report from Louise Bates of Associated Press television news.

Reporter: more than 30,000 Palestinians marched on the main square of the west bank town of Nablus in the largest demonstration against Israel seen for several years. The event was organized to mark Al Naqba, meaning The Great Catastrophe. That's the name Palestinians give the anniversary of the creation of the state of Israel in 1948 ( Gunfire ) many of the demonstrators headed to Israeli check points after the rallies. When an Israeli soldier removed a Palestinian flag, he was jeered by the angry crowd. At a traffic circle near Ramallah, a regular flashpoint during the intifada, clashes with Israeli soldiers turned violent. Across the west bank and gaza, four Palestinians were killed and more than a hundred were injured ( Gunfire )

Lehrer: since that report was filed, Palestinian doctors put the number of wounded at more than 200, and the Israeli military said an Israeli woman was killed in the west bank after nightfall. In Jerusalem today, a Palestinian bus driver was convicted of murdering eight Israelis last February. He drove his bus into a crowd near Tel Aviv. It was the single deadliest incident since the current violence began last September.

Back in this country today, more aggressive treatment of high cholesterol was proposed today by a federal medical panel. It had been convened by the National Institutes of Health. The group of experts said the change could triple the number of people who take cholesterol-lowering drugs and dramatically reduce deaths from heart disease. But they said doctors need to make it a higher priority.

There is a clear undertreatment of people who need cholesterol lowering. That is a chronic problem. We have put out guidelines and information and said that this deserves aggressive attention, and we have to do more to make it easy to implement all of these guidelines and make it possible to apply them in actual practice.

Lehrer: it's estimated more than 50 million Americans have high cholesterol. The new guidelines recommend different tests to screen for the problem. They also revise the recommended levels for good and bad cholesterol. We'll have more on this story later in the program tonight. Married couples with

FIG. 16C

Hardball (CNBC, Channel 356)
Recording Time: 5:00pm -Total Time: 00:59:59 min
September 14, 2001

One week has passed since terrorist attacks destroyed the World Trade Center and damaged the Pentagon and hope for finding survivors in the rubble is fading fast. Tonight, the latest on the investigation and plans for a possible retaliation I'm Chris Matthews. Welcome to a special edition of "Hardball." Captioning by the national captioning institute -- www.ncicap.org 5,422 people are still missing in the rubble of the World Trade Center and New York Mayor Rudy Giuliani doesn't expect anymore survivors The chances of recovering any live human beings are very, very small now. Given the amount of time and the condition of the site. Those chances are not totally, however, ended or over. so, we will -- we will still conduct ourselves as a rescue effort as well as a recovery effort.

Today, the nation stopped at 8:48 this morning, the time the first plane hit to mark the tragic events of one week ago. [sirens]

At the White House, President Bush pressed forward, vowing to extinguish terrorism and hailing the American people.

Today, I herald the soul and spirit of America with live examples of people who've made a huge difference and those who suffer and those who hurt. This is a great land. It's a great land. because our people are so decent and strong and compassionate.

Meanwhile, Attorney General John Ashcroft says other hijackers could still be at large. So far, at least 75 people have been detained and questioned about the attacks and four arrested on material warrants. Among those detain reasonable doubt two men who were carrying box cutters and large amounts of cash who were pulled off a train in Texas. And a man detained in Minnesota prior to the attack who aroused suspicion for trying to buy time on a jet simulator, despite a lack of flight experience. In Afghanistan, refugees continue to pour out of the country, expecting a U.S. attack. Afghanistan's ruling Taliban says it hasn't ruled out the possibility that Osama bin Laden was behind last week's attacks. But it wants proof before it hands over bin Laden. Even so, Defense Secretary Donald Rumsfeld says the surrender may not matter much.

Our adversaries are not one or two terrorist leaders, even a single terrorist organization or network. It's a broad network of individuals and organizations that are determined to terrorize and, in so doing, to deny us the very essence of what we are -- free people This hour, we're going to get reaction from former Senator Warren Rudman, plus we'll go over the military game plan with Barry Mcafter ree and Alexander Haig And talk to Donald Marry run on how President Bush is handling this crisis and we begin this hour at ground zero with NBC's Chip Reid Horrible news today, right?

Well, absolutely, Chris. This is the sixth day in a row that they have not pull add single live person out of that rubble. You can see over my shoulder it is still burning actively. The smoke is pouring out of there. The conditions for the rescue worker are still horrendous and they are now going through an agonizing process, officials are, at trying to decide at what point do you just decide this is no longer a rescue effort where you're looking for people alive and it becomes a recovery effort where you're simply looking for bodies? Some officials think it's better to declare, at some point, it's over. So think it's better to just let the families come to that conclusion on their own. Rudy Giuliani today said that there is a very, very small chance of finding people alive in there. At the same time, he said there is still a rescue effort. He does not want to squash hope completely, but on the other hand, he want it is families to come to the conclusion that the chances of finding their loved ones in there alive are very, very slim indeed. One other point they made today, Rudy Giuliani and other officials said, they're pleading with the public not to come down here because they have been coming down in droves to take pictures, see the site. Maybe it is part of the mourning or grieving process for people generally, but it is interfering with the part of the rescue workers in there. They want this site to be kept open so that the vehicles carrying bodies and equipment in and out will not be impeded by people down here taking picture. Chris?

Thank you very much, NBC's Chip Reid at ground zero. For the latest on the plans of a possible military stnbling, we get this report from NBC's Jim Miklaszewski at the Pentagon.

U.S. Marines dressed for combat leave their base in Okinawa today. The Army's 82nd Airborne at Fort Bragg, North Carolina. They play a major role in any US strike against Afghanistan.

They're waiting for a call to arms. And they're ready to go and answer it.

Donald Rumsfeld says when it comes to America's military all options are on the

DEVICE FOR GENERATING A MULTIMEDIA PAPER DOCUMENT

CROSS-REFERENCES TO RELATED APPLICATIONS

This is a continuation-in-part (CIP) application of and claims priority from U.S. Non-Provisional patent application Ser. No. 10/001,895, filed Nov. 19, 2001, which in turn is a continuation-in-part application of U.S. Non-Provisional patent application Ser. No. 09/149,921, filed Sep. 9, 1998 now U.S. Pat. No. 6,369,811. The entire contents of the aforementioned applications are herein incorporated by reference for all purposes.

The present application also incorporates by reference for all purposes the entire contents of the following applications:

(1) U.S. Non-Provisional patent application Ser. No. 08/995,616, filed Dec. 22, 1997;

(2) U.S. Non-Provisional patent application Ser. No. 10/001,894, entitled "TECHNIQUES FOR RETRIEVING MULTIMEDIA INFORMATION USING A PAPER-BASED INTERFACE" filed Nov. 19, 2001;

(3) U.S. Non-Provisional patent application Ser. No. 10/001,849, entitled "TECHNIQUES FOR ANNOTATING MULTIMEDIA INFORMATION" filed Nov. 19, 2001;

(4) U.S. Non-Provisional patent application Ser. No. 10/001,891, entitled "PAPER-BASED INTERFACE FOR MULTIMEDIA INFORMATION STORED BY MULTIPLE MULTIMEDIA DOCUMENTS" filed Nov. 19, 2001; and (5) U.S. Non-Provisional patent application Ser. No. 10/001,893, entitled "TECHNIQUES FOR GENERATING A COVERSHEET FOR A PAPER-BASED INTERFACE FOR MULTIMEDIA INFORMATION" filed Nov. 19, 2001.

COPYRIGHT

A portion of the disclosure of this patent document contains material, which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention relates to techniques for generating paper documents, and more particularly to devices for generating multimedia paper documents.

With the rapid growth of computers, an increasing amount of information is being stored in the form of electronic (or digital) documents. These electronic documents include multimedia documents that store multimedia information. The term "multimedia information" is used to refer to information that comprises information of several different types in an integrated form. The different types of information included in multimedia information may include a combination of text information, graphics information, animation information, sound (audio) information, video information, and the like. Multimedia information is also used to refer to information comprising one or more objects wherein the objects include information of different types. For example, multimedia objects included in multimedia information may comprise text information, graphics information, animation information, sound (audio) information, video information, and the like.

Several different techniques and tools are available today for accessing and navigating multimedia information that may be stored in electronic multimedia documents. Examples of such tools and/or techniques include proprietary or customized multimedia players (e.g., RealPlayer™ provided by RealNetworks, Microsoft Windows Media Player provided by Microsoft Corporation, QuickTime™ Player provided by Apple Corporation, Shockwave multimedia player, and others), video players, televisions, personal digital assistants (PDAs), and the like.

The tools and techniques described above that are conventionally available for accessing multimedia information focus on the electronic or digital nature/format of the multimedia information and output the multimedia information in electronic or digital form. For example, multimedia players typically execute on a computer system and output the multimedia information stored in multimedia documents via output devices coupled to the computer such as a monitor, a speaker, and the like.

While retrieving multimedia information in digital form is adequate for some users, it is a well-known fact that many users find it easier to comprehend and assimilate information when the information is printed on a paper medium rather than in the digital form. These users thus prefer to access information in a paper format by printing the information on a paper medium. For example, most people who encounter a long document will typically print the document on paper before reading the document, even though there are several tools (e.g., word processors, browsers, etc.) available for viewing and navigating the document in electronic form. While there are several tools available for printing ordinary data files containing text and images on paper (e.g., a printer coupled to a word-processor), there are no techniques or tools that allow users to print multimedia information on a paper-medium in a format and style that is readable by the user. As described above, all of the conventionally available tools and techniques for retrieving multimedia information focus on the electronic or digital nature/format of the multimedia content and output the multimedia information in electronic or digital form.

In light of the above, there is a need for techniques that allow users to generate paper documents that enable users to access multimedia information via a paper-based interface.

BRIEF SUMMARY OF THE INVENTION

Embodiments of the present invention provide techniques for generating a printable representation of multimedia information that can be printed on a paper medium to provide a paper-based interface for the multimedia information. The paper-based interface provided by the present invention provides a more readable and comprehensible representation of the multimedia information. According to an embodiment of the present invention, an output device is configured to print the printable representation of multimedia information on a paper medium to generate a multimedia paper document. The multimedia information for which the multimedia paper document is generated in stored on the output device.

According to an embodiment of the present invention, a multimedia paper document output device is provided for generating a multimedia paper document for a multimedia document storing multimedia information. In this embodiment, the output device receives a first signal to generate a multimedia paper document for the multimedia document. The output device generates the multimedia paper document for the multimedia document and stores the multimedia document.

According to another embodiment of the present invention, an output device is coupled to a multimedia information source and configured to generate a multimedia paper document for multimedia information. In this embodiment, the output device receives multimedia information from the multimedia information source, generates the multimedia paper document for the multimedia information received from the multimedia information source, and stores the multimedia information received from the multimedia information source.

According to yet another embodiment of the present invention, an output device is coupled to a multimedia information source and configured to generate a multimedia paper document for multimedia information. In this embodiment, the output device receives a printable representation of the multimedia information from the multimedia information source and generates the multimedia paper document for the multimedia information based upon the printable representation received from the multimedia information source. The output device receives a first signal from a user device requesting a first portion of the multimedia information, and responsive to the first signal, the output device communicates the first portion of the multimedia information to the user device.

The foregoing, together with other features, embodiments, and advantages of the present invention, will become more apparent when referring to the following specification, claims, and accompanying drawings.

BRIEF DESCRIPTION OF THE DRAWINGS

FIGS. 5A and 5B depict a sample template according to an embodiment of the present invention;

FIG. 7C depicts a page from a multimedia paper generated according to an embodiment of the present invention for a multimedia document;

FIGS. 9A, 9B, and 9C depict pages of a multimedia paper document displaying visual markers to denote various attributes of the audio information or of the CC text information included in the multimedia information for the multimedia document for which the multimedia paper document is generated according to an embodiment of the present invention;

FIG. 11 depicts a user profile that may be configured by a user according to an embodiment of the present invention to facilitate selection of keyframes relevant to user-specified topics of interest;

FIG. 12 depicts modules that facilitate selection of keyframes relevant to topics of interest according to an embodiment of the present invention;

FIGS. 16A, 16B, 16C, and 16D depict pages of a multimedia paper document generated according an embodiment of the present invention using the method depicted in FIG. 14;

FIG. 21 depicts another coversheet generated according to an embodiment of the present invention for a multimedia paper document that includes pages selected from multiple multimedia paper documents based upon selection criteria;

DETAILED DESCRIPTION OF THE INVENTION

Figure 1:
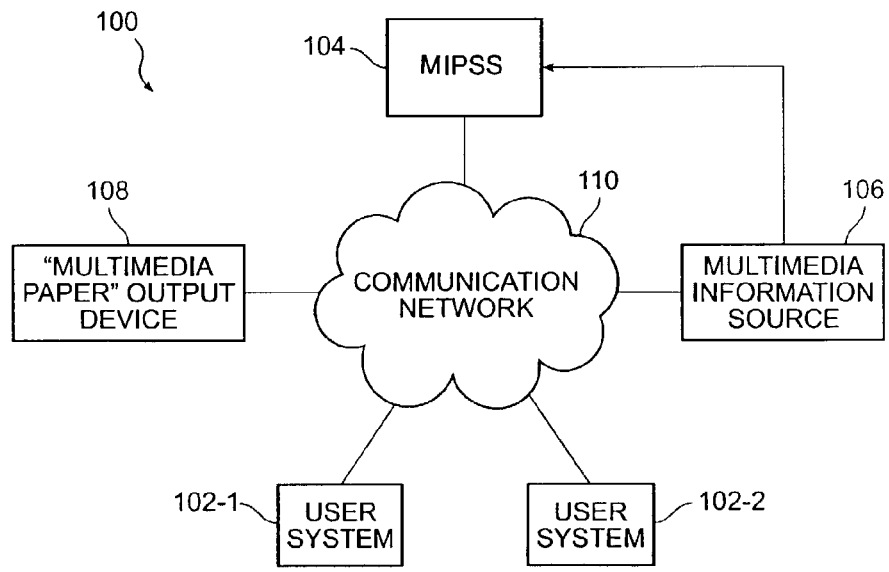
FIG. 1 is a simplified block diagram of a distributed system that incorporates an embodiment of the present invention.

Embodiments of the present invention provide techniques for generating a printable representation of multimedia information that can be printed on a paper medium to provide a paper-based interface for the multimedia information. The paper-based interface provided by the present invention provides a more readable and comprehensible representation of the multimedia information. According to an embodiment of the present invention, an output device is configured to print the printable representation of multimedia information on a paper medium to generate a multimedia paper document. The multimedia information for which the multimedia paper document is generated in stored on the output device.

According to an embodiment of the present invention, the printable representation for the multimedia information may be annotated to identify locations of information in the multimedia information that may be of interest to a user. A paper document generated by printing the annotated printable representation on a paper medium displays the annotations. The annotations provide visual indications of information relevant to the user. For example, information printed in the paper document that is relevant to topics of interest specified by a user may be annotated or highlighted. In this manner, the multimedia paper document generated according to the teachings of the present invention provides a convenient tool that allows a user to readily locate portions of the paper document that are relevant to the user. Since the multimedia paper document comprises a printable representation of multimedia information, the paper document generated according to the teachings of the present invention allows the user to identify portions of multimedia information that are of interest to the user.

According to an embodiment of the present invention, the paper document generated by printing the printable representation on a paper medium also provides an interface for accessing or retrieving multimedia information in electronic form. The paper document may thus be used as an indexing and retrieval tool for retrieving multimedia information. For example, a user may use a paper document generated for a video recording to access or retrieve portions of the video recording.

According to an embodiment of the present invention, the present invention provides techniques for generating a single printable representation that includes multimedia information extracted from a plurality of different multimedia documents or multimedia sources. According to an embodiment of the present invention, the single printable representation includes multimedia information selected from the plurality of multimedia documents based upon selection criteria. A user may specify the selection criteria. The selection criteria may be based upon any attributes of the multimedia documents or their contents, or upon user-specified topics of interest, and the like. The single or consolidated printable representation can then be printed on a paper medium to generate a consolidated paper document comprising information that satisfies the selection criteria.

According to an embodiment of the present invention, the present invention provides techniques for generating a coversheet for a paper document generated by printing the printable representation on a paper medium. The coversheet may provide a summary of the contents printed on pages of the paper document.

As described above, the printable representation of the multimedia information can be printed on a paper medium to generate the paper-based interface. The term "paper" or "paper medium" as used in this application is intended to refer to any tangible medium on which information can be printed, written, drawn, imprinted, embossed, etc. For purposes of this invention, the term "printing" is intended to include printing, writing, drawing, imprinting, embossing, and the like. For purposes of this invention, the document generated by printing the printable representation on a paper medium will be referred to as "multimedia paper" or "multimedia paper document." The multimedia paper document takes advantage of the high resolution and portability of paper and provides a readable representation of the multimedia information. According to the teachings of the present invention, a multimedia paper document may also be used to select, retrieve, and access the multimedia information.

The multimedia information for which the multimedia paper document is generated may be stored in an electronic multimedia document. Accordingly, the term "multimedia document" is intended to refer to any storage unit (e.g., a file) that stores multimedia information in digital format. Various different formats may be used to store the multimedia information. These formats include various MPEG formats (e.g., MPEG 1, MPEG 2, MPEG 4, MPEG 7, etc.), MP3 format, SMIL format, HTML+TIME format, WMF (Windows Media Format), RM (Real Media) format, Quicktime format, Shockwave format, various streaming media formats, formats being developed by the engineering community, proprietary and customary formats, and others. Examples of multimedia documents include video recordings, MPEG files, news broadcast recordings, presentation recordings, recorded meetings, classroom lecture recordings, broadcast television programs, and the like.

As previously described, multimedia information comprises information of different types in an integrated form. For example, multimedia information may comprise a combination of text, graphics, animation, sound (audio), and/or video information in an integrated form. For example, a video recording of a television broadcast may comprise video information and audio information. In certain instances the video recording may also comprise close-captioned (CC) text information which comprises material related to the video information, and in many cases, is an exact representation of the speech contained in the audio portions of the video recording. As another example, a recording of a presentation may store information captured during a presentation including video information, audio information, CC text information, information corresponding to slides presented during the presentation, whiteboard information, and other types of information. As described below, the present invention generates a printable representation of the multimedia information that includes printable representations of the various types of information included in the multimedia information. The printable representation of the multimedia document can then be printed on a paper medium to generate a multimedia paper or multimedia paper document for the multimedia information stored by the multimedia document.

Generating Printable Representation of Multimedia Information

As described above, according to an embodiment of the present invention, techniques are provided for generating a printable representation of multimedia information that can be printed on a paper medium to produce a multimedia paper document. The multimedia paper document provides a paper-based interface for the user to view and comprehend the multimedia information. FIG. 1 is a simplified block diagram of a distributed system 100 that might incorporate an embodiment of the present invention. As depicted in FIG. 1, distributed system 100 comprises a number of devices or computer systems including one or more user systems 102, a multimedia information processing server system (MIPSS) 104, a multimedia information source (MIS) 106, and a multimedia paper output device 108 coupled to communication network 110 via a plurality of communication links. It should be apparent that distributed system 100 depicted in FIG. 1 is merely illustrative of an embodiment incorporating the present invention and does not limit the scope of the invention as recited in the claims. One of ordinary skill in the art would recognize other variations, modifications, and alternatives. For example, in alternative embodiments of the present invention, one or more of the systems depicted in FIG. 1 (e.g., MIPSS 104 and output device 108) may be incorporated into a single system. In other alternative embodiments, the present invention may also be embodied in a stand-alone system, and the like.

Communication network 110 provides a mechanism allowing the various devices and computer systems depicted in FIG. 1 to communicate and exchange data and information with each other. Communication network 110 may itself be comprised of many interconnected computer systems and communication links. While in one embodiment, communication network 110 is the Internet, in other embodiments, communication network 110 may be any suitable communication network including a local area network (LAN), a wide area network (WAN), a wireless network, an intranet, a private network, a public network, a switched network, and the like.

The communication links used to connect the various systems depicted in FIG. 1 may be of various types including hardwire links, optical links, satellite or other wireless communications links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

According to the teachings of the present invention, MIPSS 104 is configured to perform processing to facilitate generation of a printable representation of the multimedia information. The printable representation generated by MIPSS 104 for a multimedia document may include printable representations of the various types of information included in the multimedia information stored by the multimedia document. The printable representation generated by MIPSS 104 may be printed on a paper medium to generate a multimedia paper document. The processing performed by MIPSS 104 to generate a printable representation of the multimedia information may be implemented by software modules executing on MIPSS 104, by hardware modules coupled to MIPSS 104, or combinations thereof. According to alternative embodiments of the present invention, the processing may also be distributed between other computer systems and devices depicted in FIG. 1.

The multimedia information for which MIPSS 104 generates a printable representation may be stored in a multimedia document accessible to MIPSS 104. For example, the multimedia document may be stored by MIPSS 104 or may alternatively be stored in locations accessible to MIPSS 104.

In alternative embodiments of the present invention, instead of being stored in a multimedia document, MIPSS 104 may receive a stream of multimedia information (e.g., a streaming media signal, a cable signal, etc.) from a multimedia information source such as MIS 106. Examples of MIS 106 include a television broadcast receiver, a cable receiver, a TIVO box, and the like. MIPSS 104 may receive the multimedia information directly from MIS 106 or may alternatively receive the information via a communication network such as communication network 106. MIPSS 104 may then store the multimedia information received from MIS 106 in the form of a multimedia document and use the stored information to generate the printable representation of the multimedia information.

After generating the printable representation of the multimedia information, MIPSS 104 may communicate the printable representation to output device 108 that is capable of generating a multimedia paper document by printing the printable representation on a paper medium. In one embodiment, MIPSS 104 may itself be configured to generate a multimedia paper document from the printable representation of the multimedia information. In alternative embodiments, the printable representation generated by MIPSS 104 may be stored for later use.

As described above, multimedia information source (MIS) 106 represents a source of multimedia information. According to an embodiment of the present invention, MIS 106 may store multimedia documents that are accessed by MIPSS 104. In alternative embodiments, MIS 106 may provide a multimedia information stream to MIPSS 104. For example, MIS 106 may be a television receiver/antenna providing live television feed information to MIPSS 104. MIS 106 may be a video recorder providing the recorded video and/or audio stream to MIPSS 104. In alternative embodiments, MIS 106 may be a presentation or meeting recorder device that is capable of providing a stream of the captured presentation or meeting information to MIPSS 104. MIS 106 may also be a receiver (e.g., a satellite dish or a cable receiver) that is configured to capture or receive (e.g., via a wireless link) multimedia information from an external source and then provide the captured multimedia information to MIPSS 104 for further processing.

Users may use user systems 102 to interact with the other systems depicted in FIG. 1. For example, a user may use user system 102 to select one or more multimedia documents and request MIPSS 104 to generate multimedia papers for the selected documents. Users may also use user systems 102 to view digital versions of the multimedia documents. For example, multimedia players executing on a user system may play multimedia information stored by a multimedia document. A user system 102 may be of different types including a personal computer, a portable computer, a workstation, a computer terminal, a network computer, a mainframe, a kiosk, a personal digital assistant (PDA), a communication device such as a cell phone, or any other data processing system.

Output device 108 is capable of generating a multimedia paper document based upon the printable representation of the multimedia information received from MIPSS 104. Accordingly, output device 108 represents any device that is capable of outputting (e.g., printing, writing, drawing, imprinting, embossing, etc.) the printable representation of the multimedia information on a paper medium. For example, output device 108 may be a printer that is coupled to MIPSS 104. The printer may be configured to receive a signal from MIPSS 104 including a printable representation of multimedia information from MIPSS 104, and to generate a multimedia paper document based upon the printable representation of the multimedia information.

According to an embodiment of the present invention, output device 108 may be incorporated as part of a multi-function device (or MFD) that is capable of performing a plurality of different functions in addition to allowing users to generate multimedia paper documents. For example, a MFD may allow users to copy, fax, or scan documents including multimedia paper documents. A MFD may also allow users to perform other functions. A MFD may also allow users to select multimedia documents for which printable representations are to be generated according to the teachings of the present invention. For example, a MFD may provide a user interface that allows a user to select one or more multimedia documents, request generation of printable representations for the selected multimedia documents, generate multimedia paper documents for the selected multimedia documents, and perform other functions such as copying, faxing, etc. on the printable representations or on the multimedia papers.

Figure 2A:
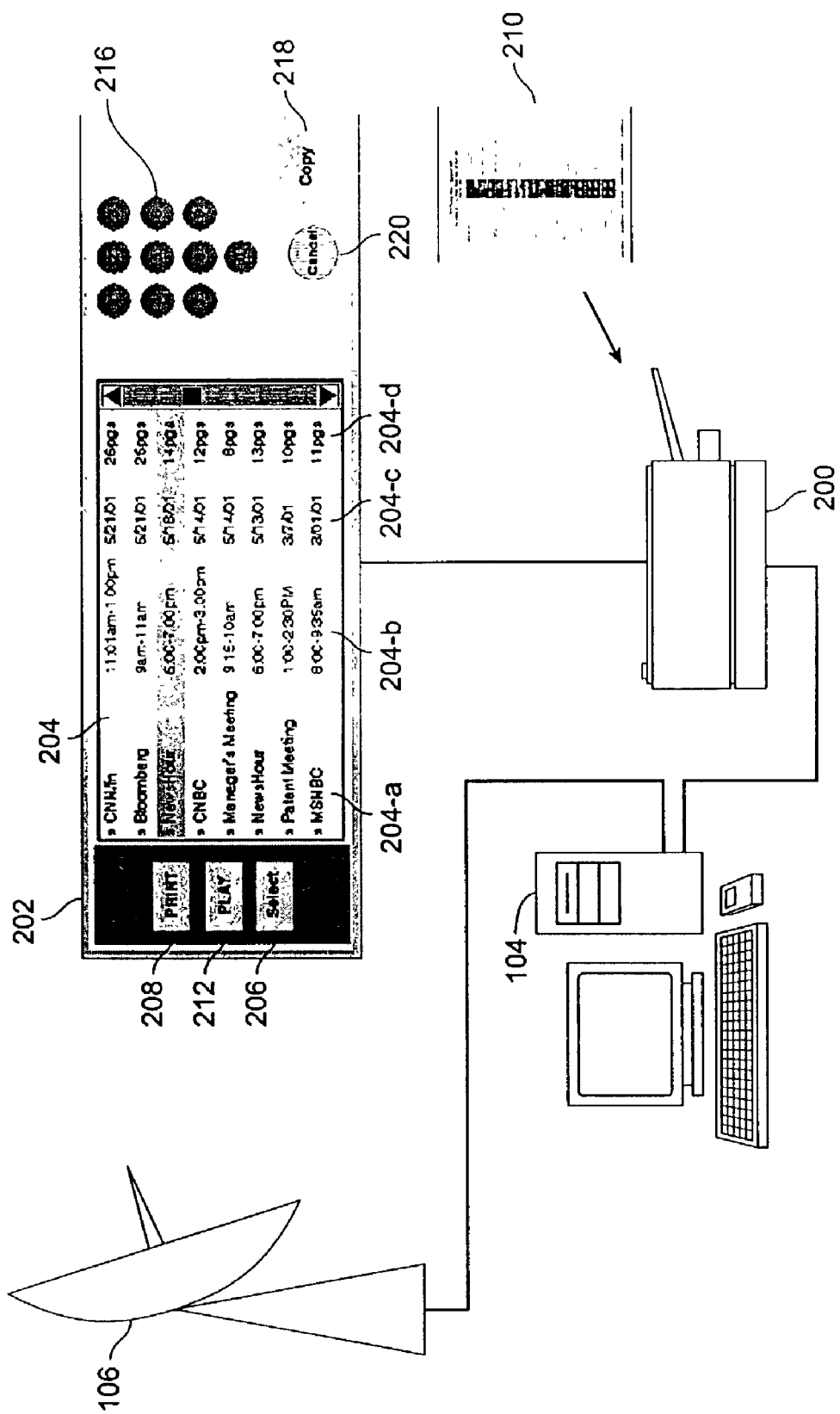
FIG. 2A depicts a networked system including a multifunction device according to an embodiment of the present invention.

FIG. 2A depicts a networked system including a MFD 200 according to an embodiment of the present invention. In the embodiment depicted in FIG. 2A, MFD 200 is coupled to MIPSS 104 that in turn is coupled to MIS 106. In the embodiment depicted in FIG. 2A, MIS 106 is a satellite dish or TV antenna that receives and provides multimedia information to MIPSS 104. MIPSS 104 generates a printable representation for the multimedia information. The printable representation may be forwarded to MFD 200 or may alternatively be stored by MIPSS 104.

In the embodiment depicted in FIG. 2A, MFD 200 provides a user interface 202 that can be used by users to provide instructions or commands to MFD 200 and to view information output by MFD 200. Interface 202 comprises an area 204 that displays a list of documents 204-*a* including multimedia documents that can be selected by a user. The multimedia documents displayed in area 204 may be stored by MFD 200 or may be stored by other devices (such as MIPSS 104) coupled to MFD 200. In alternative embodiments, area 204 may display a list of documents accessible to MIPSS 104. The multimedia documents displayed in area 204 may correspond to television broadcast recordings, video clips, recorded meetings, etc.

Area 204 may also display various details about the multimedia documents that are listed. In the embodiment depicted in FIG. 2A, for each multimedia document listed in area 204, the information displayed in area 204 includes information related to the date 204-*c* and time 204-*b* of the multimedia document recording. If a printable representation has already been generated for a multimedia document, the number of pages 204-*d* needed to print the printable representation (i.e., the number of pages in the multimedia paper document for the multimedia document) are also displayed. For example, the multimedia document titled "CNN/fn," stores a recording that was recorded on May 21, 2001 between 11:01 AM and 1:00 PM. A printable representation has been generated for the "CNN/fn" multimedia document and comprises 26 pages.

A user may select one or more documents displayed in area 204 using an input device of MFD 104. In the embodiment depicted in FIG. 2A, the user may select a document by clicking on the document name in area 204 or alternatively by using "Select" button 206. For example, as shown in FIG. 2A, the user has selected a multimedia document titled "NewsHour" which corresponds to a news broadcast recorded on May 18, 2001 between 6:00–7:00 PM. The user may then request MFD 200 to perform one or more functions provided by MFD 200 on the selected document(s). According to an embodiment of the present invention, the user may request generation of printable representations for the selected multimedia documents or may request generation of multimedia paper documents for the selected multimedia documents. The multimedia documents displayed in area 204 may also be indexed by MFD 200 that allows a user to perform familiar operations such as keyword searching, browsing for similar documents, etc. on the selected multimedia documents.

User interface 202 provides a plurality of user interface features that allow a user to specify functions or operations to be performed on the selected document(s). For example, the user may select "Print" button 208 to instruct MFD 200 to print multimedia paper documents 210 for the multimedia documents selected by the user in area 204. According to an embodiment of the present invention, upon receiving a signal indicating selection of "Print" button 206 by a user, MFD 200 sends a signal to MIPSS 104 requesting generation of printable representations for the user-selected multimedia documents. If printable representations for the user-selected documents already exist, MIPSS 104 communicates the previously generated printable representations for the user-selected documents to MFD 200. Alternatively, if the printable representations do not exist, MIPSS 104 generates printable representations for the one or more user-selected documents and then provides the printable representations to MFD 200. MFD 200 may then generate (or print) multimedia paper documents for the user-selected documents based upon printable representations corresponding to the documents received from MIPSS 104. In alternative embodiments, MFD 200 may itself be configured to generate printable representations for user-selected multimedia documents.

Figure 2B:
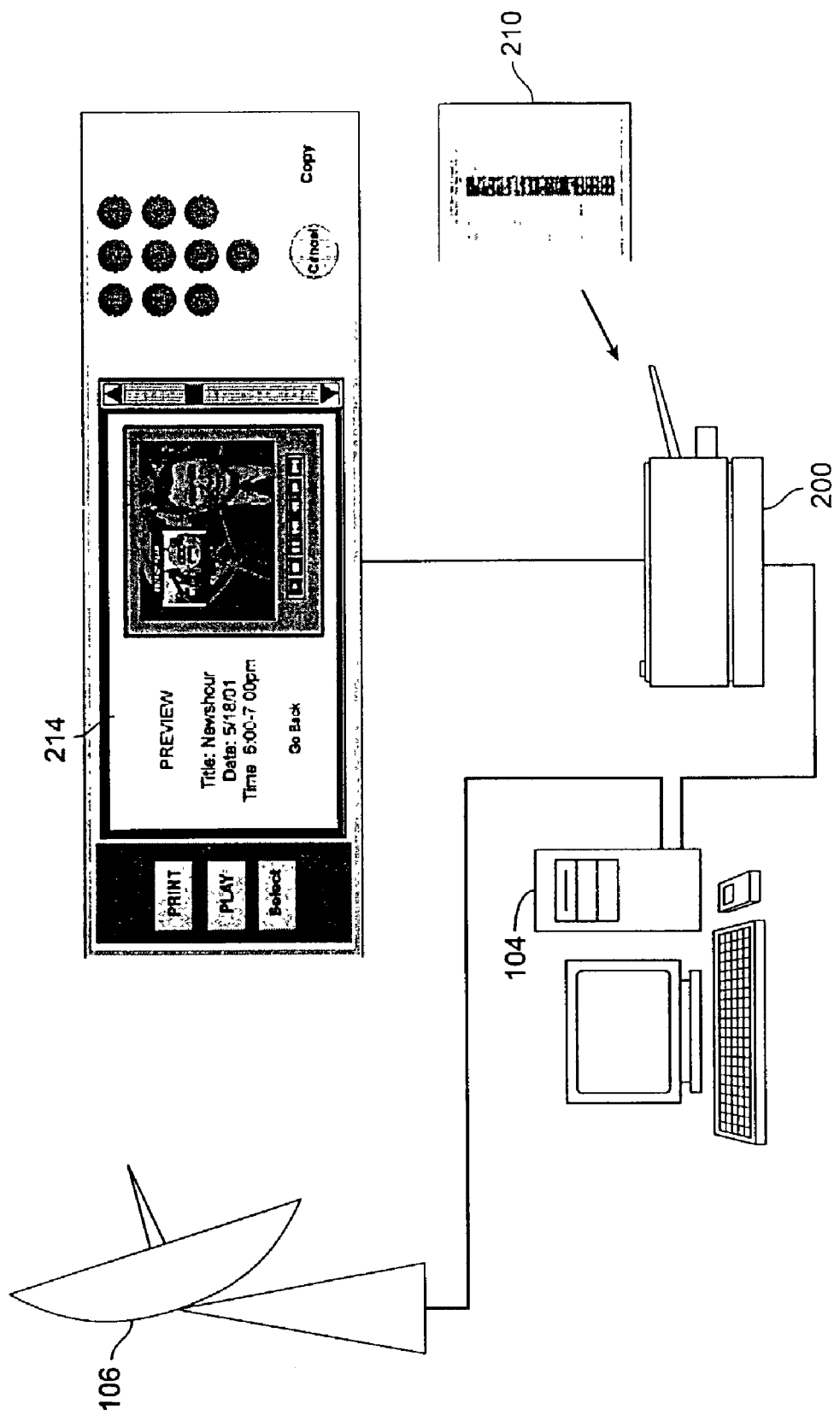
FIG. 2B depicts a user interface that is displayed to the user by a multifunction device according to an embodiment of the present invention.

User interface 202 also provides a "Play" button 212 which when selected by a user causes MFD 200 to playback multimedia information from the user-selected multimedia document(s). For example, FIG. 2B depicts a user interface 214 that is displayed to the user upon selection of "Play" button 212 according to an embodiment of the present invention. Interface 214 allows the user to play back video and audio information contained in the "NewsHour" multimedia document selected by the user in area 204 of FIG. 2A. If MFD 200 is connected to one or more output devices (e.g., an output monitor, other networked output devices), the user may also select the output device to be used for the playback. For example, the user may indicate that the information is to be played back on the user's computer in the user's office (or on a television in a particular conference room, etc.). In specific embodiments of the present invention, the user may also indicate the time when the multimedia information is to be played back.

Referring back to FIG. 2A, user interface 202 also provides a numeric keypad 216 that facilitates operations such as faxing of documents. For example, using keypad 216, a user may fax a multimedia paper document or a printable representation of a user-selected multimedia document to a recipient. The user may also make copies of the multimedia paper document by selecting "Copy" button 218. "Cancel" button 220 allows the user to cancel a pre-selected function.

It should be apparent that MFD 200 and the user interfaces depicted in FIGS. 2A and 2B are merely illustrative of an embodiment incorporating the present invention and do not limit the scope of the invention as recited in the claims. One of ordinary skill in the art would recognize other variations, modifications, and alternatives. For example, in a networked environment, a web browser-enabled interface may be provided allowing a user to control the functions of MFD 200 from a remote location, for example, using the user's computer system or PDA, and the like.

Figure 3:
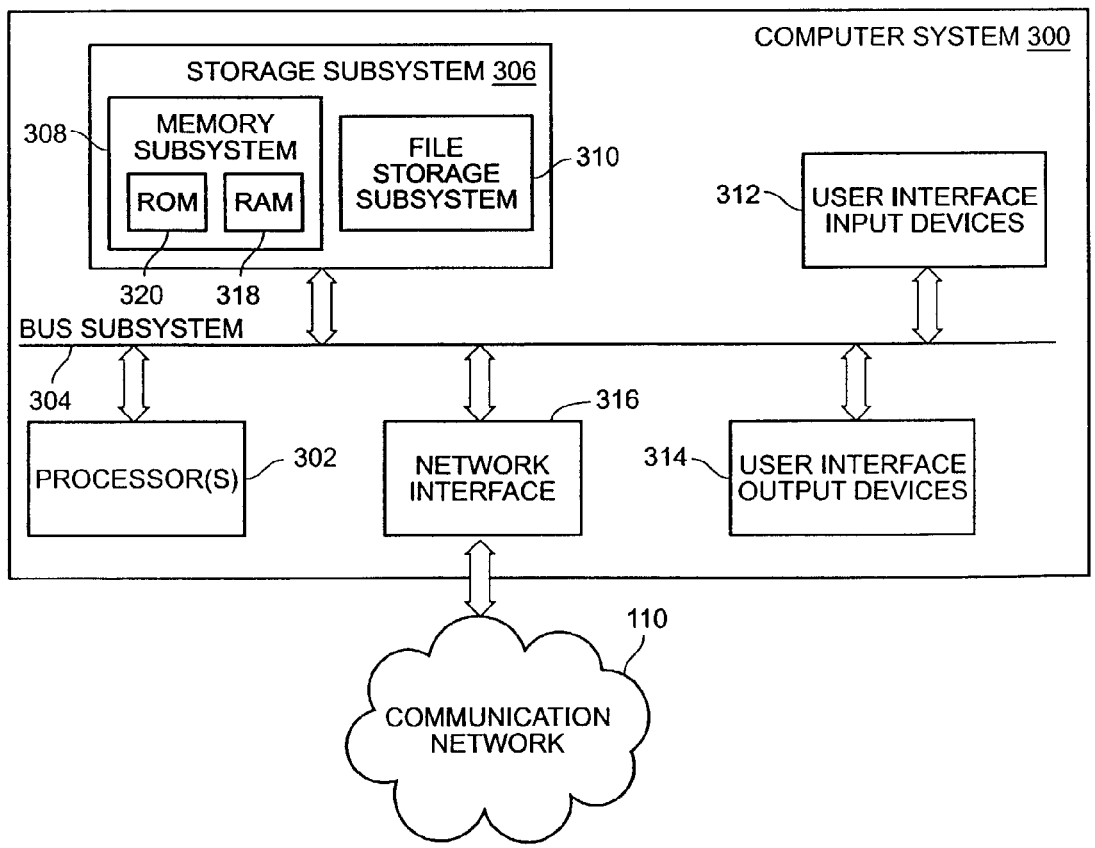
FIG. 3 is a simplified block diagram of a computer system according to an embodiment of the present invention.

FIG. 3 is a simplified block diagram of a computer system 300 according to an embodiment of the present invention. Computer system 300 may be used as any of the computer systems depicted in FIG. 1. As shown in FIG. 3, computer system 300 includes at least one processor 302 that communicates with a bus subsystem 304. These peripheral devices may include a storage subsystem 306, comprising a memory subsystem 308 and a file storage subsystem 310, user interface input devices 312, user interface output devices 314, and a network interface subsystem 316. The input and output devices allow user interaction with computer system 300. A user may be a human user, a device, a process, another computer, and the like. Network interface subsystem 316 provides an interface to other computer systems and communication networks including communication network 110.

Bus subsystem 304 provides a mechanism for letting the various components and subsystems of computer system 300 communicate with each other as intended. The various subsystems and components of computer system 300 need not be at the same physical location but may be distributed at various locations within network 100. Although bus subsystem 304 is shown schematically as a single bus, alternative embodiments of the bus subsystem may utilize multiple buses.

User interface input devices 312 may include a keyboard, pointing devices, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 300.

User interface output devices 314 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from computer system 300.

Storage subsystem 306 may be configured to store the basic programming and data constructs that provide the functionality of the computer system and of the present invention. For example, according to an embodiment of the present invention, software modules implementing the functionality of the present invention may be stored in storage subsystem 306 of MIPSS 104. For example, software modules that facilitate generation of printable representations of the multimedia information may be stored in storage subsystem 306 of MIPSS 104. These software modules may be executed by processor(s) 302 of MIPSS 104. In a distributed environment, the software modules may be stored on a plurality of computer systems and executed by processors of the plurality of computer systems. Storage subsystem 306 may also provide a repository for storing various databases and files that may be used by the present invention. For example, the multimedia documents may be stored in storage subsystem 306. Storage subsystem 306 may comprise memory subsystem 308 and file storage subsystem 310.

Memory subsystem 308 may include a number of memories including a main random access memory (RAM) 318 for storage of instructions and data during program execution and a read only memory (ROM) 320 in which fixed instructions are stored. File storage subsystem 310 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

Computer system 300 itself can be of varying types including a personal computer, a portable computer, a workstation, a computer terminal, a network computer, a mainframe, a kiosk, a personal digital assistant (PDA), a communication device such as a cell phone, a game controller, or any other data processing system. Due to the ever-changing nature of computers and networks, the description of computer system 300 depicted in FIG. 3 is intended only as a specific example for purposes of illustrating the preferred embodiment of the computer system. Many other configurations of a computer system are possible having more or fewer components than the computer system depicted in FIG. 3. For example, several other subsystems may be included in computer system 300 depending upon the functions performed by system 300.

Figure 4:
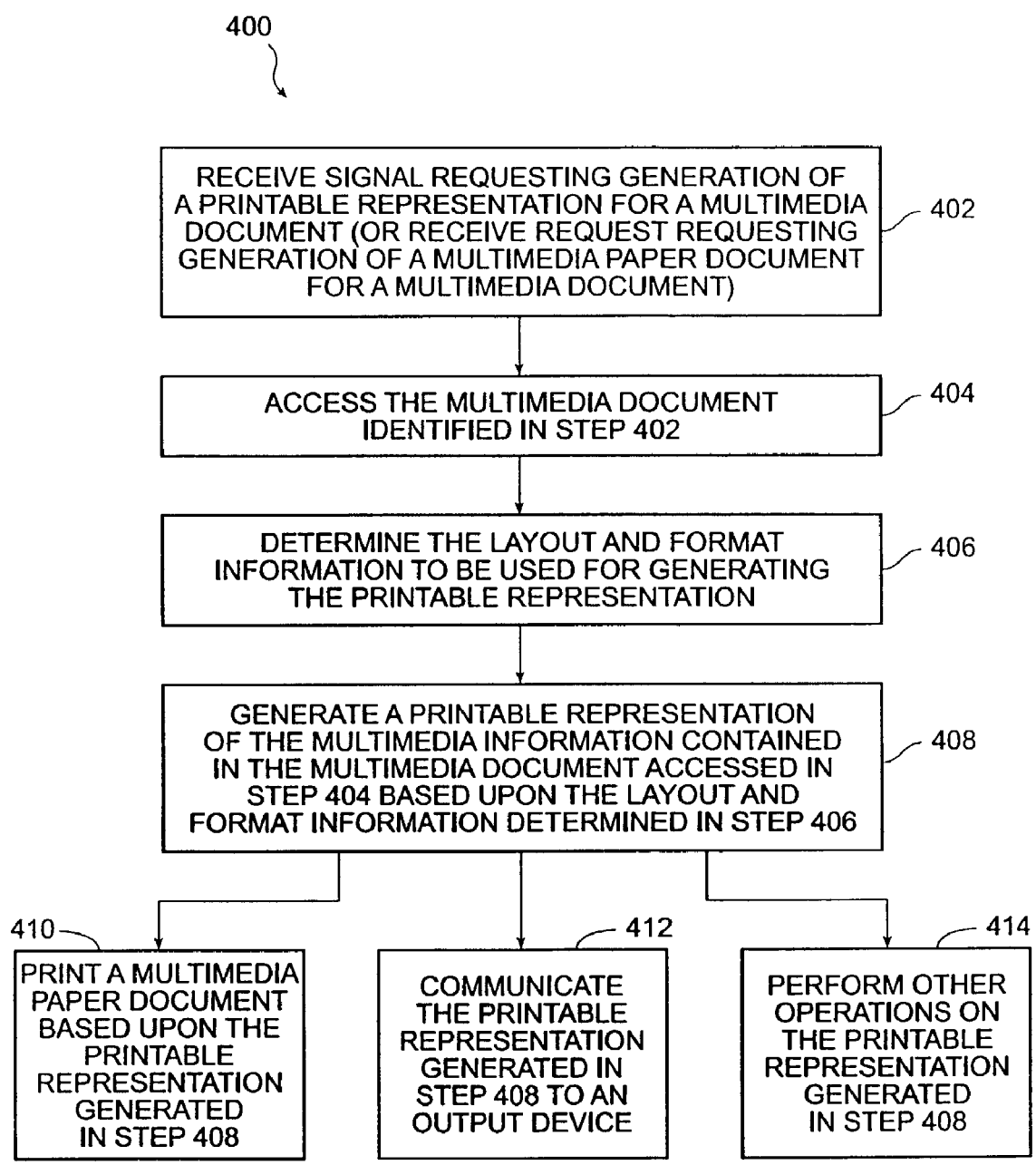
FIG. 4 is a simplified high-level flowchart depicting a method of generating a printable representation of multimedia information according to an embodiment of the present invention.

FIG. 4 is a simplified high-level flowchart 400 depicting a method of generating a printable representation of multimedia information according to an embodiment of the present invention. The processing depicted in FIG. 4 may performed by MIPSS 104 (e.g., by software modules executing on MIPSS 104). In alternative embodiments of the present invention, the processing may be distributed among the various systems depicted in FIG. 1. Flowchart 400 depicted in FIG. 4 is merely illustrative of an embodiment incorporating the present invention and does not limit the scope of the invention as recited in the claims. One of ordinary skill in the art would recognize other variations, modifications, and alternatives.

As depicted in FIG. 4, according to an embodiment of the present invention, the method is initiated when MIPSS 104 receives a signal requesting generation of a printable representation for a multimedia document storing multimedia information (step 402). Alternatively, the signal received in step 402 may request generation of a multimedia paper document for a multimedia document. MIPSS 104 may receive the signal from a variety of different sources including a user system 102, a MFD 200, from an interface provided by MIPSS 104, from MIS 106, and the like. The signal may identify the multimedia document for which a printable representation is to be generated.

In alternative embodiments of the present invention, the signal received in step 402 may comprise a stream of multimedia information (e.g., from MIS 106) for which a printable representation (or multimedia paper document) is to be generated. If the signal includes a multimedia information stream, MIPSS 104 may store the stream in a multimedia document and then generate a printable representation for the document. For purposes of explaining the processing in FIG. 4, it is assumed that the signal received in step 402 identifies a multimedia document for which a printable representation is to be generated.

MIPSS 104 then accesses the multimedia document identified by the signal received in step 402 (step 404). The multimedia document identified by the signal received in step 402 may be stored by MIPSS 104 or may alternatively be stored by other devices or systems from where it can be accessed by MIPSS 104. In alternative embodiments of the present invention, the signal received in step 402 may itself comprise the multimedia document.

MIPSS 104 then determines layout and format information to be used for generating the printable representation (step 406). The layout and format information specifies how the information is to be printed on the paper medium. For example, the layout and format information may comprise information identifying the paper-medium and size of the paper (e.g., letter size. legal size, A4 size, etc.) for which the printable representation is to be generated. The layout and format information may also identify special features of the paper (e.g., a paper with a letterhead, paper of a particular color, etc.) for which the printable representation is to be generated. In specific embodiments of the present invention, a default paper medium (e.g., letter size paper) may be selected for generating the printable representation of the multimedia document.

Additionally, the layout and format information indicates the layout and formatting features to be used for generating the printable representation of the multimedia information. For example, according to an embodiment of the present invention, the layout and format information specifies how each type of information (e.g., audio, video, images, text, etc.) included in the multimedia information is to be printed. For example, for each type of information included in the multimedia information, the layout and format information may identify the area (or location or section of the paper medium) on the paper medium in which the information is to be printed, and the format or styles (e.g., font type, font size, bolding, underlining, number of columns per page, size of the columns, page margins, etc.) to be used for printing the information. In embodiments of the present invention which support multiple languages, the layout and format information may also indicate the language (or languages) to be used for printing the information. MIPSS 104 uses the layout and format information to generate the printable representation.

For example for text information (e.g., CC text, text transcript of audio information) included in the multimedia information, the layout and format information may specify the font type and font size to be used for printing the text information, the number of columns to be used for printing the information, the size and location of the columns, the color of the font to be used for printing (which may depend on the color of the paper for which the printable representation is to be generated), line spacing, length of each line, number of words per line, bolding and capitalization techniques, and the like. The layout and format information may also identify the language to be used for printing the text information. For example, the layout and format information may indicate that the text is to be printed in two columns on each page with the English version in the first column and a Japanese translation of the English version in the second column.

For audio information, the layout and format information may identify techniques to be used for converting the audio information to text information (i.e., techniques for generating a text transcript for the audio information), the format and styles for printing the audio transcript (which may be the same as for printing text information), and the like. For video information, the layout and format information may indicate how the video information is to be represented on paper. According to an embodiment of the present invention, the printable representation of the video information includes keyframes that are extracted from the video information. In this embodiment, the layout and format information may specify the sampling rate for extracting the keyframes, the number of keyframes that are to be extracted from the video information, the order and placement of the keyframes on the paper medium, and other like information.

Likewise, for other types of information included in the multimedia information, the layout and format information specifies the manner in which the multimedia information is to be printed on the paper medium. Accordingly, the layout and format information specifies how printable representations are to be generated for each type of information included in the multimedia information stored by the multimedia document.

According to an embodiment of the present invention, the layout and format information is stored in the form of templates. The templates may be customized for a particular type of paper. For example, a first template may be defined for letter size paper and a second template different from the first template may be defined for A4 size paper. It should be apparent that one or more templates may be defined for each type and size of paper. If multiple templates are provided, the user may be allowed to select a particular template to be used for generating the printable representation. According to an embodiment of the present invention, information identifying a user-selected template may be included in the signal received in step 402. Default templates may also be specified. The user may also be allowed to create new templates, and to edit and modify previously configured templates. In this manner, the layout and format information is user-configurable.

The goal of a template (or layout and format information in general) is to generate a printable representation which when printed on a paper medium generates a readable and comprehensible multimedia paper document. In order to create a readable version, the templates may adhere to many of the basic guidelines designed and used by the newspaper industry. For instance, the use of special fonts, multiple columns and shorter lines of text along with line spacing, bolding and capitalization techniques, and other type-setting features used by the newspaper industry may be specified in the templates. The layout and format information thus contributes towards making the multimedia paper document more readable and comprehensible.

FIGS. 5A and 5B depict a sample template according to an embodiment of the present invention. The template is defined using XML syntax but could easily be represented in other ways. The template is designed for use with letter-size (8.5×11 inch) sheets of white 24-lb. paper. As defined in the template, each sheet is configured to contain one title zone, two text zones, and a video zone. The title zone specifies the zone or area of the paper medium where the title is to be printed and the manner in which the title is to be printed. The first text zone specifies the zone or area or section of the paper medium where the CC text included in the multimedia information is to be printed and the manner in which the CC text is to be printed. The second text zone specifies the zone or section of the paper medium where the Japanese translation of the CC text is to be printed and the manner in which the Japanese text is to be printed. It should be apparent that in alternative embodiments of the present invention, CC text included in the multimedia information and which is a continuation of the information printed in the first text zone may be printed in the second text zone. The video zone specifies the zone or area of the paper medium where the video information included in the multimedia document is to be printed and the manner in which the video is to be printed.

The template information in FIG. 5A specifies that the title zone (identified by "ZONE_ID 0") area is bounded by a rectangle whose left edge is located at a distance of 3 inches from the left margin of the page and whose right edge is located at a distance of 3 inches from the right margin of the page (i.e., the rectangle is 2.5 inches wide). The top edge of the title zone rectangle is located 0.75 inches from the top margin of the page and the bottom edge of the rectangle is located 9.6 inches from the bottom margin of the page (i.e., the rectangle is 0.65 inches high). The text in the title zone is configured to be English and is to be extracted from the header of the video clip. The title is configured to be printed in a 14 point, black Times font, and is centered within the title zone. The lines are to be single-spaced.

The first text zone (identified by "ZONE_ID 1") is also bounded by a rectangle whose left edge is located at a distance of 1.1 inches from the left margin of the page, whose right edge is located at a distance of 5.4 inches from the right margin of the page, whose top edge is located 1.5 inches from the top margin of the page, and whose bottom edge is located 1.0 inch from the bottom margin of the page. The text in the first text zone is to be printed in the English language. The origin of the text to be printed is defined to be CC text included in the multimedia information. The text is to be printed in a black 10 point Garamond font. Lines are to be single-spaced. Subject changes in the closed caption (which are usually indicated in the CC text by three greater-than signs ">>>") are to be shown by inserting a 1.5 line break and by bolding the first three words. Speaker changes (which are usually indicated in CC text by two greater-than signs ">>") are to be shown with a single-line break with no emphasis. Annotations (that indicate words in the transcript that occur in a user's profile) (described below in more detail) are to be shown with italicized text and blue underlining.

The second text zone (identified by "ZONE_ID 2") is also bounded by a rectangle whose left edge is located at a distance of 4.6 inches from the left margin of the page, whose right edge is located at a distance of 1.9 inches from the right margin of the page, whose top edge is located 1.5 inches from the top margin of the page, and whose bottom edge is located 1.0 inch from the bottom margin of the page. Unlike the first zone, the text in the second text zone is to be printed in Japanese. A translation source to facilitate the translation to Japanese is identified. The text is to be printed in a black 10 point AsianGaramond font. Lines are to be single-spaced. Subject changes in the closed caption text (which are usually indicated in CC text by three greater-than signs ">>>") are to be shown by inserting a 1.5 line break and by bolding the first three words. Speaker changes (which are usually indicated in CC text by two greater-than signs ">>") are to be shown with a single-line break with no emphasis. Annotations to words or phrases are to be shown with italicized text and blue underlining. Further details related to annotations are provided below.

The video zone (identified by "ZONE_ID 3") is also bounded by a rectangle whose left edge is located at a distance of 3.2 inches from the left margin of the page, whose right edge is located at a distance of 4.5 inches from the right margin of the page, whose top edge is located 1.5 inches from the top margin of the page, and whose bottom edge is located 1.0 inch from the bottom margin of the page. The source for the displayed data in the video zone is to be a set of keyframes that are generated by sampling the video channel of the multimedia information at a rate of 1 frame per second. Text in those frames is to be annotated by drawing a red box around it with line-width of 3-points. The keyframes are to be divided into sets of four. Each set is to be 0.4 inches wide and 0.3 inches high. The keyframes from each set are to be laid out within the video zone by sequentially packing them into the available space. Each group of four keyframes is to be annotated with an interleaved 2-of-5 barcode 0.8 inches wide and 0.15 inches high that appears underneath the group.

It should be apparent that the template depicted in FIGS. 5A and 5B is merely illustrative of an embodiment incorporating the present invention and does not limit the scope of the invention as recited in the claims. One of ordinary skill in the art would recognize other variations, modifications, and alternatives.

Referring back to FIG. 4, MIPSS 104 then generates a printable representation of the multimedia information stored in the multimedia document accessed in step 402 based upon the layout and format information determined in step 406 (step 408). Generating a printable representation for the multimedia document involves generating a printable representation for each type of information included in the multimedia information based upon the layout and format information.

If the signal received in step 402 requested generation of a multimedia paper document, MIPSS 104 may then print the printable representation of the multimedia information to generate the multimedia paper document (step 410). Alternatively, MIPSS 104 may communicate the printable representation of the multimedia information generated in step 408 to an output device 108 (e.g., a printer, a MFD, etc.) that is configured to generate the multimedia paper document (step 412). Other operations may also be performed on the printable representation of the multimedia information (step 414). For example, the printable representation may be stored for future generation of multimedia paper document, the information may be faxed, the information may be searched, indexed, annotated, etc., and the like.

Figure 6:
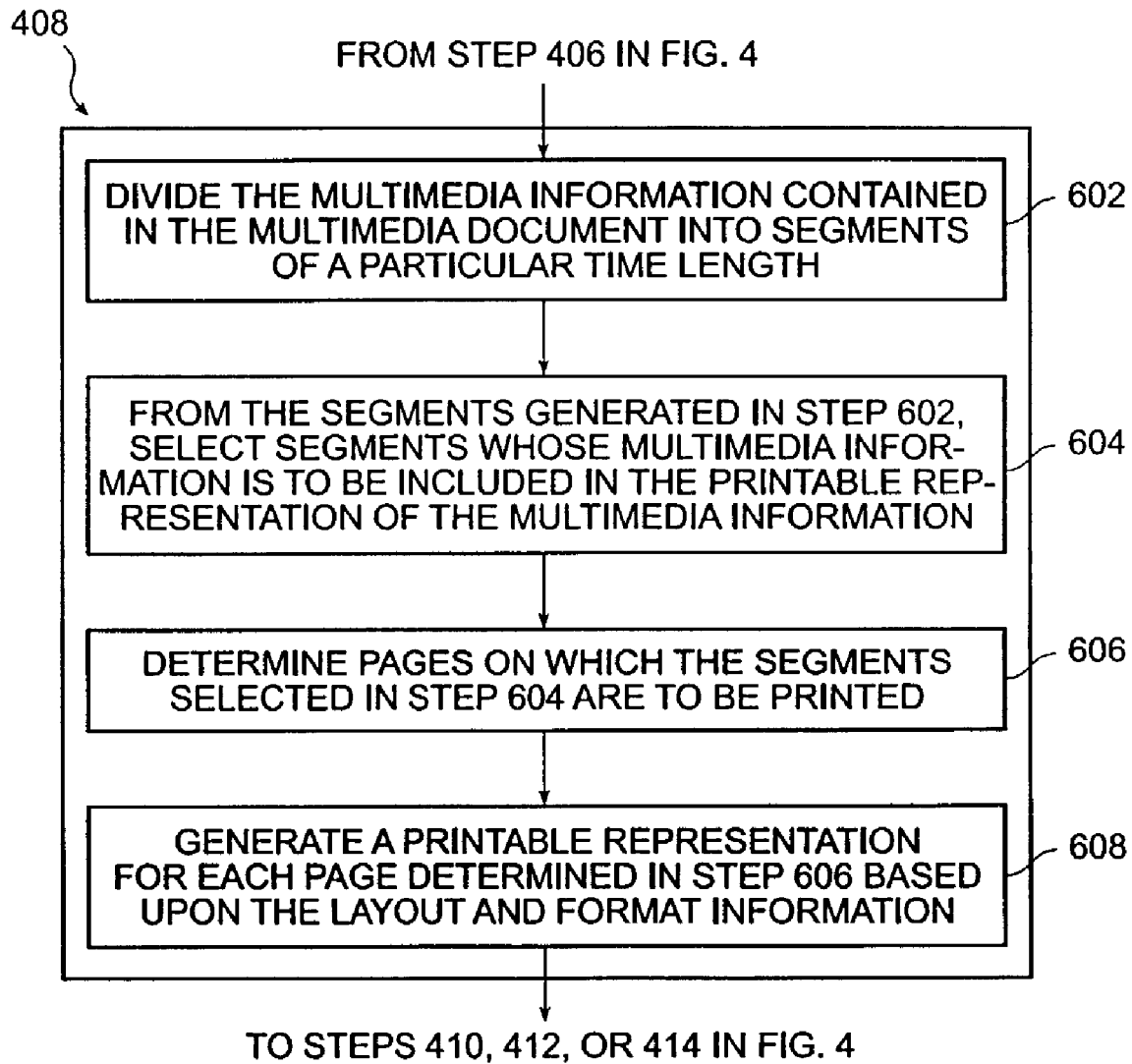
FIG. 6 is a simplified high-level flowchart depicting processing performed in step 408 of FIG. 4 according to an embodiment of the present invention.

FIG. 6 is a simplified high-level flowchart depicting processing performed in step 408 of FIG. 4 according to an embodiment of the present invention. The processing depicted in FIG. 6 may be performed by software modules executing on MIPSS 104, by hardware modules coupled to MIPSS 104, or a combination thereof. In alternative embodiments of the present invention, the processing may be distributed among the various systems depicted in FIG. 1. The processing depicted in FIG. 6 is merely illustrative of an embodiment incorporating the present invention and does not limit the scope of the invention as recited in the claims. One of ordinary skill in the art would recognize other variations, modifications, and alternatives.

As described above, in step 408 MIPSS 104 generates a printable representation of the multimedia information based upon the layout and format information determined in step 406. As part of the processing performed in step 408, MIPSS 104 divides or indexes the multimedia information contained by the multimedia document into sequential segments or portions of a particular time length (step 602). Each segment is characterized by a starting time and an ending time. Each segment comprises multimedia information occurring between the starting time and ending time associated with the segment. In other words, each segment or section comprises multimedia information for a specific time period.

A sequential list of segments represents the entire multimedia information stored in the multimedia document. For example, according to an embodiment of the present invention, a 10-second time period may be used for segmenting the multimedia information. Using the 10-second time period value, a 5-minute video recording may be divided into 30 segments or sections. The first segment comprises multimedia information for the first 10 seconds of the multimedia document, the second segment comprises multimedia information for the next 10 seconds, the third segment comprises multimedia information for the next 10 seconds, and so on. The value of the time period to be used for segmenting the multimedia document may be user-configurable.

From the segments generated in step 602, MIPSS 104 then selects a set of segments or portions of the multimedia document comprising multimedia information that is to be included in the printable representation of the multimedia information (step 604).

According to an embodiment of the present invention, all the segments generated in step 602 are selected to be included in the printable representation. According to other embodiments of the present invention, a subset of the segments generated in step 602 may be selected for inclusion in the printable representation of the multimedia information based upon some selection criteria. The selection criteria may be user configurable.

According to one such embodiment, MIPSS 104 may compare multimedia information stored by successive segments and only select those segments for inclusion in the printable representation that contain additional information relative to their preceding segment. In this manner, segments comprising repetitive or redundant information are not selected for inclusion in the printable representation. For example, there may be periods of time within a video recording wherein the audio or video content information does not change (e.g., during a period of "silence" or "blankness" on the video recording).

Segments comprising multimedia information corresponding to such periods of time may not be selected by MIPSS 104 in step 604.

According to another embodiment of the present invention, MIPSS 104 may select only those segments for inclusion in the printable representation that contain information relevant to the user who has requested generation of the printable representation.

For example, MIPSS 104 may select only those segments for inclusion in the printable representation that contain multimedia information related to user-specified topics of interest (which may be specified in a user profile). For example, a user may have specified an interest in all information related to topic "Afghanistan." In this embodiment, MIPSS 104 may scan the multimedia information contained by the various segments and select only those segments for inclusion in the printable representation that contain information related to Afghanistan. Various techniques known to those skilled in the art may be used to facilitate selection of the segments based upon their content and their relevance to user-specified topics.

According to another embodiment of the present invention, MIPSS 104 may apply a summarization technique to select segments to be included in the printable representation. Applying the summarization technique, only those segments that satisfy some selection criteria may be selected for inclusion in the printable representation. For example, for a multimedia document corresponding to an audio recording, MIPSS 104 may only select those segments for inclusion that contain the first sentence spoken by each speaker (or alternatively segments that contain the first line of each paragraph of CC text). This reduces the size of the printable representation and as a result reduces the number of pages needed to print the printable representation. Various other techniques known to those of skill in the art may also be used to determine which segments are to be included in the printable representation of the multimedia information.

MIPSS 104 then paginates the segments (i.e., determines on which page a particular segment is to be printed) selected in step 604 (step 606). According to an embodiment of the present invention, for each page starting with the first page, MIPSS 104 determines the segments to be printed on the page based upon the layout and format information which influences the amount of information that can be printed on a page. In this manner, MIPSS 104 determines the amount of multimedia information to be printed on each page and the total number of pages required to print the multimedia information stored in the multimedia document. For each page, MIPSS 104 determines the start time for information printed on the page (corresponding to the start time of the first segment printed on the page) and the end time for information printed on the page (corresponding to the end time of the last segment printed on the page).

The number of segments that can be printed on a particular page is influenced by the layout and format information and the contents of the segments. The size of the contents of each segment is in turn influenced by the time period used for segmenting the multimedia information stored in the multimedia document. For example, the amount of information stored by a segment is generally directly proportional to the value of the time period used for segmenting the multimedia document.

According to an embodiment of the present invention, for a given template storing the layout and format information and for a particular segmentation time period, the number of segments printed on a particular page is fixed for each page of the multimedia paper document. For example, based upon a particular template and a particular time period used for segmenting the multimedia information, MIPSS 104 may determine that multimedia information corresponding to "M" segments (where M>0) can be printed on each page of the multimedia paper document. Based upon this segments-per-page value, MIPSS 104 may then determine the total number of pages in the multimedia paper document and the segments to be printed on each page.

For example, for a 5-minute video recording which is divided into 30 segments using a 10-second segmentation value, and assuming that all segments are selected for inclusion in the printable representation in step 604, MIPSS 104 may determine that multimedia information corresponding to 12 segments will be printed per page of the multimedia paper document. Using this segments-per-page value, MIPSS 104 may determine that 3 pages $$\left(\left\lceil \frac{30}{12} \right\rceil = 3\right)$$

will be needed to print the multimedia information (i.e., the multimedia paper document will contain 3 pages). Multimedia information corresponding to segments 1–12 will be printed on the first page of the multimedia paper document, multimedia information corresponding to segments 13–24 will be printed on the second page of the multimedia paper document, and multimedia information corresponding to segments 25–30 will be printed on the last or third page of the multimedia paper document.

In alternative embodiments of the present invention, the number of segments printed on a particular page may vary from page to page of the multimedia paper document based upon the contents of the segments. In this embodiment, the number of segments to be printed on a particular page is influenced by the type and contents of multimedia information contained in the segments selected in step 604. In this embodiment, for each page, starting with the first page of the multimedia paper document, MIPSS 104 determines the number of selected segments (starting with the segment having the earliest starting time) which can be printed on each page. In this manner the number of segments that can be printed on a page are determined on a sequential page-per-page basis starting with the first page.

For example, for a 5-minute video recording which is divided into 30 segments using a 10-second segmentation value and assuming that all the segments are selected for inclusion in step 604, MIPSS 104 may determine that multimedia information corresponding to segments 1–10 can be printed on the first page, multimedia information corresponding to segments 11–25 can be printed on the second page of the multimedia paper document, and multimedia information corresponding to sections 25–30 can be printed on the third page of the multimedia paper document. Accordingly, in this embodiment of the present invention, the number of segments printed on each page of the multimedia document may vary from page to page based upon the contents of the segments to be printed. Various other techniques may also be used to determine how the selected segments will be printed.

MIPSS 104 then generates a printable representation for each page determined in step 606 based upon the layout and format information (step 608). As part of step 608, for each page, MIPSS 104 determines segments associated with that page, and generates printable representations for the various types of information included in the multimedia information corresponding to the segments. Various different techniques may be used by MIPSS 104 to generate printable representation for the various types of information included in the multimedia information.

For example, for CC text information included in the multimedia information, MIPSS 104 may apply the formatting styles specified by the layout and format information. For audio information, MIPSS 104 may generate a text transcript for the audio information by applying audio-to-text conversion techniques (which may also be specified in the layout and format information) and then apply the text formatting. For video information, MIPSS 104 may apply various keyframe extraction techniques (which may be specified in the layout and format information) to extract keyframes from the video information included in the selected segments of the multimedia information. According to an embodiment of the present invention, MIPSS 104 extracts keyframes that capture salient features of the video information (or keyframes that are informative) for a particular segment of the multimedia information. For example, images of faces are often quite informative. In choosing keyframes for a news broadcast, MIPSS 404 may select keyframes whose contents are different from the anchorperson. This increases the information conveyed by the keyframes.

Several other techniques known to those of skill in the art may also be applied by MIPSS 104 to generate a printable representation for the multimedia information. For example, the article "Key frame selection to represent a video," written by Frederic Dufaux and published in the Proceedings of the International Conference on Image Processing, Vancouver, 2000, describes techniques for selecting keyframes for representing a video. The entire contents of this article are herein incorporated by reference in their entirety for all purposes.

The printable representation of the multimedia information generated by MIPSS in step 408 may then be printed to generate a multimedia paper document, communicated to a device capable of generating a multimedia paper document, or subjected to other operations according to step 410, 412, or 414 depicted in FIG. 4.

Figure 7A:
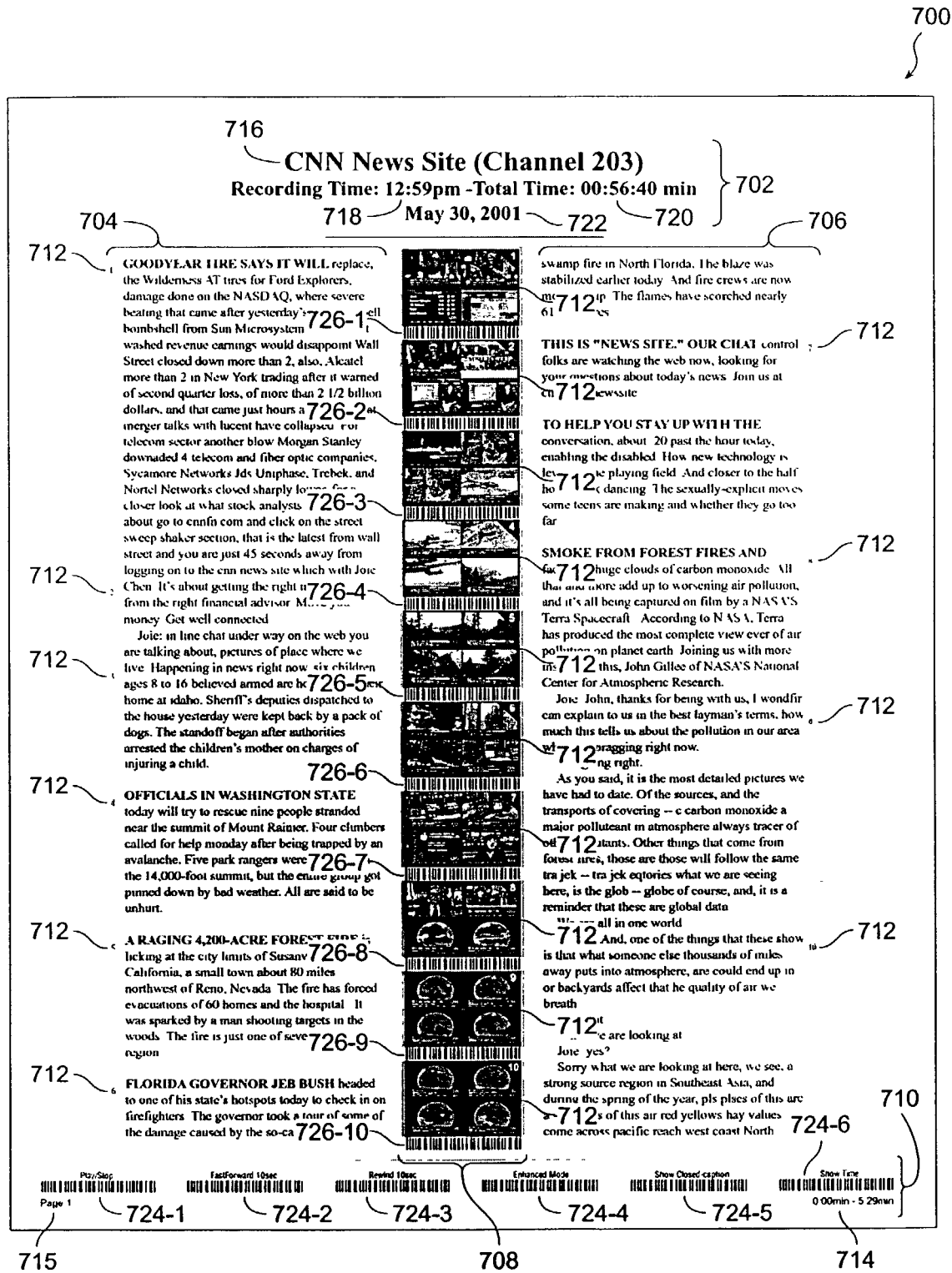
FIG. 7A depicts a page from a multimedia paper generated according to an embodiment of the present invention for a multimedia document.

FIG. 7A depicts a page 700 from a multimedia paper generated according to an embodiment of the present invention for a multimedia document. In the embodiment depicted in FIG. 7A, the multimedia document corresponds to a television broadcast recording. As depicted in FIG. 7A, page 700 comprises a title section 702, a first text section 704, a second text section 706, a video section 708, and a controls section 710. Page 700 depicted in FIG. 7A is merely illustrative of a multimedia paper document page according to an embodiment of the present invention and does not limit the scope of the invention as recited in the claims. One of ordinary skill in the art would recognize other variations, modifications, and alternatives.

Page 700 depicted in FIG. 7A is imprinted with multimedia information corresponding to ten segments. According to an embodiment of the present invention, identifiers 712 identifying the segments are displayed in text sections 702 and 704, and in video section 708. The segment identifiers are printed proximally close to information corresponding to the respective segments. Page 700 also displays time span information 714 that indicates the start time and end time corresponding to information printed on page 700. For example, the information printed on page 700 represents multimedia information recorded during the first 5:29 minutes of the recording. The page number 715 for each page is also displayed. Accordingly, page 700 depicted in FIG. 7A is the first page of the multimedia paper document.

As shown in FIG. 7A, title section 702 displays title information for the multimedia paper document. As depicted in FIG. 7A, the title information includes information identifying the source 716 of the multimedia information recording. According to an embodiment of the present invention, source information 716 corresponds to the name (e.g., filename) of the multimedia document for which the multimedia paper document has been generated. The title information displayed in section 702 also includes the time 718 when the multimedia document was recorded, the total time length 720 of the recording, and the date 722 of the recording. For example, page 700 is the first page from a multimedia paper document generated for "CNN News site (Channel 203)" television program which was recorded on May 30, 2001 starting at 12:59 PM and has a total length of 56 minutes and 40 seconds.

Text sections 704 and 706 display text information included in the multimedia document for which the multimedia paper document has been generated. In the embodiment depicted in FIG. 7A, text sections 704 and 706 display CC text included in the multimedia information. In alternative embodiments of the present invention, text sections 704 and 706 may display a transcript of the audio information included in the multimedia information.

Identifiers 712 are printed in (or next to) the text sections. According to an embodiment of the present invention, each identifier 712 printed on a page of the multimedia paper document identifies a segment of the multimedia document that is printed on the page. The segment identifiers are printed proximally close to information corresponding to the respective segments.

According to alternative embodiments of the present invention, identifiers 712 represent time points in the multimedia document. In this embodiment, identifiers 712 are printed proximal to information printed on a page that occurs close to the time corresponding to the identifier. For example, an identifier 712 printed on a particular page may represent a time in the time span for the particular page. For example, if the time span for a particular page is 0:00 min–5:29 min (e.g., time span of page 700 depicted in FIG. 7A), a particular identifier 712 may represent a time of 3:00 min, i.e., 3 minutes into the multimedia recording. The particular identifier is printed proximal to information that occurs at a time of 3 minutes into the multimedia recording.

In the embodiment depicted in FIG. 7A, text sections 704 and 706 display the CC text in the English language. However, in alternative embodiments of the present invention that support multiple languages, the text may be printed in various languages or combinations thereof. The languages used to print the text may be different from the language of the CC text included in the multimedia information or the language of the audio information included in the multimedia information. For example, the CC text associated with a video broadcast recording may be in English, but the text corresponding to the CC text printed on the multimedia paper document may be in a different language, for example, in Japanese (see FIG. 7D). Various different formats and styles may be used to print text in the various languages. For example, according to an embodiment of the present invention, English text may be printed in text section 704 depicted in FIG. 7A and the corresponding translated Japanese text may be printed in text section 706. In alternative embodiments, each line of English text printed in a text section may be followed by a Japanese translation of the text, and the like. Various other formats may also be used to print text in different languages. The translation of text from one language to another may be performed by MIPSS 104 or alternatively may be performed by some other service or application and then provided to MIPSS 104.

The present invention also takes advantage of the automatic story segmentation that is often provided in close-captioned (CC) text from broadcast news. Most news agencies who provide CC text as part of their broadcast use a special syntax in the CC text (e.g., a ">>>" delimiter to indicate changes in story line or subject, a ">>" delimiter to indicate changes in speakers, etc.) to indicate the beginning of a new story. Given the presence of this kind of information in the CC text transcript, the present invention can further enhance the contents of the paper document with newspaper layout techniques such as bolding and line spacing that typically signify a new story. For example, as depicted in FIG. 7A, the first line of each new story is bolded. Further, additional spacing is provided between text portions related to different story lines to clearly demarcate the different stories. This further enhances the readability of the multimedia paper document.

For each speaker identified in the CC text, information related to the speaker may be printed on page 700 (not shown). The information may include a name of the speaker, an address associated with the speaker, the tile (e.g., CEO, etc.) of the speaker, and other like information related to or identifying the speaker. The information may also include information printed on a business card of the speaker. The information related to the speakers may be determined from multimedia information stored in the multimedia document or may alternatively be determined from other information resources available to MIPSS 104.

According to an embodiment of the present invention, video section 708 displays keyframes extracted from the video information corresponding to the CNN News Site (Channel 203) news recording. As depicted in FIG. 7A, four keyframes have been extracted from the video information for each segment and displayed in video section 706. Identifiers 712 are printed in the upper right hand corner of each set of four keyframes. As described above, according to an embodiment of the present invention, identifiers 712 identify the segments from which the keyframes have been extracted. In alternative embodiments of the present invention, identifiers 712 may represent specific time points within the multimedia recording. The number of keyframes that are extracted from each segment and the number of keyframes printed on each page of the multimedia paper document for each segment are user configurable. For example, according to one embodiment of the present invention, only one keyframe may be displayed for each segment, and the like. As previously stated, several different keyframe extraction techniques known to those of skill in the art may be used to extract keyframes from the video information included in the multimedia information. Additionally, several different techniques known to those of skill in the art may be used to display one or more of the extracted keyframes.

As shown in FIG. 7A, identifiers 712 are printed in the text sections and also in the video section. A user may thus use identifiers 712 to correlate a portion of text printed in text sections 704 or 706 with a set of keyframes displayed in video section 708, and vice versa. For example, while a user is skimming the text section, the user may read a particular portion of text proximal to a particular identifier and locate keyframes related to or co-occurring with the particular portion of text using the particular identifier. Alternatively, the user may see an identifier for a particular keyframe (or set of keyframes) and use the identifier to locate text that describes what is being talked about at about the time that the keyframe(s) appeared in the video information. Identifiers 712 thus provide a sort of visual reference as well as a context for reading the text and the keyframes. This enhances the readability of the multimedia paper document.

User-selectable identifiers 726 are printed on page 700. In the embodiment depicted in FIG. 7A, user-selectable identifiers 726 are printed as barcodes. A barcode 726 is printed for each segment printed on page 700. For example, barcode 726-1 corresponds to segment 1, barcode 726-2 corresponds to the segment 2, barcode 726-3 corresponds to the segment 3, and so on. In alternative embodiments of the present invention, various other techniques, besides barcodes, may be used to represent the user-selectable identifiers. As will be discussed below in further details, user-selectable identifiers 726 provide a mechanism for the reader of the multimedia paper document to access or retrieve multimedia information using the multimedia paper document.

In alternative embodiments of the present invention where identifiers 712 represent specific time points in the multimedia information recording, barcodes 726 may be correlated to identifiers 712 and may also correspond to specific time points in the multimedia information recording. According to an embodiment of the present invention, barcodes 726 may correspond to the same time points as identifiers 712. Further details related to user-selectable identifiers 726 are provided below. User-selectable identifiers 726 are printed in a manner that does not reduce or affect the overall readability of the multimedia paper document.

As depicted in FIG. 7A, controls section 710 displays a plurality of barcodes 724 corresponding to controls that may be used by a user to control playback of multimedia information corresponding to user-selected segments. Further details related to controls section 710 are provided below. Barcodes 724 are printed in a manner that does not reduce or affect the overall readability of the multimedia paper document.

Figure 7B:
FIG. 7B depicts a second page that follows the page depicted in FIG. 7A in a multimedia paper document according to an embodiment of the present invention.

FIG. 7B depicts a second page 750 that follows page 700 depicted in FIG. 7A in a multimedia paper document according to an embodiment of the present invention. Title section 702 is not displayed on page 750. Page 750 displays text and keyframes corresponding to 11 segments (as compared to page 700 wherein information corresponding to 10 segments is displayed) of the multimedia document. The information displayed on page 750 corresponds to multimedia information corresponding to 5:29 minutes through 11:30 minutes of the recording (as indicated by time span information 714).

Figure 7C:
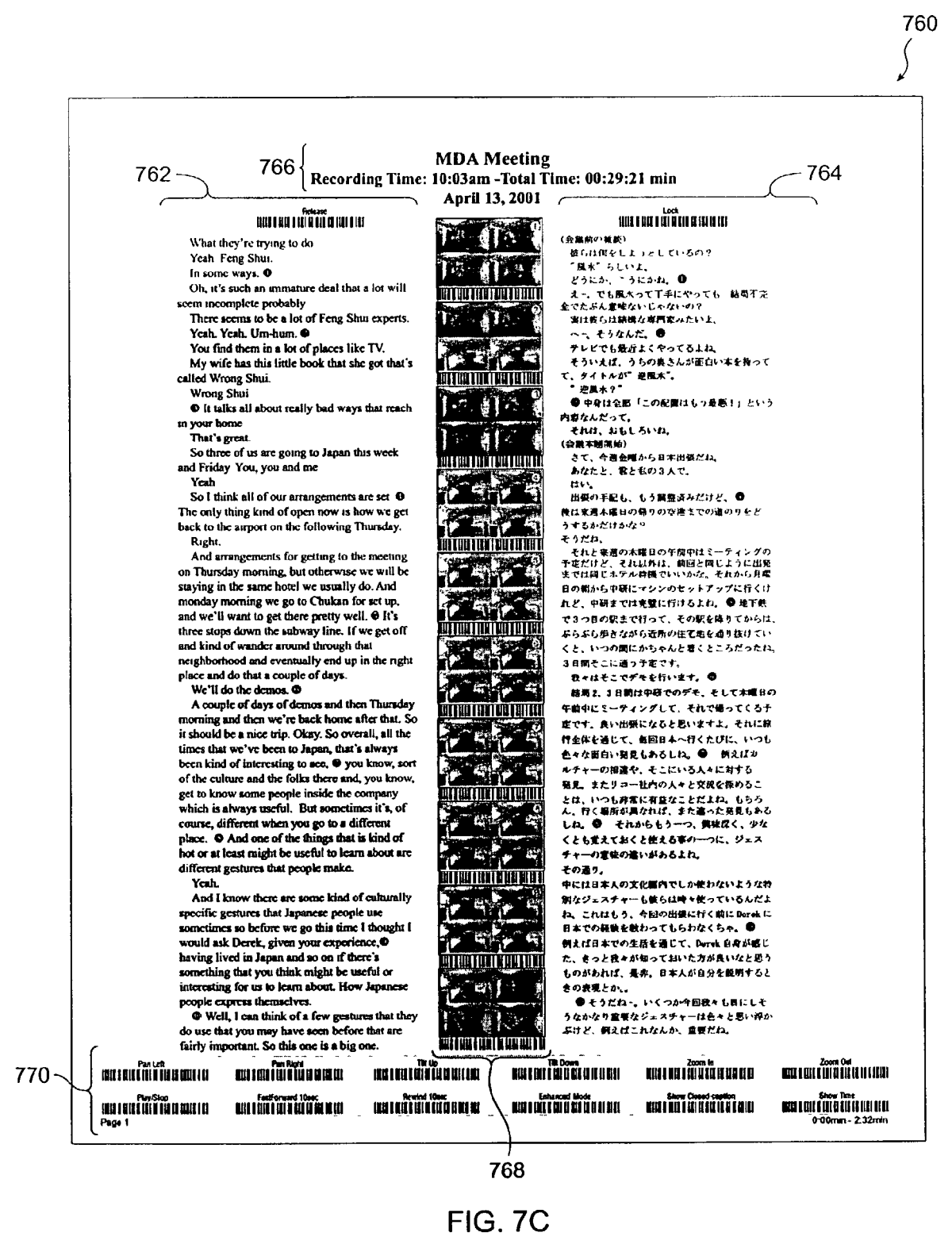

FIG. 7C depicts a page 760 from a multimedia paper document generated according to an embodiment of the present invention for a multimedia document. Page 760 depicted in FIG. 7C corresponds to a page from a multimedia paper document generated for multimedia information recorded during a meeting. Information identifying the meeting is printed in title section 766. As depicted in FIG. 7C, page 760 comprises a first text section 762, a second text section 764, a video section 768, and a controls section 770.

Closed-caption text (or a text transcript of the audio information) included in the multimedia document is printed in text section 762. A Japanese translation of the text printed in text section 762 is printed in text section 764. This is different from pages 700 and 750 depicted in FIGS. 7A and 7B, respectively, wherein CC text was printed in both the text sections. For example, in FIG. 7A, the CC text printed text section 706 is a continuation of the text printed in text section 704. Various translation resources may be used to generate the Japanese translation printed in section 764 of FIG. 7C. It should be apparent that in alternative embodiments, the CC text may be translated to other languages and printed in a multimedia paper document.

Page 760 depicted in FIG. 7C is merely illustrative of a multimedia paper document page according to an embodiment of the present invention and does not limit the scope of the invention as recited in the claims. One of ordinary skill in the art would recognize other variations, modifications, and alternatives.

Given a multi-paged multimedia paper document comprising pages of the type depicted in FIG. 7A, 7B, or 7C, a reader can quickly skim the contents of the multimedia paper document to see if anything relevant might be present in the multimedia information for which the multimedia paper document was generated. The time required to skim and comprehend information printed in the multimedia paper document will be much smaller than the time the user would otherwise have to spend viewing the multimedia information (e.g., new broadcast recording). The present invention thus allows the user to save valuable time when "reading" multimedia information.

Figure 8A:
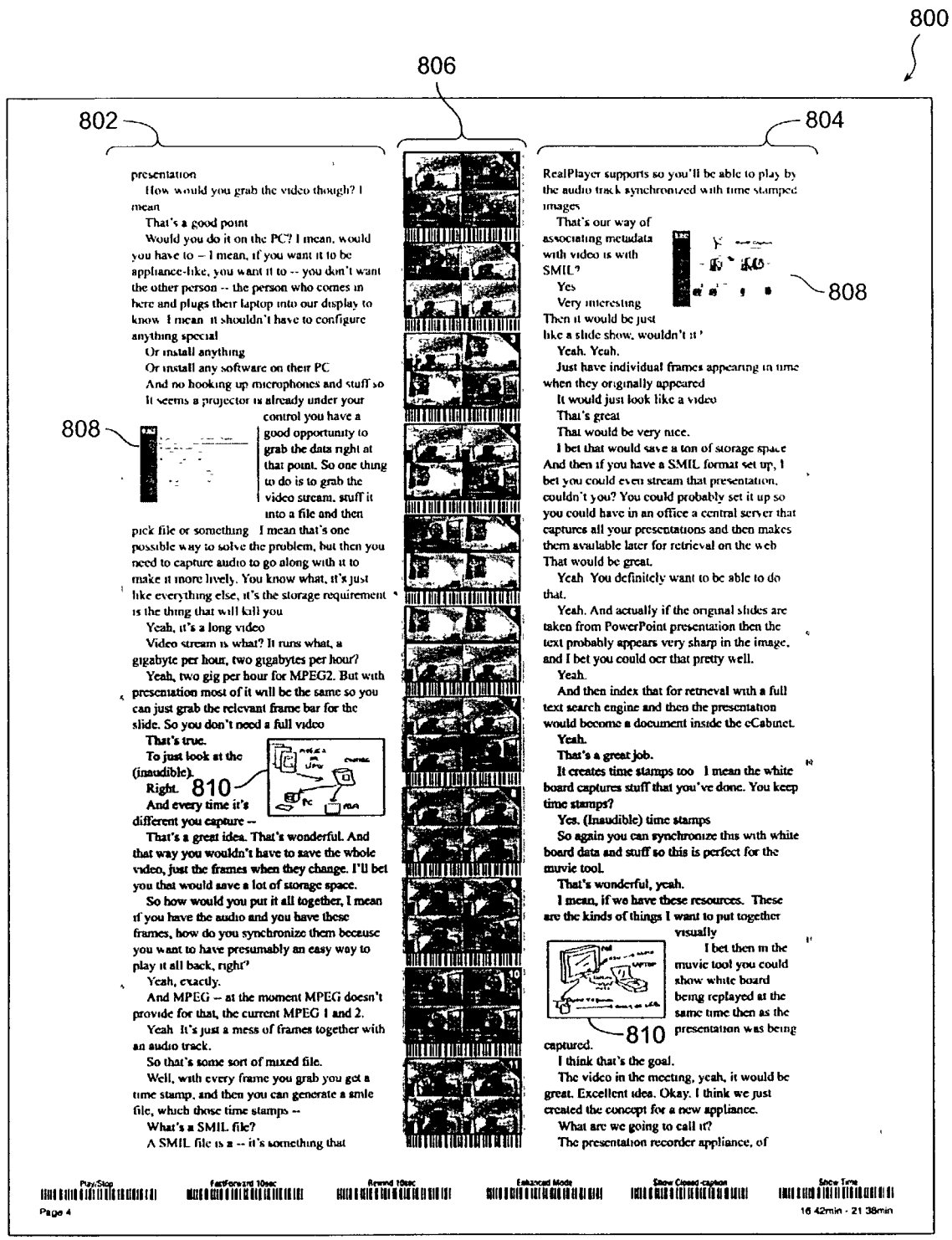
FIGS. 8A, 8B, and 8C depict pages from a multimedia paper document generated for a recorded meeting according to an embodiment of the present invention.

FIG. 8A depicts a page 800 from a multimedia paper document generated for a recorded meeting according to an embodiment of the present invention. Page 800 depicted in FIG. 8A is merely illustrative of a page from a multimedia paper document and does not limit the scope of the invention as recited in the claims. One of ordinary skill in the art would recognize other variations, modifications, and alternatives.

The recorded meeting for which page 800 is generated may store multimedia information that includes video information, audio information, slides information, and whiteboard information. Techniques for recording meetings has been described in U.S. Non-Provisional patent application Ser. No. 09/728,560, filed Nov. 30, 2000, and U.S. Non-Provisional patent application Ser. No. 09/728,453, filed Nov. 30, 2000.

Figure 8B:
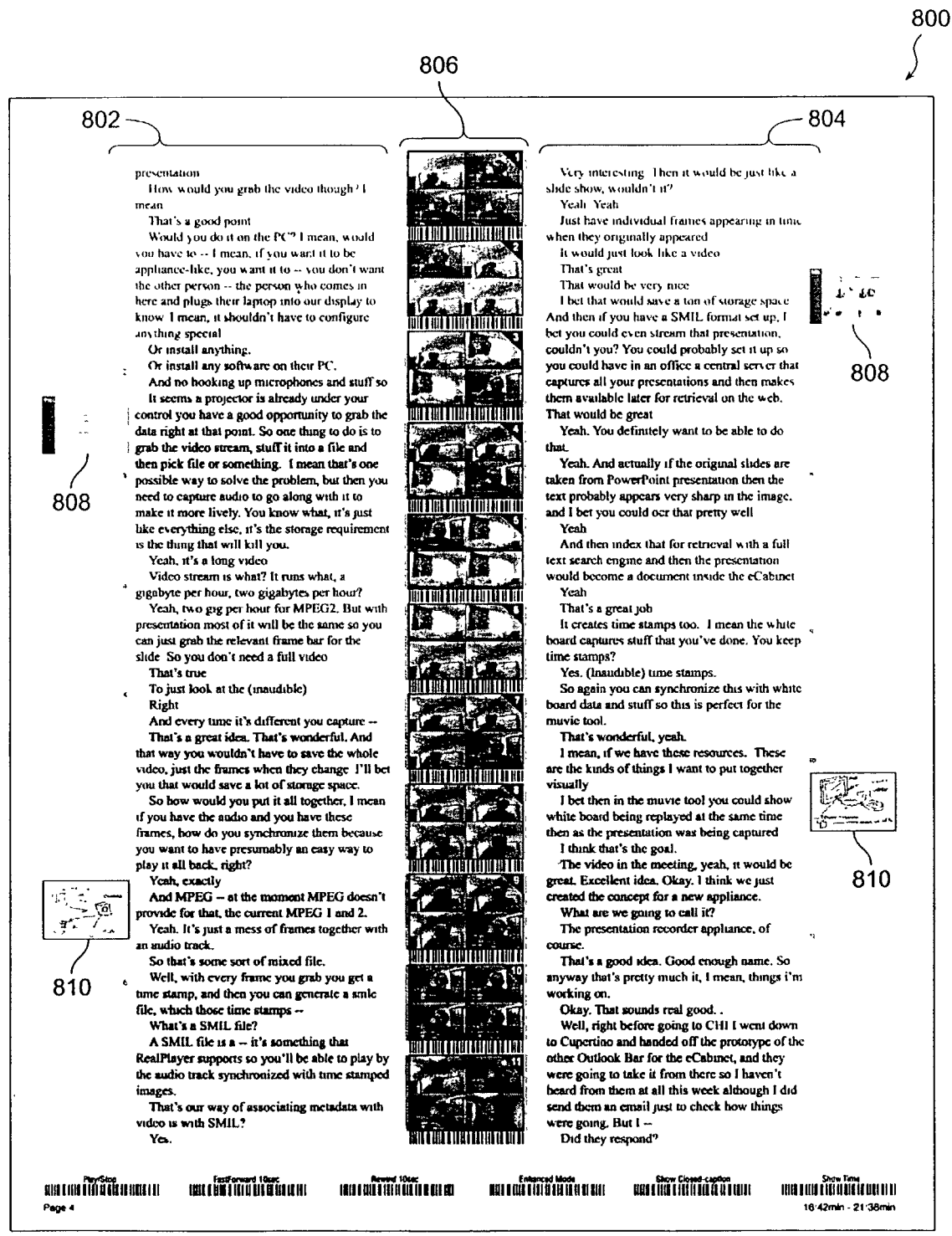

The slides information included in a recorded meeting may comprise information related to slides (e.g., a PowerPoint presentation slides) presented by the presenter during the meeting. The whiteboard information may comprise information related to text and drawings drawn on a whiteboard during the meeting. Accordingly, in addition to text (which may correspond to a transcript of the audio information) and video information, slides information and whiteboard information are also included in the printable representation of the recorded meeting. The text, video, slides, and whiteboard information may then be printed on a paper medium as depicted in FIG. 8. Accordingly, the text information is printed in sections 802 and 804, video information is printed in section 806, and slides 806 and whiteboard images 808 are printed inline with the text sections.

According to an embodiment of the present invention, during generation of the printable representation for the recorded meeting, MIPSS 104 synchronizes the slides information and whiteboard information with the audio and video information using timestamps associated with the various types of information. When the multimedia information corresponding to the recorded meeting is divided into segments, each segment may comprise text information, video information, slides information, and whiteboard information. When the multimedia paper document is generated, one or more slides are then printed in close proximity to the identifier of a segment that contains slides information related to the printed slides. The slides are thus printed close to when they were presented. Likewise, images of the whiteboard are printed in close proximity to the identifier of a segment that contains the whiteboard information. The whiteboard images are thus printed close to when they were presented. In the embodiment depicted in FIG. 8A, the slides and whiteboard images are printed inline with the text sections.

Figure 8C:
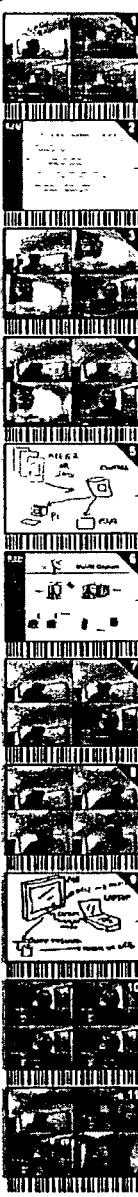

Various different layout and format guidelines may be used for printing the slides and whiteboard information. For example, in FIG. 8B, slides 808 and whiteboard images 810 are printed in the margins of the multimedia paper document next to text sections 802. FIG. 8C shows yet another layout pattern for printing the slides and whiteboard information. In FIG. 8C, the slides and whiteboard images are superimposed on video keyframes belonging to the segments to which the slides and whiteboard images belong.

As described above, audio information included in multimedia information stored by a multimedia document is displayed in the form of a text transcript of the audio information. According to an embodiment of the present invention, various other features of the audio signal included in the multimedia information may also be represented in the printable representation of the multimedia document. According to an embodiment of the present invention, visual markers are used to represent the various features and when printed on a paper medium improve the overall readability and understandability of the multimedia paper document.

Figure 9A:
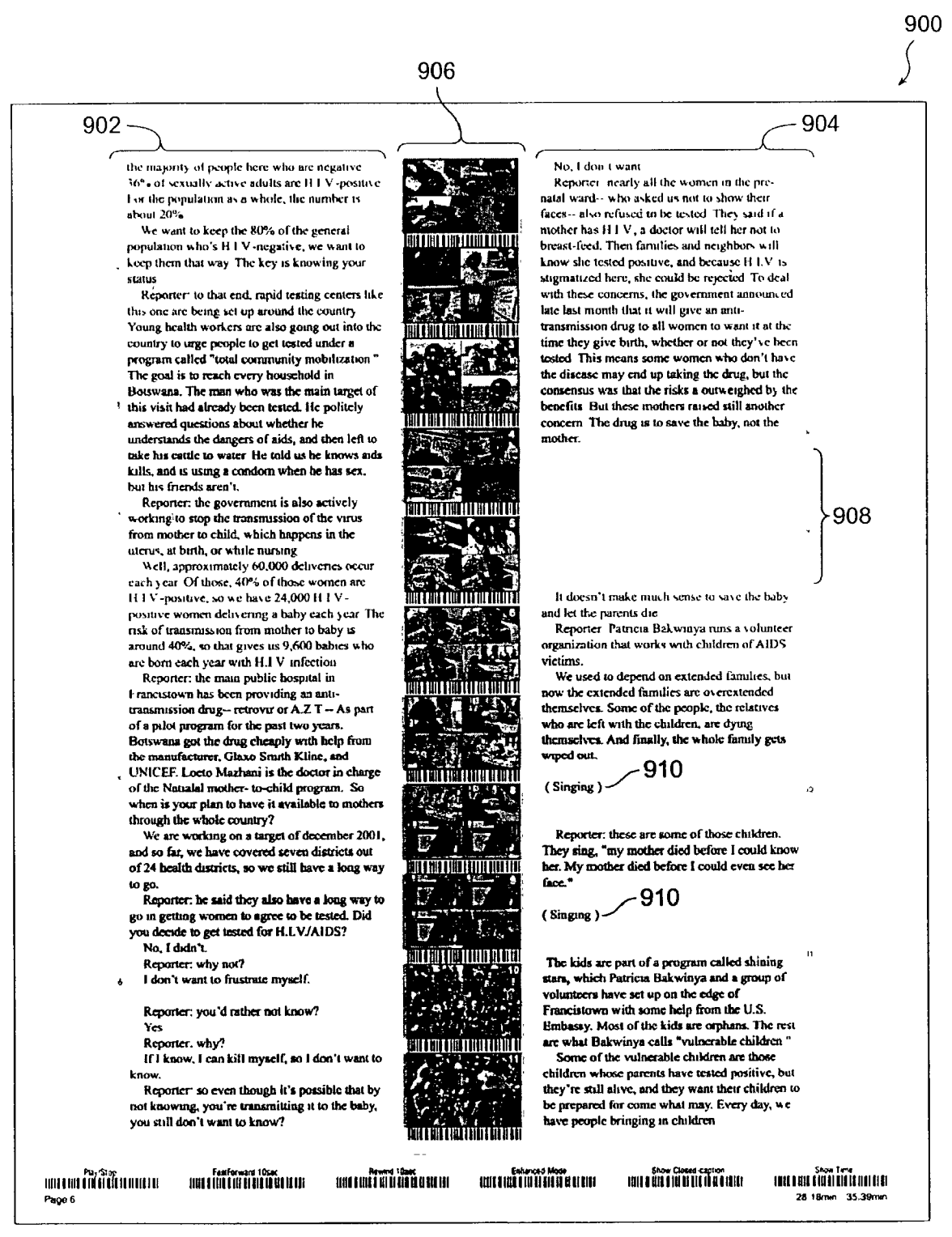

For example, FIG. 9A depicts a page 900 from a multimedia paper document displaying visual markers to denote various attributes of the audio information or of the CC text information included in the multimedia information for the multimedia document for which the multimedia paper document is generated according to an embodiment of the present invention. Page 900 depicted in FIG. 9A is merely illustrative of a multimedia paper document page according to an embodiment of the present invention and does not limit the scope of the invention as recited in the claims. One of ordinary skill in the art would recognize other variations, modifications, and alternatives.

As depicted in FIG. 9A, a gap or white space 908 is shown in text section 904 corresponding to one more segments that do not contain any CC text information but may comprise other types of information (e.g., video information) which is printed on the page (e.g., keyframes in video section 906). The gap may represent a section of the recording wherein there is no audio or CC text. Alternatively, the gap may represent a section of the recording where there is no CC text and the audio information during the section cannot be translated to text. For example, someone is speaking in a foreign language for which an English translation is not available. The length of gap 908 may be proportional to the length of the empty CC text or absence of audio information. If the multimedia information does not include both the audio information and the CC text for a specified time period, a visual marker such as "SILENCE" may be printed in gap 908.

The video information during a gap in the CC text or audio information may still contain important information and is thus displayed as keyframes in video section 906. For example, if someone is speaking in a foreign language for which an English translation is not available for display in the text section, the video during this period may display text (e.g., subtitles) corresponding to what is being spoken. Accordingly, keyframes displaying the text may be printed in video section 906 while a gap is printed in the text section. According to one embodiment of the present invention, the text images may be extracted from the video keyframes during the gap period and printed in gap 908. For example, as depicted in FIG. 9B, text images 920 have been extracted from video keyframes corresponding to the gap period, and the extracted text images 920 are printed in gap space 908. According to yet another embodiment of the present invention, optical character recognition (OCR) techniques may be applied to the video keyframes for the gap period and the results of the OCR may be printed in gap space 908. For example, as depicted in FIG. 9C, OCR techniques have been applied to the video keyframes during the gap period, and the resultant OCRed text 930 (which may contain spelling errors) is printed in gap 908.

Other features of the audio information may also be represented via visual markers printed on the multimedia paper document. For example, features of audio information such as people singing, multiple people talking at the same time, people arguing, speaking in soothing tones, significant increases in audio volumes, periods of silence (described above) etc. can be identified and represented in the multimedia paper document using visual markers. For example, as depicted in FIG. 9A, visual markers "(Singing)" 910 are printed where the audio information contains people singing. The visual markers thus make it easy for the reader of the multimedia paper document to quickly locate such parts of the audio in the multimedia document.

Several different techniques known to those skilled in the art may be used to identify special features of the audio information in the multimedia information. The following references discuss a few techniques that may be used to identify features of audio signals. The entire contents of the following references are herein incorporated by reference for all purposes:

(1) L. S. Chen, H. Tao, T. S. Huang, T. Miyasato, R. Nakatsu, "Emotion Recognition from Audiovisual Information," Proc. IEEE Workshop on Multimedia Signal Processing, Los-Angeles, Calif., USA, pp. 83–88, 1998;

(2) K. Sonmez, L. Heck, M. Weintraub, "Multiple Speaker Tracking and Detection: Handset Normalization and Duration Scoring," Digital Signal Processing, 10(1/2/3), 133–143, 2000; and (3) F. Dellaert, T. Polzin, A. Waibel, "Recognizing emotion in speech." Proceedings ICSLP 96. Fourth International Conference on Spoken Language Processing (Cat. No.96TH8206). IEEE. Vol.3, pp. 1970–1973, 1996. New York, N.Y., USA.

As described above, video information included in multimedia information stored by a multimedia document is displayed in the form of one or more keyframes extracted from the video information and printed on the multimedia paper document. According to an embodiment of the present invention, various other features of the video information included in the multimedia information may also be represented in the printable representation of the multimedia document. According to an embodiment of the present invention, visual markers may be used to represent the various features of the video information and when printed on a paper medium improve the overall readability and understandability of the multimedia paper document.

For example, features that can be recognized from video information may include faces, facial expressions of speakers depicted in the video (e.g., a facial expression indicating anger), recognition of speakers, hand gestures, logos or signs displayed in the video, presence of certain buildings or geographical locations, meetings, animals, crowds, and the like. According to an embodiment of the present invention, these features are recognized from the video information and represented in the multimedia paper documents using visual markers. For example, expressions (e.g. "Anger," "Laughter", etc.), geographical locations, special building names, etc. can be shown with a text-based annotation next to the corresponding video keyframe. Speaker face recognition results may be shown with the name of the speaker printed next to a keyframe depicting the speaker. Logos and signs recognized from the video can be displayed or the names of companies corresponding to the logos may be displayed.

Several different styles and formats may be used to display the visual markers for the video features. According to an embodiment of the present invention, the layout and format information may specify the styles or formats are to be used. For example, the visual markers for the video information may be displayed close to keyframes corresponding to the visual markers, or in the margins of the multimedia paper document. In alternative embodiments, the visual markers may be displayed interspersed with the text section information. Different types of fonts may be used to display the visual markers. The visual markers thus make it easy for the reader of the multimedia paper document to quickly locate such parts of the video in the multimedia document.

The text displayed in the text sections of a multimedia paper document (e.g., text sections 704 and 706 depicted in FIG. 7A) may also be modified based upon recognition of certain video features. For example, text printed in the text section and spoken by a particular speaker may be highlighted, and the like.

Several different techniques known to those skilled in the art may be used to identify special features of the video information in the multimedia information. The following references discuss a few techniques that may be used to identify features of the video data. The entire contents of the following references are herein incorporated by reference for all purposes:

(1) A. Essa, A. P. Pentland, Coding Analysis Interpretation and Recognition of Facial Expressions, IEEE Trans. on Pattern Analysis and Machine Intelligence, vol. 19, no. 7, pp. 757–763, 1997;

(2) G. Donato, M. Bartlett, J. Hager, P. Eknian, and T. Sejnowski, Classifying Facial Actions, IEEE Trans. on Pattern Analysis and Machine Intelligence, vol. 21, no. 10, pp. 974–989, October 1999;

(3) A. F. Bobick, A. D. Wilson, A State based approach to the representation and recognition of gesture, IEEE Trans. on Pattern Analysis and Machine Intelligence, pp. 1325–1337, 1997;

(4) H. A. Rowley, S. Baluja, T. Kanade, "Neural network-based face detection," IEEE Transactions on Pattern Analysis and Machine Intelligence, v. 20, no. 1, 23–38, 1998;

(5) D. S. Doermann, E Rivlin, and I. Weiss. Applying algebraic and differential invarients for logo recognition. Machine Vision and Applications, 9(2):73–86, 1996;

(6) H. Li, D. Doermann, and O. Kia. Automatic Text Detection and Tracking in Digital Video. IEEE Transactions on Image Processing—Special Issue on Image and Video Processing for Digital Libraries, 9(1), pages 147–156, 2000;

(7) P. Suda, C. Bridoux, B. Kammerer, G. Manderlechner, "Logo and word matching using a general approach to signal registration," Fourth International Conference on Document Analysis and Recognition, Ulm, Germany, Aug. 18–20, 1997, 61–65;

(8) H. Li, D. Doermann, and O. Kia. Text Extraction and Recognition in Digital Video. Proceedings of Third IAPR Workshop on Document Analysis Systems, pages 119–128, 1998;

(9) Face recognition techniques described at web site "www.visionics.com"; and

(10) Ioffe, S. I. and Forsyth, D. A., Finding people by sampling, Proc. International Conference on Computer Vision, p. 1092–7, 1999.

Various other features of the multimedia information may also be detected and represented in the printable representation of the multimedia document (or on the multimedia paper document when printed), using special visual markers. For example, the presence of a commercial in the multimedia information may be detected and information corresponding to the commercial printed on the paper medium (e.g., keyframes corresponding to the commercial, portions of text sections corresponding to the commercial, etc.) may be visually demarcated (e.g., by using a special font, drawing boxes around the printed information, etc.). As another example, sections of the multimedia information including multiple individuals talking within a user-configurable length of time may be identified and specially marked in the multimedia paper document. For example, a user may like to see parts of the multimedia information where more than 3 different people speak within a 1-minute period. This information may be highlighted in the multimedia paper document.

Several different techniques known to those skilled in the art may be used to identify special features of the video information in the multimedia information. The following reference discusses a few techniques that may be used to identify features of the video data. The entire contents of the following reference are herein incorporated by reference for all purposes.

(a) Rainer Lienhart, Christoph Kuhmünch and Wolfgang Effelsberg. On the Detection and Recognition of Television Commercials, Proc. IEEE Conf. on Multimedia Computing and Systems, Ottawa, Canada, pp. 509–516, June 1997.

Annotating Multimedia Information

According to the teachings of the present invention, the printable representation for a multimedia document may be annotated to identify locations of information in the multimedia document that may be of interest to the user. The multimedia paper document generated by printing the annotated printable representation on a paper medium displays the annotations. The annotations provide visual indications of information relevant or of interest to the user. For example, information printed in the multimedia paper document that is relevant to topics of interest specified by a user may be annotated or highlighted. In this manner, the multimedia paper document provides a convenient tool that allows a user to readily locate portions of the multimedia paper document that are relevant to the user. Since the multimedia paper document comprises a printable representation of multimedia information, the multimedia paper document generated according to the teachings of the present invention allows the user to identify portions of multimedia information that are of interest to the user.

According to an embodiment of the present invention, information specifying topics of interest to the user may be stored in a user profile. One or more words or phrases may be associated with each topic of interest. Presence of words and phrases associated with a particular user-specified topic of interest indicates presence of information related the particular topic. For example, a user may specify two topics of interest—"George Bush" and "Energy Crisis". Words or phrases associated with the topic "George Bush" may include "President Bush," "the President," "Mr. Bush," and other like words and phrases. Words or phrases associated with the topic "Energy Crisis" may include "industrial pollution," "natural pollution," "clean up the sources," "amount of pollution," "air pollution", "electricity," "power-generating plant," and the like. Probability values may be associated with each of the words or phrases indicating the likelihood of the topic of interest given the presence of the word or phrase. Various tools may be provided to allow the user to configure topics of interest, to specify keywords and phrases associated with the topics, and to specify probability values associated with the keywords or phrases.

According to an embodiment of the present invention, after generating a printable representation of multimedia information stored in a multimedia document (in step 408 of FIG. 4), MIPSS 104 accesses the user profile information and determines topics of interest specified in the user profile and keywords and phrases associated with the topics of interest. MIPSS 104 then searches the printable representation of the multimedia information to identify locations within the printable representation of words or phrases associated with the topics of interest. As described above, presence of words and phrases associated with a particular user-specified topic of interest indicates presence of the particular topic relevant to the user. According to one embodiment of the present invention, MIPSS 104 searches the text sections included in the printable representation of a multimedia document to locate words or phrases associated with the user topics. If MIPSS 104 finds a word or phrase in the printable representation that is associated with a topic of interest, the word or phrase is annotated in the printable representation. Several different techniques may be used to annotate the word or phrase. For example, the word or phrase may highlighted, bolded, underlined, demarcated using sidebars or balloons, font may be changed, etc. The annotations are then printed on the multimedia paper document generated by printing the annotated printable representation of the multimedia information.

According to an embodiment of the present invention, MIPSS 104 may also highlight keyframes (representing video information of the multimedia document) related to user specified topics of interest. According to an embodiment of the present invention, MIPSS 104 may use OCR techniques to extract text from the keyframes included in the printable representation of the multimedia information. The text output by the OCR techniques may then be compared with words or phrases specified in a user's profile. If there is a match, the keyframe corresponding to the matched word or phrase (i.e., the keyframe from which the matching word or phrase was extracted) may be annotated in the printable representation. Several different techniques may be used to annotate the keyframe. For example, a special box may surround the keyframe, the matching text in the keyframe may be highlighted or underlined or displayed in reverse video, and the like. The keyframe annotations are then printed on the multimedia paper document generated by printing the annotated printable representation of the multimedia information.

According to another embodiment of the present invention, MIPSS 104 may identify information stored by the multimedia document that is relevant to user-specified topics of interest even before the printable representation for the multimedia document has been generated. In this embodiment, MIPSS 104 analyzes the multimedia information stored in the multimedia document to identify information relevant to user-specified topics of interest. For example, MIPSS 104 may analyze the video information contained in the multimedia document to identify video frames that contain information relevant to user-specified topics of interest. Various different techniques, e.g., OCR techniques, known to those skilled in the art may be used to analyze the video information. MIPSS 104 may analyze the audio or closed-caption text information included in the multimedia document to identify sections of the information that include information relevant to user-specified topics of interest. For example, MIPSS 104 may generate a text transcript of the audio information and then analyze the text transcript to identify presence of words or phrases related to the user-specified topics of interest. Likewise, the CC text may also be analyzed. Other types of information (e.g., slides information, whiteboard information, etc.) included in the multimedia information stored by the multimedia document may also be analyzed. As previously stated, various analysis techniques known to those skilled in the art may be used to analyze the multimedia information stored by the multimedia document. MIPSS 104 may then generate a printable representation for the multimedia document and annotate information in the printable representation that was deemed relevant to one or more user-specified topics of interest. The multimedia paper document generated by printing the annotated printable representation displays the annotations.

Figure 10:
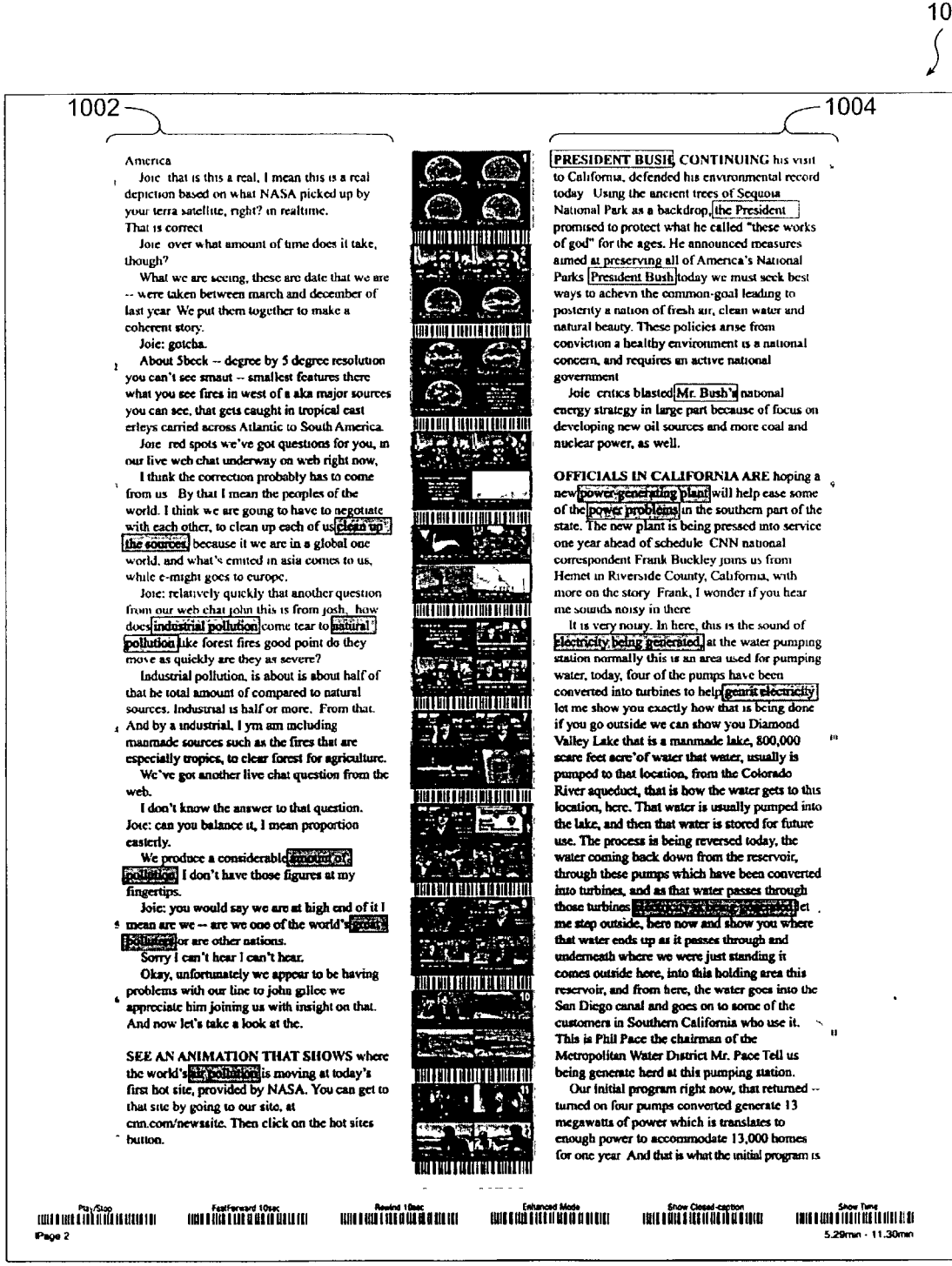
FIG. 10 depicts a page from a multimedia paper document whose contents have been annotated according to an embodiment of the present invention.

FIG. 10 depicts a page 1000 whose contents have been annotated according to an embodiment of the present invention. Page 1000 depicted in FIG. 10 is merely illustrative of a multimedia paper document page and does not limit the scope of the invention as recited in the claims. One of ordinary skill in the art would recognize other variations, modifications, and alternatives. As depicted in FIG. 10, words and phrases related to topics of interest are highlighted in text sections 1002 and 1004. For the embodiment depicted in FIG. 10 it is assumed that two topics of interest, namely "George Bush" and "Energy Crisis", have been specified. Keywords and phrases related to these topics of interest are highlighted. Different colors and styles (e.g., bolding, underlining, different font size, etc.) may be used to highlight words and phrases related to different topics. For example, as depicted in FIG. 10, a first color is used to highlight words and phrases related to the "George Bush" topic of interest and a second color is used to highlight words and phrases related to the "Energy Crisis" topic of interest.

According to an embodiment of the present invention, in addition to highlighting information relevant to topics of interest, the present invention may also determine and display a relevancy score for each topic of interest. The relevancy score calculated for a particular topic of interest indicates the relevancy of the information printed in the multimedia paper document to that particular user topic. The relevancy score for a topic of interest thus indicates the degree of relevancy of the multimedia information represented by the multimedia paper document to the topic of interest. According to an embodiment of the present invention, the relevancy score for a particular topic may be calculated based upon the frequency of occurrences of the words and phrases associated with the particular topic in the multimedia paper document.

The relevancy scores for the topics may be included in the printable representation of the multimedia document and printed on the multimedia paper document. A reader or user could then use the relevancy score printed on the multimedia paper document as a guide to determine relevancy of the multimedia information to the user topics. For example, if multiple multimedia paper documents have been generated for a plurality of news broadcasts, based upon the relevancy scores printed on the multimedia paper documents for the various broadcasts, a user can easily determine the news broadcast that is most relevant to the user for any given user topic.

According to an embodiment of the present invention, information stored in a user's profile and words or phrases related to user-specified topics of interest detected in the text section (CC text or transcript of audio information) may also be used to select keyframes from the video information that are relevant to the user-specified topics of interest. Since only a limited number of keyframes can be printed on the multimedia paper document due to limited amount of space available on a multimedia paper document page, selection of keyframes relevant to the user improves the readability of the document for the user.

As described above, a user profile may be configured by a user and may store information identifying one or more topics of interest to the user. One or more words or phrases may be associated with each topic of interest such that presence of the words and phrases associated with a particular topic of interest indicates presence of information related to the particular topic. According to an embodiment of the present invention, probability values may be associated with each of the words or phrases indicating the likelihood of the topic of interest given the presence of the word or phrase. In order to facilitate selection of relevant keyframes, the user profile also stores information about features of the video information (or of the keyframes) that the user would like the present invention to search for in the video information when a word or phrase related to a topic is found in the text section.

As previously described, several different features can be recognized from the video information. These features may include recognition of a human face, buildings, geographical locations, presence of a crowd, hand gestures, logos or signs, meetings, animals, text, and the like. Various algorithms known to those skilled in the art may be used to detect the features from the video information. For each of the features stated above, techniques that recognize video features may also be used to identify specific instances of a feature. For example, if a face is identified in a video frame, face recognition techniques may be applied to determine the identity of the face (i.e., a specific instance of a face). Likewise, if a logo was identified in a video frame, techniques may be applied to determine the name of the company corresponding to the logo. Similarly, if a building was identified in a video frame, techniques may be applied to determine if the building was a specific building such as the Empire State Building. Likewise, if an animal was identified in a video frame, techniques may be applied to determine the type (e.g., horse, cat, dog, etc.) of animal.

As part of a user's profile, the user may specify one or more video features (and specific instances of the features where appropriate) to be associated with one or more topics of interest. According to an embodiment of the present invention, the video features may be associated with keywords or phrases associated with user topics of interest. For each video feature, the user may also specify weight values for each topic indicating the relative importance of the video feature for that topic of interest.

FIG. 11 depicts a user profile 1100 that may be configured by a user according to an embodiment of the present invention to facilitate selection of keyframes relevant to user-specified topics of interest. As depicted in FIG. 11, three topics of interest have been specified, namely, "Terrorism", "Company XYZ", and "Football". Keywords and phrases have been associated with each of the topics. In order to facilitate selection of keyframes relevant to the user topics of interest from the video information, the user has also specified video features to be searched for when keywords and phrases associated with the topics are located in the text (e.g., in the CC text or in the text transcript of audio information) of the multimedia information. Weights have been associated with the video features indicating the relative importance of the video features for each topic of interest. For example, for the topic "Terrorism", the face of Osama Bin Laden (weighted 0.7) is slightly more important than presence of text "Afghanistan" (weighted 0.6).

Profile 1100 specifies the criteria for selecting keyframes relevant to the topics of interest given the presence of a keyword or phrase related to the topics of interest. For example, profile information 1100 specifies that the words "Osama" and "Afghanistan" are associated with the topic "Terrorism". If the word "Osama" is located in the text information of the multimedia information, then the video information (or video frames which have been extracted from the video information) temporally proximal to the occurrence of the word "Osama" in the text information are to be checked to determine if they include a face of Osama Bin Laden. Keyframes that contain Osama Bin Laden's face are deemed to be relevant (degree of relevance indicated by the weight value) to topic "Terrorism."

Likewise, if the word "Afghanistan" is located in the text information of the multimedia information, then the video frames temporally proximal to the occurrence of the word "Afghanistan" in the text information are to be checked to determine if they contain text "Afghanistan". As previously described, OCR techniques may be used to extract text from video keyframes. Keyframes that contain text "Afghanistan" are deemed to be relevant (degree of relevance indicated by the weight value) to topic "Terrorism."

Further, for all (indicated by "*") keywords and phrases (including "Osama" and "Afghanistan") associated with the topic "Terrorism," video frames temporally proximal to the occurrence of the words or phrases in the text information are to be checked to determine if they contain a building or (indicated by the Boolean connector OR) a crowd. Such keyframes are deemed to be relevant (degree of relevance indicated by the weight value) to topic "Terrorism." Accordingly, if the word "Osama" is located in the text information of the multimedia information, then the video frames temporally proximal to the occurrence of the word "Osama" in the text information would be first checked to determine if they include a face of Osama Bin Laden, and then checked to determine if they contain a building or a crowd.

Likewise, profile information 1100 specifies that the word "Suzuki" is associated with the topic "Company XYZ" ("Suzuki" may be the name of the CEO of Company XYZ). If the word "Suzuki" is located in the text information of the multimedia information, then the video frames temporally proximal to the occurrence of the word "Suzuki" in the text information are to be checked to determine if they include a face of John Suzuki. Keyframes that contain John Suzuki's face are deemed to be relevant (degree of relevance indicated by the weight value) to topic "Company XYZ."

Further, for all (indicated by "*") keywords and phrases (including "Suzuki") associated with the topic "Company XYZ", video frames temporally proximal to the occurrence of the words or phrases are to be checked to determine if they contain a building and (indicated by the Boolean connector AND) further if they contain either a XYZ logo or (indicated by the Boolean connector OR) text "XYZ". Such keyframes are deemed to be relevant (degree of relevance indicated by the weight value) to topic "Company XYZ."

Likewise, profile information 1100 specifies that the phrase "Buffalo Bills" is associated with the topic "Football". If the phrase "Buffalo Bills" is located in the text information of the multimedia information, then the video frames temporally proximal to the occurrence of the phrase are to be checked to determine if they include a face of Jim Kelly or the face of Marv Levy. Keyframes that contain either Jim Kelly's or Marv Levy's face are deemed to be relevant (degree of relevance indicated by the weight value) to topic "Football".

FIG. 12 depicts modules that facilitate selection of keyframes relevant to topics of interest according to an embodiment of the present invention. The modules depicted in FIG. 12 may be software modules, hardware modules, or combinations thereof. The modules depicted in FIG. 12 are merely illustrative of an embodiment of the present invention and are not meant to limit the scope of the present invention as recited in the claims. One of ordinary skill in the art would recognize other variations, modifications, and alternatives.

As depicted in FIG. 12, a video feature recognition module 1202 receives as input video frames corresponding to (or extracted from) the video information contained by a multimedia document. For each video frame, video feature recognition module 1202 determines if the video frame contains any video features such as a face, a building, a logo, text, etc. If a particular video feature is located, video feature recognition module 1202 assigns a probability value to the feature indicating the probability that the video frame contains the identified video feature. Video feature recognition module 1202 also determines a specific instance of the video feature and assigns a probability value to it. For example, for a particular video frame, video feature recognition module 1202 may determine that there is an 85% probability that the video frame contains a face and that there is a 90% probability that the face belongs to John Suzuki. For the same video frame, video feature recognition module 1202 may determine that there is only a 3% probability that the video frame contains a building, and only a 1% probability that the video frame contains a logo. The output of video feature recognition module 1202 is a ranked list of features and specific instances for each video frame. If no video feature is detected, a generic keyframe selection procedure may be applied. The procedure may calculate the probability that a frame is a potential keyframe. The video frames and their associated ranked list information is then forwarded to frame selector module 1204 for further processing.

Profile matcher module 1206 receives as input user profile information and text information (e.g., CC text information or transcript of audio information) extracted from the multimedia document. Based upon the user profile information, profile matcher module 1206 searches the text information to locate words and phrases in the text information that are related to user-specified topics of interest. The words and phrases located in the text information are annotated by profile matcher module 1206. As described previously, various techniques may be used to annotate the text information. The text information along with the annotations is then forwarded to frames selector module 1204 and to printable representation generator module 1208 for further processing.

As described above, frame selector module 1204 receives as input video frames and associated ranked list information from video feature recognition module 1202, the annotated text information from profile matcher module 1206, and user profile information. Based upon the user profile information, for each annotated word or phrase found in the text information, frame selector module 1204 determines video frames relevant to the topic with which the annotated word or phrase is associated.

According to an embodiment of the present invention, for a particular annotated word, frame selector module 1204 identifies video frames temporally proximal to the occurrence of the particular annotated word in the text information. This may be performed by determining the time stamp associated with the annotated word, and identifying a set of video frames within a time window of ±N seconds from the time stamp of the annotated word. The value of N is user configurable. For example, if N=5 seconds, frame selector module 1204 identifies a set of video frames within a time window of ±5 seconds from the time stamp of the annotated word.

Frame selector module 1204 then determines the topic of interest with which the annotated word is associated and the video features that are relevant to the particular annotated word or topic of interest (as specified in the user profile). Each video frame in the set of video frames within the ±N seconds time window is then searched to determine if it contains one or more video features specified in the user profile for the topic or word. A relevancy score is calculated for each video frame in the set of video frames.

According to an embodiment of the present invention, in order to calculate a relevancy score for a video frame, frame selector module 1204 multiplies the weight assigned to the video feature in the user profile by the probability value assigned to the video frame by video feature recognition module 1202 indicating that the frame contains the particular video feature. The other probability values assigned to the video frame by video feature recognition module 1202 may be multiplied by a constant (K) that is less than the weights in the profile information. This ensures that the simultaneous detection of a keyword and a relevant video frame will provide a higher rank for that video frame than if the keyword was not detected. After each video frame in the set of video frames has been assigned a relevancy value, the video frames are ranked based upon their relevancy values. Accordingly, for each annotated word or phrase in the text information, frame selector module generates a ranked list of video frames. The ranked list of keyframes for each annotated word or phrase is then forwarded to printable representation generator module 1208 for further processing.

Printable representation generator module 1208 receives annotated text information from profile matcher module 1206 and ranked lists of keyframes for the annotations from frame selector module 1204. Printable representation generator module also receives as input other types of information included in the multimedia information stored by the multimedia document and layout and format information. Based upon the various inputs, printable representation generator module 1208 generates a printable representation for the multimedia document.

According to an embodiment of the present invention, as part of processing performed to generate the printable representation for the multimedia document, printable representation generator module 1208 determines which keyframes to be included in the printable representation for the multimedia document for each segment of the multimedia document based upon the layout and format information and the ranked listing received from frame selector module 1204. For example, let's assume that the layout information specifies that four keyframes are to be printed for each segment. In this scenario, if the text corresponding to a particular segment contains only one annotated word, then the top four most relevant keyframes from the ranked list of keyframes associated with the annotated word and received from frame selector module 1204 are selected to be included in the printable representation for the segment. If a particular segment contains four different annotated words, then printable representation generator module 1208 may select only the most relevant keyframe from the ranked lists of keyframes associated with each of the four annotated words for inclusion in the printable representation (making a total of 4 keyframes). Accordingly, printable representation generator module 1208 determines the keyframes to be included in the printable representation for each segment of the multimedia document using the ranked list of keyframes received from frame selector module 1208.

Using a Multimedia Paper Document to Retrieve Multimedia Information

The present invention provides techniques that allow a user to access or retrieve multimedia information in digital form using the multimedia paper document generated for a multimedia document. The multimedia paper document may thus be used as an indexing and retrieval tool for retrieving multimedia information that may be stored in the multimedia document. For example, a user may use a multimedia paper document generated for a video recording to access or retrieve portions of the video recording.

Figure 13A:
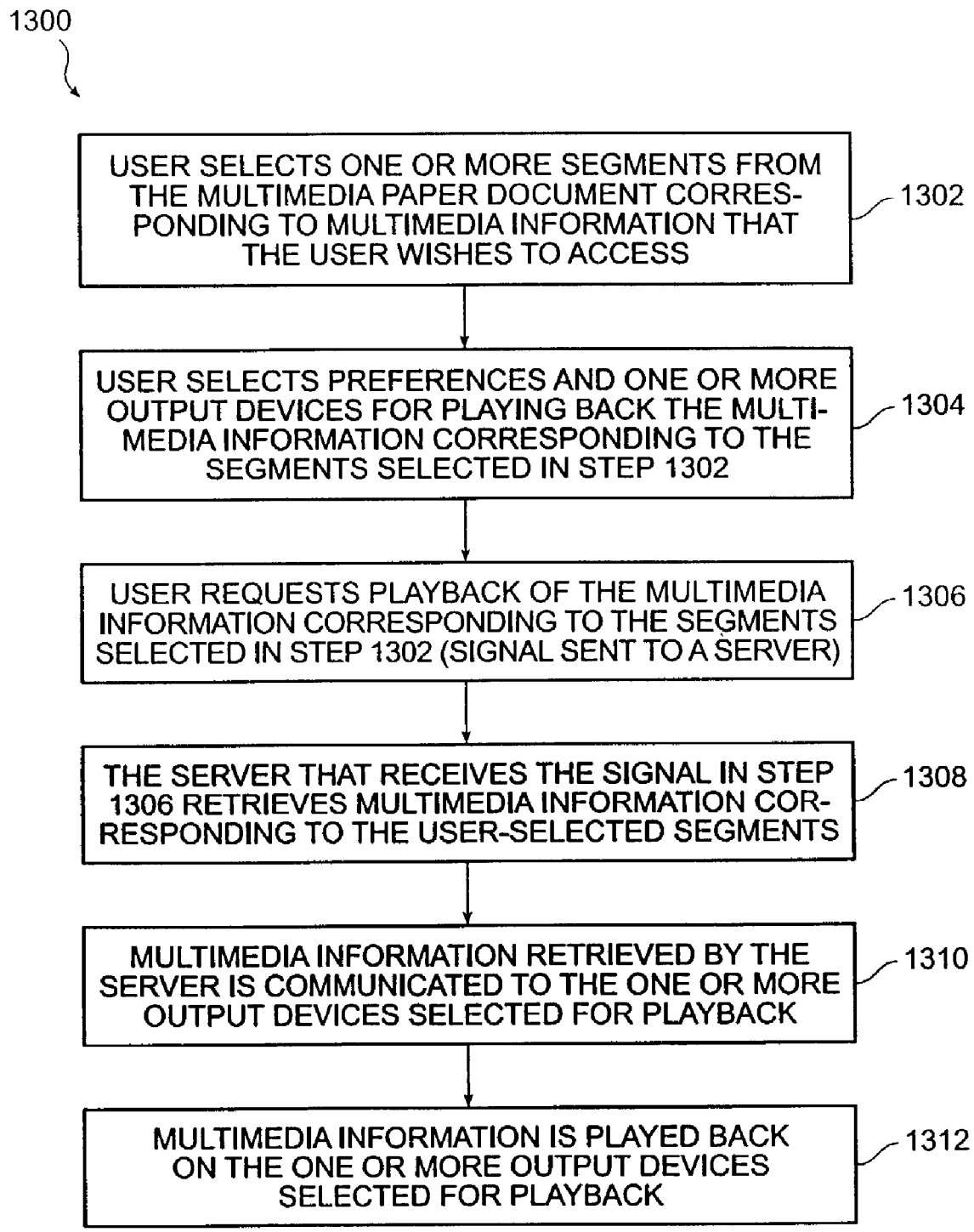
FIG. 13A is a simplified high-level flowchart depicting a method of accessing multimedia information using a multimedia paper document according to an embodiment of the present invention.

FIG. 13A is a simplified high-level flowchart 1300 depicting a method of retrieving multimedia information using a multimedia paper document according to an embodiment of the present invention. Flowchart 1300 depicted in FIG. 13 is merely illustrative of an embodiment incorporating the present invention and does not limit the scope of the invention as recited in the claims. One of ordinary skill in the art would recognize other variations, modifications, and alternatives.

As depicted in FIG. 13, a user may initiate the method by selecting one or more segments from a multimedia paper document corresponding to multimedia information that the user wishes to access or retrieve (step 1302). The segments may be selected by selecting user-selectable identifiers (e.g., user-selectable identifiers 726 depicted in FIG. 7A) associated with the segments using a selection device. The user-selectable identifiers corresponding to the segments may be selected from one or more pages of a multimedia paper document. Further, the user-selectable identifiers may be selected from one or more multimedia paper documents. Several different techniques may be provided by a multimedia paper document to enable the user to select one or more segments.

According to an embodiment of the present invention, barcode technology is used to facilitate selection of segments. In this embodiment, the user-selectable identifiers are printed in the multimedia paper document in the form of barcodes. Each barcode corresponds to a particular segment of the multimedia document. For example, as depicted in FIG. 7A, according to an embodiment of the present invention, a barcode 726 is printed for each segment printed on a page of the multimedia paper document. For example, barcode 726-1 printed on page 700 corresponds to segment 1, barcode 726-2 corresponds to the segment 2, barcode 726-3 corresponds to the segment 3, and so on. A user can select a particular segment by scanning the barcode corresponding to that segment. A selection device such as a barcode scanner or any other device that is capable of scanning barcodes may be used to scan the barcodes. The user may scan one or more barcodes from one or more pages of one or more multimedia paper documents.

It should be apparent that various other techniques, besides barcodes, may be used to facilitate selection of segments corresponding to multimedia information that the user wishes to access or retrieve. According to an embodiment of the present invention, the user-selectable identifiers may be implements as watermarks printed on pages of the multimedia paper document may also be used as techniques for selecting segments. In this embodiment, a user may select one or more watermarks corresponding to segments of interest to the user using a selection device that is capable of reading or detecting the watermarks.

According to another embodiment of the present invention, the user-selectable identifiers may be implemented as text string identifiers printed on pages of the multimedia paper document. In this embodiment, a user may select a particular segment by keying in or entering the text string identifier corresponding to the particular segment into a selection device such as a telephone, a digital video recorder (DVR), etc.

Various other techniques (e.g., Xerox glyphs embedded in keyframes, etc.) known to those skilled in the art may also be used to facilitate selection of segments. Generally, in order to maintain the readability of the multimedia paper document, techniques that are less obtrusive, and those that do not take up too much space on the page, and which are somewhat aesthetically pleasing may be used.

After the user has selected one or more segments, the user may select preferences for playing back the multimedia information corresponding to the segments selected in step 1302 (step 1304). According to an embodiment of the present invention, the user may specify preferences by selecting one or more controls from controls section 710. As with selection of segments, various different techniques maybe used to facilitate selection of controls. For example, according to an embodiment of the present invention, a particular control may be selected by scanning a barcode corresponding to the control. For example, the user may specify that the multimedia information is to be played back in "Enhanced Mode" by selecting barcode 724-4 depicted in FIG. 7A. The user may specify that the playback is to show CC text by selecting barcode 724-5 corresponding to control "Show Closed-caption". The user may specify that time is to be displayed during the playback by selecting barcode 724-6 corresponding to control "Show Time". The user in step 1304 may also select various other preferences.

According to an embodiment of the present invention, as part of step 1304, the user may also specify an output device to be used for playing back the multimedia information corresponding to the segments selected in step 1302. According to an embodiment of the present invention, one or more devices that may be located at different geographical locations may be selected for playback. For example, the selected output device may be the user's PDA, a computer specified by the user (e.g., a computer in the user's office), a television at the user's home, a specific kiosk, a user's cellphone, and the like.

In alternative embodiments of the present invention, the user preferences and the output device may be pre-configured. For example, this information may be stored in a user profile. Alternatively, the preferences and the output device may default to some preset values. In such a scenario, step 1304 may not be performed.

The user may then request playback of the multimedia information corresponding to the segments selected in step 1302 (step 1306). According to an embodiment of the present invention, the user may request playback by selecting a barcode such as barcode 724-1 corresponding to the "Play" control. According to an embodiment of the present invention, upon selecting the "Play" control, a signal is transmitted from the selection device (e.g., a barcode scanner) used by the user to select the segments and the preferences to a server that is capable of retrieving multimedia information corresponding to the user-selected segments. The server may be MIPSS 104 or any other server. The signal communicated to the server from the selection device may identify the segments selected by the user in step 1302, the multimedia paper documents from which the segments are to be selected, information related to preferences and/or one or more output devices selected by the user in step 1304, and other like information to facilitate retrieval of the requested multimedia information.

Various techniques and communication links may be used to communicate the signal from the selection device used by the user to the server. For example, if the selection device is a barcode scanner, a communication link may be established between the barcode scanner and the server and the signal information may be communication to the server via the communication link. Different types of communication links may be used including hardwire links, optical links, satellite or other wireless communications links, wave propagation links, or any other mechanisms for communication of information. Various communication protocols may be used to facilitate communication of the signal via the communication links. These communication protocols may include TCP/IP, HTTP protocols, extensible markup language (XML), wireless application protocol (WAP), protocols under development by industry standard organizations, vendor-specific protocols, customized protocols, and others.

In other embodiments, a telephone may be used as a selection device.

For example, a user may use a telephone to establish a communication link with the server. The user may then communication the signal information to server using the telephone. For example, the user may key in user-selectable identifiers (e.g., text string identifiers) corresponding to the selected segments and controls using the telephone. Various other techniques may also be used to communicate the information to the server.

The server receiving the signal from the selection device may then retrieve multimedia information corresponding to the user-selected segments (step 1308). According to an embodiment of the present invention, the server determines the user-selectable identifiers selected by the user. The server then determines segments of the multimedia document corresponding to the user-selectable identifiers selected by the user. The server then retrieves multimedia information corresponding to the selected segments.

The multimedia information may be retrieved from a single multimedia document or from multiple multimedia documents. For example, if the user selected user-selectable identifiers from multiple multimedia documents, then the server retrieves multimedia information corresponding to selected segments from multiple multimedia documents.

The multimedia information retrieved by the server is then communicated to the one or more output devices selected for playback (step 1310). The multimedia information is then played on the one or more output devices selected for playback (step 1312). The user may control playback of the multimedia information by selecting one more controls from control area 710 depicted in FIG. 7A. For example, the user may stop playback of the multimedia information by selecting barcode 724-1 corresponding to the "Stop" control. A user may fast-forward 10 seconds of the multimedia information by selecting barcode 724-2. A user may rewind 10 seconds of the multimedia information by selecting barcode 724-3. Various other controls not shown in FIG. 7A may also be provided in alternative embodiments of the present invention to control playback of the multimedia information.

According to an alternative embodiment of the present invention, a user may use the multimedia paper document to start playing multimedia information from a user-selected time point in the multimedia document. In this embodiment, the user-selectable identifiers (e.g., barcodes 726 depicted in FIG. 7A) printed in a multimedia paper document represent particular time points in the multimedia document. According to an embodiment of the present invention, the barcodes may correspond to the same time points as the identifiers (e.g., identifiers 712 depicted in FIG. 7A) printed on a page of the multimedia paper document.

Figure 13B:
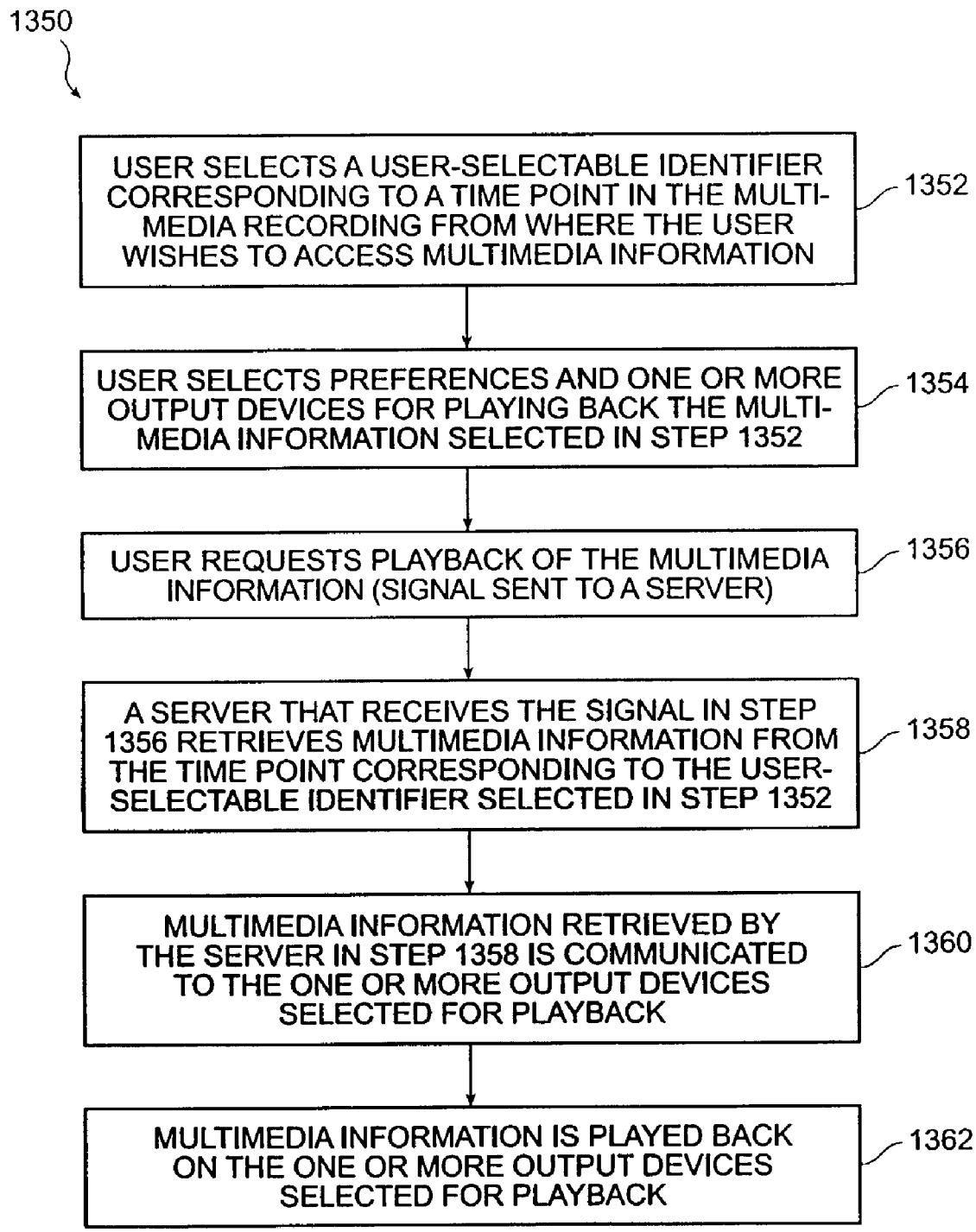
FIG. 13B is a simplified high-level flowchart depicting a method of accessing multimedia information from a particular time point using a multimedia paper document according to an embodiment of the present invention.

FIG. 13B is a simplified high-level flowchart 1350 depicting a method of retrieving multimedia information from a particular time point using a multimedia paper document according to an embodiment of the present invention. Flowchart 1350 depicted in FIG. 13B is merely illustrative of an embodiment incorporating the present invention and does not limit the scope of the invention as recited in the claims. One of ordinary skill in the art would recognize other variations, modifications, and alternatives.

As depicted in FIG. 13, a user may initiate the method by selecting a user-selectable identifier printed on a multimedia paper document corresponding to a time point in the multimedia document from where the user wishes to retrieve multimedia information (step 1352). As described above, several different techniques (e.g., barcodes, watermarks, glyphs, text strings, etc.) may be provided by the multimedia paper document to enable the user to the user-selectable identifier.

After selecting a user-selectable identifier, the user may select preferences for playing back the multimedia information (step 1304). As described above with respect to FIG. 13A, the user may select a mode for playing back the multimedia information, select one or more output devices for playing back the multimedia information, and the like. Step 1354 may not be performed if the user preferences are pre-configured.

The user may then request playback of the multimedia information (step 1356). According to an embodiment of the present invention, upon selecting the "Play" control, a signal is transmitted from the selection device (e.g., a barcode scanner) used by the user to a server that is capable of retrieving multimedia information from the multimedia document. The server may be MIPSS 104 or any other server. The signal communicated to the server from the selection device may identify the user-selectable identifier selected by the user in step 1352, the multimedia paper document from which the user-selectable identifier was selected, information related to preferences and/or one or more output devices selected by the user in step 1354, and other like information to facilitate retrieval of the requested multimedia information.

The server receiving the signal from the selection device then retrieves multimedia information from the time point corresponding to the user-selectable identifier selected by the user in step 1352 (step 1358). According to an embodiment of the present invention, the server determines a time point in the multimedia document corresponding to the user-selectable identifier selected by the user and retrieves multimedia information from the time point onwards. view The multimedia information retrieved by the server in step 1358 is then communicated to the one or more output devices selected for playback (step 1360). The multimedia information is then played back on the one or more output devices selected for playback (step 1362). The user may control playback of the multimedia information by selecting one more controls from control area 710 depicted in FIG. 7A. For example, the user may stop playback of the multimedia information by selecting barcode 724-1 corresponding to the "Stop" control. A user may fast-forward 10 seconds of the multimedia information by selecting barcode 724-2. A user may rewind 10 seconds of the multimedia information by selecting barcode 724-3. Various other controls not shown in FIG. 7A may also be provided in alternative embodiments of the present invention to control playback of the multimedia information.

Accordingly, as described above, the multimedia paper document provides a simple and easy-to-use mechanism for retrieving multimedia information. The convenience afforded by the multimedia paper document in retrieving multimedia information might be illustrated by the following example. Let's assume that a user has requested that the television program "Bloomberg" be recorded between the hours of 9–11 AM during which important financial news is broadcast. Various different devices may be used to record the news broadcast including a video recorder, a digital video recorder (DVR) (e.g., a TIVO box), and the like. The user may then generate a multimedia paper document for the recorded news broadcast.

Let's further assume that the user has 15 minutes before a power lunch with a client to digest the two-hour Bloomberg TV program to find out if any relevant information was mentioned regarding the client's company or their main competitor. With the paper-based version of the broadcast (i.e., the multimedia paper document), the user can quickly skim the multimedia paper document for relevant information. When the user finds one or more segments in the multimedia paper document of interest, the user can use a barcode scanner to scan the barcodes corresponding to segments in the multimedia paper document. The user may also scan a control barcode instructing the recorder to launch the video corresponding to the selected segments on a television in the user's office. This sends a message to the recorder to launch the video corresponding to the selected segments on the television in the user's office. If the user has selected multiple segments, multimedia information corresponding to the selected segments will be played on the user's television, skipping the segments or sections that are not selected by the user. In this manner, the user can quickly navigate two-hours of a television broadcast in 15 minutes watching only those portions of the broadcast that are of interest to the user, and be ready for the client meeting in time.

In the above scenario the user could have selected segments from multiple multimedia paper documents generated for a plurality of news broadcasts from news agencies such as CNBC, CNN/fn, MSNBC, and the like. The user could then skim the multimedia paper documents to locate news related to the client or the client's competitors from the various broadcasts. This is equivalent to watching several hours of video in a short time—something that is very difficult to achieve if the user only has access to a video player. The user may then select segments of interest from the multiple multimedia papers and watch video corresponding to the selected segments.

In the above scenario, the present invention automatically records a desired broadcast program based a user's profile and produces a multimedia paper document that acts both as a familiar skimming tool and a retrieval device for viewing desired portions of the video. In the above-described scenario, the interface is not on the user's personal computer—instead, the interface is in the user's hands in the form of paper. In some cases, this is a more desired environment since most individuals are familiar with and more comfortable with reading and using paper. The paper-based interface thus provides a unique mechanism for indexing or referring back to the digitized multimedia information stored by the multimedia document. The indexing technique provided by the present invention may then be used by a user to retrieve the multimedia information in digital format. The multimedia paper document provides a portable means for random access to the multimedia information, a task that traditionally required tedious searching of the multimedia information.

Generating a Single Printable Representation for a Plurality of Multimedia Documents The present invention provides techniques for generating a single printable representation that includes multimedia information extracted from a plurality of different multimedia documents or multimedia sources. According to an embodiment of the present invention, the single printable representation includes multimedia information selected from the plurality of multimedia documents based upon selection criteria. A user may specify the selection criteria. The selection criteria may be based upon any attributes of the multimedia documents or their contents, or upon user-specified topics of interest, and the like. For example, the selection criteria may specify a particular subject (e.g., information related to the Taliban in Afghanistan, or abortion related information, etc.), a specified story line, and the like.

For example, a user may specify that a single printable representation (or a single multimedia paper document) be generated consolidating stories and articles related to "Middle East Terrorism" from a plurality of news broadcast recordings. In response, the present invention generates a single printable representation that includes multimedia information from the plurality of news broadcast recordings related to "Middle East Terrorism." The single consolidated printable representation may then be printed to generate a single consolidated multimedia paper document that contains information related to "Middle East Terrorism" from multiple multimedia documents.

According to another example, topics of interest to the user (which may be stored in a user profile) may be specified as the selection criteria. Based upon such selection criteria, MIPSS 104 may generate a single printable representation that includes multimedia information from the plurality of news broadcast recordings related to the user-specified topics of interest. The single consolidated printable representation may then be printed to generate a single consolidated multimedia paper document that contains information related to "Middle East Terrorism" extracted from multiple multimedia documents. In this manner, multimedia information from various multimedia sources or documents related to user-specified topics of interest may be consolidated into a single printable representation that may then be printed to generate a multimedia paper document. The multimedia paper document generated in this manner is a valuable tool that enables the user to read and comprehend related information from multiple sources in a timely and efficient manner.

Figure 14:
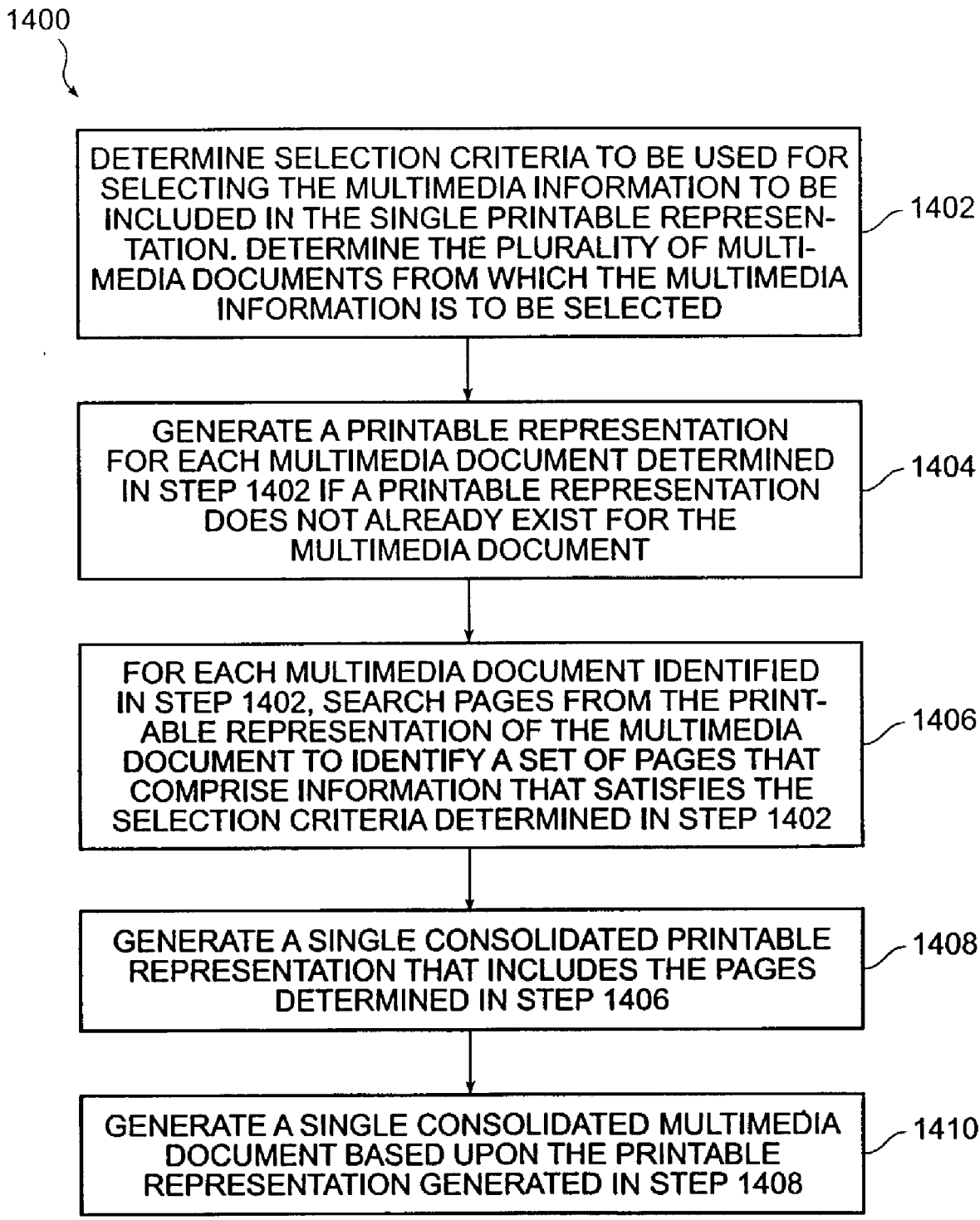
FIG. 14 is a simplified high-level flowchart depicting a method of generating a single printable representation according to an embodiment of the present invention that includes multimedia information selected from a plurality of multimedia documents by analyzing the printable representations of the plurality of multimedia documents.

FIG. 14 is a simplified high-level flowchart 1400 depicting a method of generating a single printable representation according to an embodiment of the present invention that includes multimedia information selected from a plurality of multimedia documents by analyzing the printable representations of the plurality of multimedia documents. The method depicted in FIG. 14 may be used to generate a single multimedia paper document including multimedia information selected from a plurality of multimedia documents. The processing depicted in FIG. 14 may be performed by software modules executing on MIPSS 104, by hardware modules coupled to MIPSS 104, or a combination thereof. In alternative embodiments of the present invention, the processing may be distributed among the various systems depicted in FIG. 1. The processing depicted in FIG. 14 is merely illustrative of an embodiment incorporating the present invention and does not limit the scope of the invention as recited in the claims. One of ordinary skill in the art would recognize other variations, modifications, and alternatives.

The method is initiated by determining the selection criteria (or criterion) to be used for selecting the multimedia information to be included in the single printable representation and by determining the plurality of multimedia documents (or multimedia sources) from which the multimedia information is to be selected or extracted (step 1402). MIPSS 104 then generates a printable representation for each multimedia document determined in step 1402 if a printable representation does not already exist for the multimedia document (step 1404). The printable representations for the multimedia documents may be generated according to the methods depicted in FIGS. 4 and 6.

For each multimedia document identified in step 1402, MIPSS 104 searches the pages from the printable representation of the multimedia document to identify a set of pages that comprise information that satisfies the selection criteria determined in step 1402 (step 1406). MIPSS 104 then generates a single consolidated printable representation that includes the pages determined in step 1406 (step 1408). The single printable representation generated in step 1408 may then be printed on a paper medium to generate a consolidated multimedia paper document (step 1410). The multimedia paper document generated in step 1410 comprises information selected from the plurality of multimedia documents based upon the selection criteria. For each page of the multimedia paper document generated in step 1410, information printed information that satisfies the selection criteria may be annotated.

As described above, the printable representations of the multimedia documents are analyzed to identify portions of multimedia information from the various multimedia documents to be included in the consolidated printable representation. According to alternative embodiments of the present invention, the multimedia information stored by the multimedia documents may be analyzed to identify portions of the multimedia information that satisfy the selection criteria. A consolidated printable representation may then be generated to include portions of multimedia information from the various multimedia documents that satisfy the selection criteria. The consolidated printable representation may then be printed on a paper medium to generate a consolidated or "customized" multimedia paper document.

Figure 15:
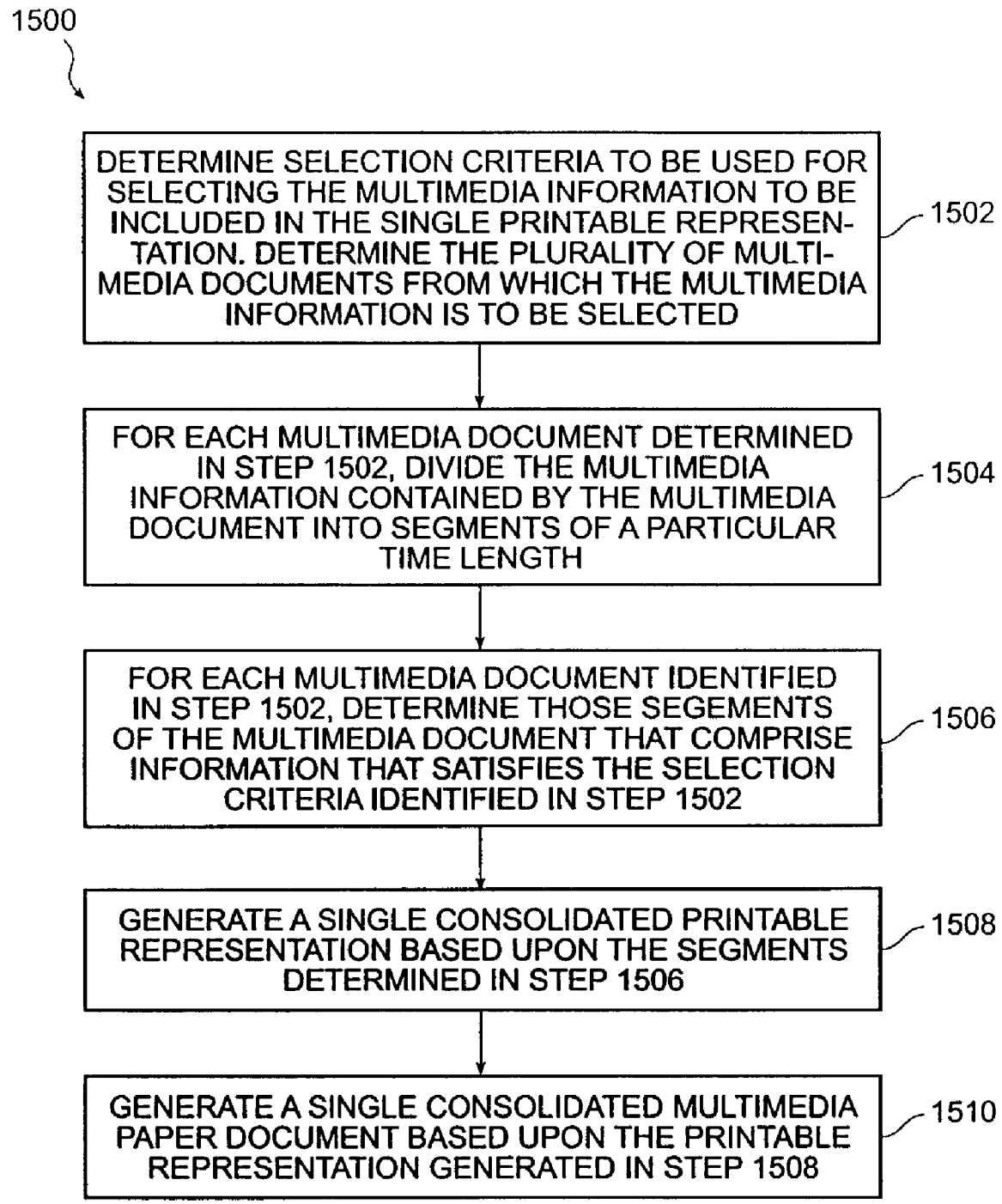
FIG. 15 is a simplified high-level flowchart depicting another method of generating a single printable representation that includes information extracted from a plurality of multimedia documents by analyzing the multimedia information stored by the plurality of multimedia documents according to an embodiment of the present invention.
Figure 16A:
Figure 16B:

FIG. 15 is a simplified high-level flowchart 1500 depicting another method of generating a single printable representation that includes information extracted from a plurality of multimedia documents by analyzing the multimedia information stored by the plurality of multimedia documents according to an embodiment of the present invention. The method depicted in FIG. 15 may be used to generate a single multimedia paper document including multimedia information extracted from a plurality of multimedia documents. The processing depicted in FIG. 15 may be performed by software modules executing on MIPSS 104, by hardware modules coupled to MIPSS 104, or a combination thereof. In alternative embodiments of the present invention, the processing may be distributed among the various systems depicted in FIG. 1. The processing depicted in FIG. 15 is merely illustrative of an embodiment incorporating the present invention and does not limit the scope of the invention as recited in the claims. One of ordinary skill in the art would recognize other variations, modifications, and alternatives.

The method is initiated by determining the selection criteria (or criterion) to be used for selecting the multimedia information to be included in the single printable representation and by determining the plurality of multimedia documents (or multimedia sources) from which the multimedia information is to be selected (step 1502). For each multimedia document determined in step 1502, MIPSS 104 divides the multimedia information contained by the multimedia document into segments of a particular time length (step 1504). The process of dividing a multimedia document into segments has been described earlier with respect to FIG. 6.

For each multimedia document identified in step 1502, MIPSS 104 then determines those segments or portions of the multimedia document that comprise information that satisfies the selection criteria identified in step 1502 (step 1506). MIPSS 104 then generates a single consolidated printable representation based upon the segments determined in step 1506 (step 1508). The single consolidated printable representation includes segments determined in step 1506. The single printable representation generated in step 1508 may then be printed on a paper medium to generate a consolidated multimedia paper document (step 1510). The multimedia paper document generated in step 1510 comprises information selected from the plurality of multimedia documents based upon the selection criteria. The multimedia paper document generated in step 1510 may comprise annotations identifying printed information that satisfies the selection criteria.

A multimedia paper document generated according to the flowcharts depicted in FIGS. 14 and 15 may then be used as any other multimedia paper document. For example, a user may select one or more user-selectable identifiers from the consolidated multimedia paper document (as described above) and retrieve multimedia information corresponding to segments associated with the user-selectable identifiers selected by the user.

FIGS. 16A, 16B, 16C, and 16D depict pages of a multimedia paper document generated according to an embodiment of the present invention using the method depicted in FIG. 14. The pages have been selected from a plurality of multimedia documents because they contain information related to the topic of interest "Middle East Terrorism" that was specified as the selection criteria. The pages have been selected from printable representations generated for a plurality of multimedia documents. For example, pages 1600 and 1602 depicted in FIGS. 16A and 16B have been selected from a printable representation generated for a "CNN News Site (Channel 203)" recording that was recorded on May 30, 2001 starting at 12:59 PM and is of length 56:40 minutes, page 1606 depicted in FIG. 16C has been selected from a printable representation generated for a "Newshour (PBS, Channel 233)" recording that was recorded on Jun. 5, 2001 starting at 6:01 PM and is of length 54:49 minutes, page 1604 depicted in FIG. 16D has been selected from a printable representation generated for a "Hardball (CNBC, Channel 356)" recording that was recorded on Sep. 14, 2001 starting at 5:00 PM and is of length 59:59 minutes. For each page, information related to "Middle East Terrorism" has been annotated. This enhances the readability of the multimedia paper document. Accordingly, information related to "Middle East Terrorism" from a plurality of multimedia documents is consolidated into one document.

As described above, a user may generate a "customized" multimedia paper document by specifying appropriate selection criteria. In this manner, the user can quickly extract relevant information from multiple hours of multimedia broadcasts by simply reading the customized multimedia paper document. The present invention thus reduces the time spent by the user in locating and retrieving relevant information from multiple multimedia information sources or recordings.

Coversheets

According to an embodiment of the present invention, the present invention also provides techniques for generating a coversheet for a multimedia paper document. The coversheet may provide a summary of the contents printed in the multimedia paper document.

Figure 17:
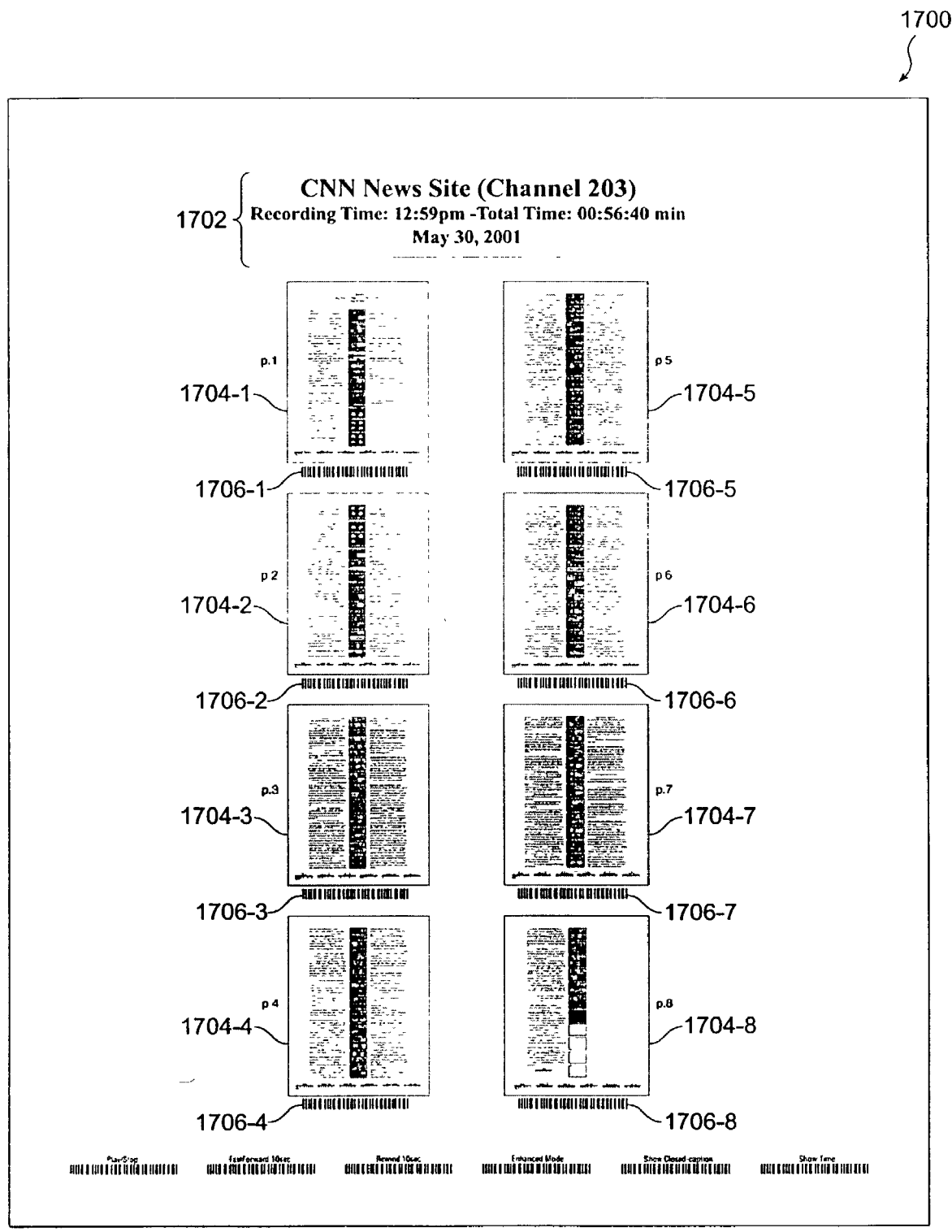
FIG. 17 depicts a coversheet generated for a multimedia paper document according to an embodiment of the present invention.

FIG. 17 depicts a coversheet 1700 generated for a multimedia paper document according to an embodiment of the present invention. Coversheet 1700 depicted in FIG. 17 is merely illustrative of a coversheet according to an embodiment of the present invention and does not limit the scope of the invention as recited in the claims. One of ordinary skill in the art would recognize other variations, modifications, and alternatives.

As shown in FIG. 1700, coversheet 1700 comprises thumbnail images of individual pages included in the multimedia paper document. As shown, eight thumbnail images 1704 are printed on coversheet 1700 thereby indicating that the multimedia paper document comprises eight pages. A title section 1702 is also printed on coversheet 1700. Title section 1702 displays the source of the multimedia information (which may correspond to the filename of the multimedia document), the time and date when the multimedia information was recorded, and the total time of the recording.

A barcode 1706 is associated with each thumbnail image. A user may use barcodes 1706 to access or retrieve multimedia information printed on the pages in digital form. If the user wishes to access the multimedia information corresponding to information printed on a particular multimedia paper document page, the user may scan the barcode corresponding to that particular page and then access or retrieve the information in electronic form using an output device specified by the user. In this embodiment, selecting a barcode associated with a particular page is equivalent to selecting all the segments printed on that particular page. For example, if the user wishes to access multimedia information corresponding to the information printed on page 6 of the multimedia paper document, the user may scan barcode 1706-6 and then access the information (as previously described) using an output device. The user may select one or more barcodes from coversheet 1700.

According to another embodiment of the present invention, a barcode 1706 associated with a particular page is the same as the barcode corresponding to the first segment printed on the particular page. In this embodiment, the user may scan a barcode for a particular page and retrieve multimedia information starting from the top of the particular page.

Figure 18:
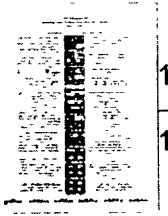
FIG. 18 depicts a coversheet generated for a multimedia paper document according to another embodiment of the present invention.

FIG. 18 depicts a coversheet 1800 generated for a multimedia paper document according to another embodiment of the present invention. In addition to the features included in coversheet 1700 depicted in FIG. 17, coversheet 1800 displays a list of sentences 1804 for each thumbnail image 1802. According to an embodiment of the present invention, the sentences displayed for a particular thumbnail image summarize the contents of the page corresponding to the particular thumbnail image. Several different techniques may be used to select the sentences for a particular thumbnail image. According to an embodiment of the present invention, the first text sentence of each segment printed on the page corresponding to the thumbnail image may be printed in 1804. According to another embodiment of the present invention, segments that contains CC text with story-line separators (e.g., ">>"), the first sentence of each story printed on the page corresponding to the thumbnail image may be printed in 1804. Other techniques known to those skilled in the art may also be used to determine the text to be printed in area 1804 of coversheet 1800.

It should be apparent that coversheet 1800 depicted in FIG. 18 is merely illustrative of a coversheet according to an embodiment of the present invention and does not limit the scope of the invention as recited in the claims. One of ordinary skill in the art would recognize other variations, modifications, and alternatives.

Figure 19:
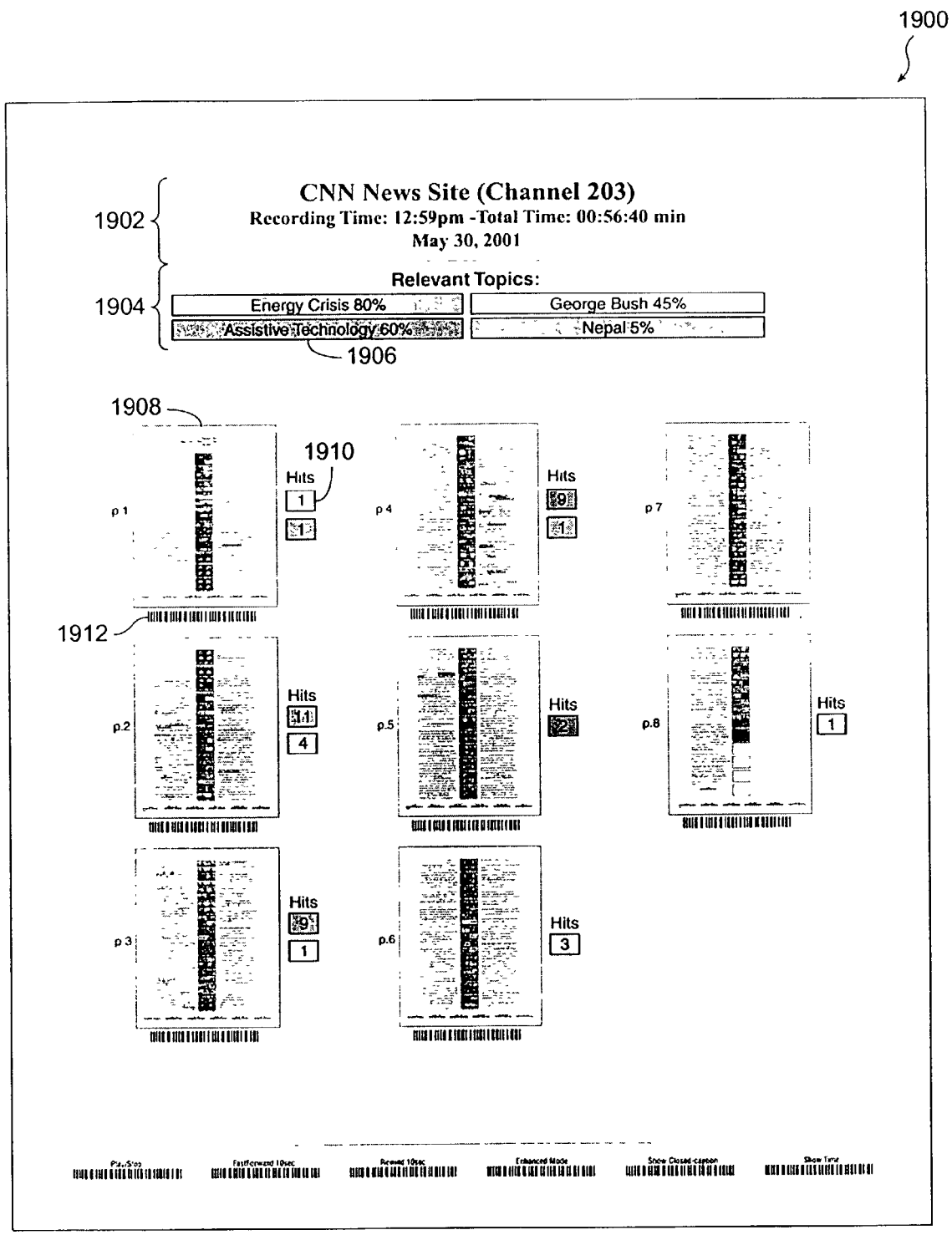
FIG. 19 depicts a coversheet generated according to another embodiment of the present invention for a multimedia paper document that has been annotated based upon user-specified topics of interest.

FIG. 19 depicts a coversheet 1900 generated according to another embodiment of the present invention for a multimedia paper document that has been annotated based upon user-specified topics of interest. A title section 1902 is printed on coversheet 1900 displaying the source of the multimedia information (which may correspond to the filename of the multimedia document), the time and date when the multimedia information was recorded, and the total time of the recording. Topics of interest 1904 to which the multimedia paper document is relevant are also displayed. For each topic of interest, the degree of relevancy of the multimedia paper document to the topic of interest is also displayed. In the embodiment depicted in FIG. 1900, the degree or relevancy is denoted by a percentage value 1906.

Coversheet 1900 displays a thumbnail image 1908 of each page included in the multimedia paper document. For pages that comprise information related to user-specified topics, the thumbnail images corresponding to those pages display the annotated words or phrases related to user-specified topics of interest. For a particular page comprising information related to one or more user-specified topics of interest, the number of hits 1910 related to the topics of interest found on the particular page are also displayed next to the thumbnail image of the page. Different colors and styles may be used to highlight words and phrases in the thumbnails related to different topics. The hits for a particular topic of interest may also be displayed using a color that is associated with the topic of interest and used to highlight words and phrases related to the topic of interest. This allows the user of the multimedia paper document to easily identify pages of the multimedia paper document that include information related to user-specified topics of interest.

It should be apparent that coversheet 1900 depicted in FIG. 19 is merely illustrative of a coversheet according to an embodiment of the present invention and does not limit the scope of the invention as recited in the claims. One of ordinary skill in the art would recognize other variations, modifications, and alternatives.

Figure 20:
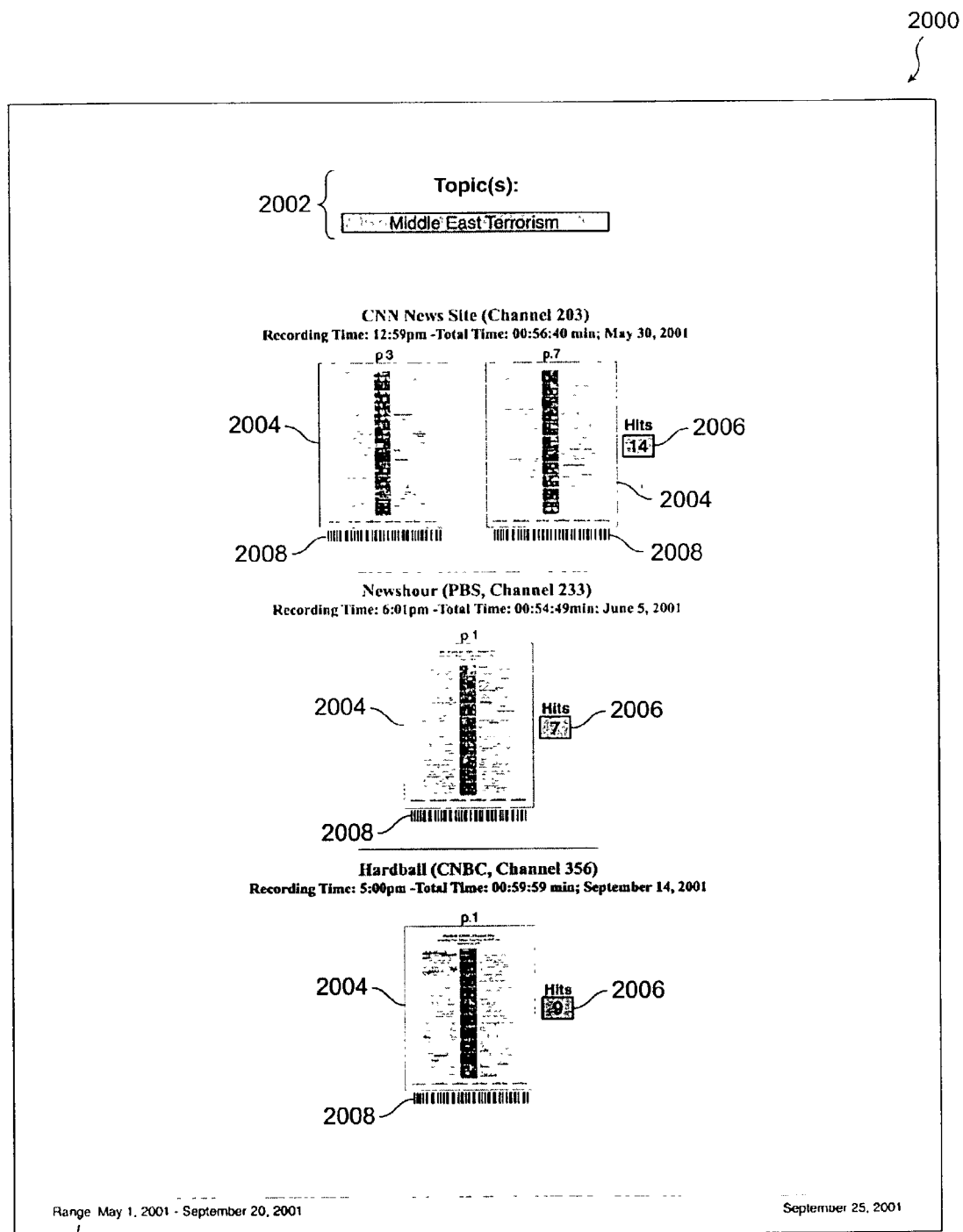
FIG. 20 depicts a coversheet generated according to an embodiment of the present invention for a multimedia paper document that includes pages selected from multiple multimedia paper documents based upon selection criteria.

FIG. 20 depicts a coversheet 2000 generated according to an embodiment of the present invention for a multimedia paper document that includes pages selected from multiple multimedia paper documents based upon selection criteria. For example, the multimedia paper document may be generated according to flowchart 1400 depicted in FIG. 14. Coversheet 2000 depicted in FIG. 20 has been generated for a multimedia paper document that includes pages 1600, 1602, 1604, and 1606 depicted in FIGS. 16A, 16B, 16C, and 16D, respectively. It should be apparent that coversheet 2000 depicted in FIG. 20 is merely illustrative of a coversheet according to an embodiment of the present invention and does not limit the scope of the invention as recited in the claims. One of ordinary skill in the art would recognize other variations, modifications, and alternatives.

As depicted in FIG. 20, the selection criteria 2002 used for generating the multimedia paper document is printed on page 2000. Coversheet 2000 displays a thumbnail image 2004 of each page included in the multimedia paper document. For pages that comprise information related to the search criteria, the thumbnail images corresponding to those pages displaying the information with annotations. The number of hits 2006 for pages are also displayed. A barcode 2008 associated with each page is also displayed. Coversheet 2000 also displays a date range 2010 that may be selected by the user as part of the selection criteria. For example, multimedia paper document comprises information in the date range May 1, 2001 to Sep. 20, 2001.

Figure 21:
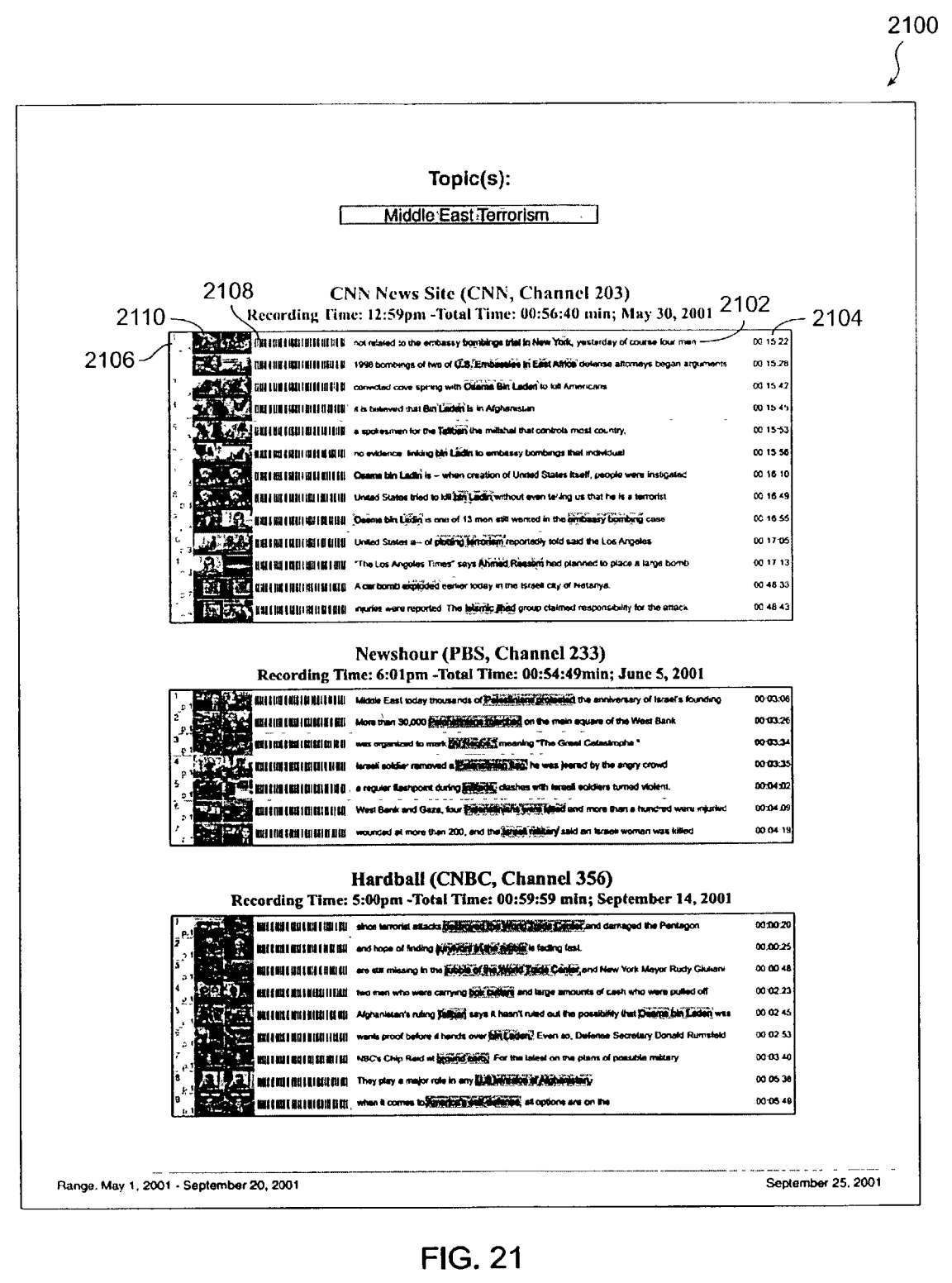

FIG. 21 depicts another coversheet 2100 generated according to an embodiment of the present invention for a multimedia paper document that includes pages selected from multiple multimedia paper documents based upon selection criteria. Coversheet 2100 depicted in FIG. 21 has been generated for a multimedia paper document that includes pages 1600, 1602, 1604, and 1606 depicted in FIGS. 16A, 16B, 16C, and 16D, respectively. It should be apparent that coversheet 2000 depicted in FIG. 20 is merely illustrative of a coversheet according to an embodiment of the present invention and does not limit the scope of the invention as recited in the claims. One of ordinary skill in the art would recognize other variations, modifications, and alternatives.

Coversheet 2100 shows more information than coversheet 2000 depicted in FIG. 2000. For each occurrence of words or phrases related to the selection criteria (e.g., text related to "Middle East Terrorism"), the line 2102 (or a user-configurable number of words surrounding the relevant word/phrase) comprising the relevant text or phrase (which is annotated) is displayed along with the time 2104 when the word/phrase occurred in the recording and the page 2106 of the multimedia paper document on which the line is printed.

A barcode 2108 is also displayed for each line. According to an embodiment of the present invention, barcode 2108 corresponds to the barcode for the page on which the line occurs. According to alternative embodiments of the present invention, the barcode 2108 associated with a line may correspond to the barcode of the segment that contains the displayed line. Alternatively, barcode 2108 may correspond to a location within the multimedia information when the relevant text/phrase occurs. Accordingly, barcode 2108 enables the user to access or retrieve multimedia information from a specific point in time.

A set of keyframes 2110 is also displayed for each line. According to an embodiment of the present invention, the keyframes that are most representative of the word/phrase or are relevant to the selection criteria may be displayed. Techniques for selecting keyframes relevant to selection criteria such as a user-specified topic of interest have been described above.

Figure 22:
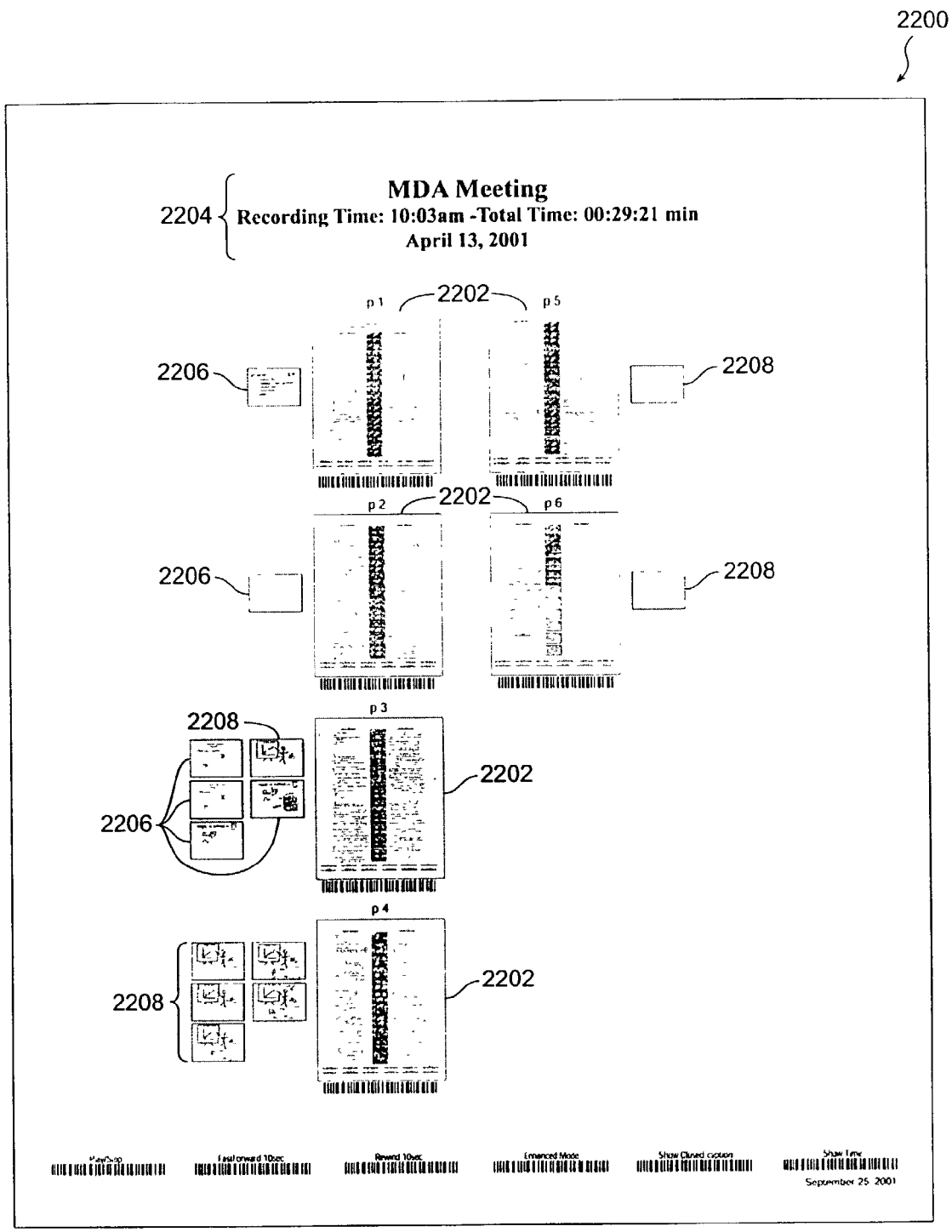
FIG. 22 depicts a coversheet generated according to an embodiment of the present invention for a multimedia paper document that has been generated for a recorded meeting.

FIG. 22 depicts a coversheet 2200 generated according to an embodiment of the present invention for a multimedia paper document that has been generated for a recorded meeting. As shown in FIG. 22, coversheet 2200 comprises thumbnail images of individual pages included in the multimedia paper document. As shown, six thumbnail images 2202 are printed on coversheet 2200 thereby indicating that the multimedia paper document comprises eight pages. A title section 2204 is also printed on coversheet 2200 and displays information identifying the meeting for which the multimedia paper document was generated, the time and date when the meeting was recorded, and the total time of the recording. Slides 2206 and whiteboard images 2208 are also printed next to thumbnail images corresponding to pages that comprise the slides or whiteboard images.

It should be apparent that coversheets 1700, 1800, 1900, 2000, 2100, and 2200 depicted in FIGS. 17, 18, 19, 20, 21, and 22, respectively, are merely illustrative of specific embodiments of the present invention and do not limit the scope of the invention as recited in the claims. One of ordinary skill in the art would recognize other variations, modifications, and alternatives. The coversheet generated according to the teachings of the present invention thus provide a simple and convenient way for the reader of the multimedia paper document to get an overview of the contents of the multimedia paper document.

Multimedia Paper Document Output Device Embodiments

Figure 23:
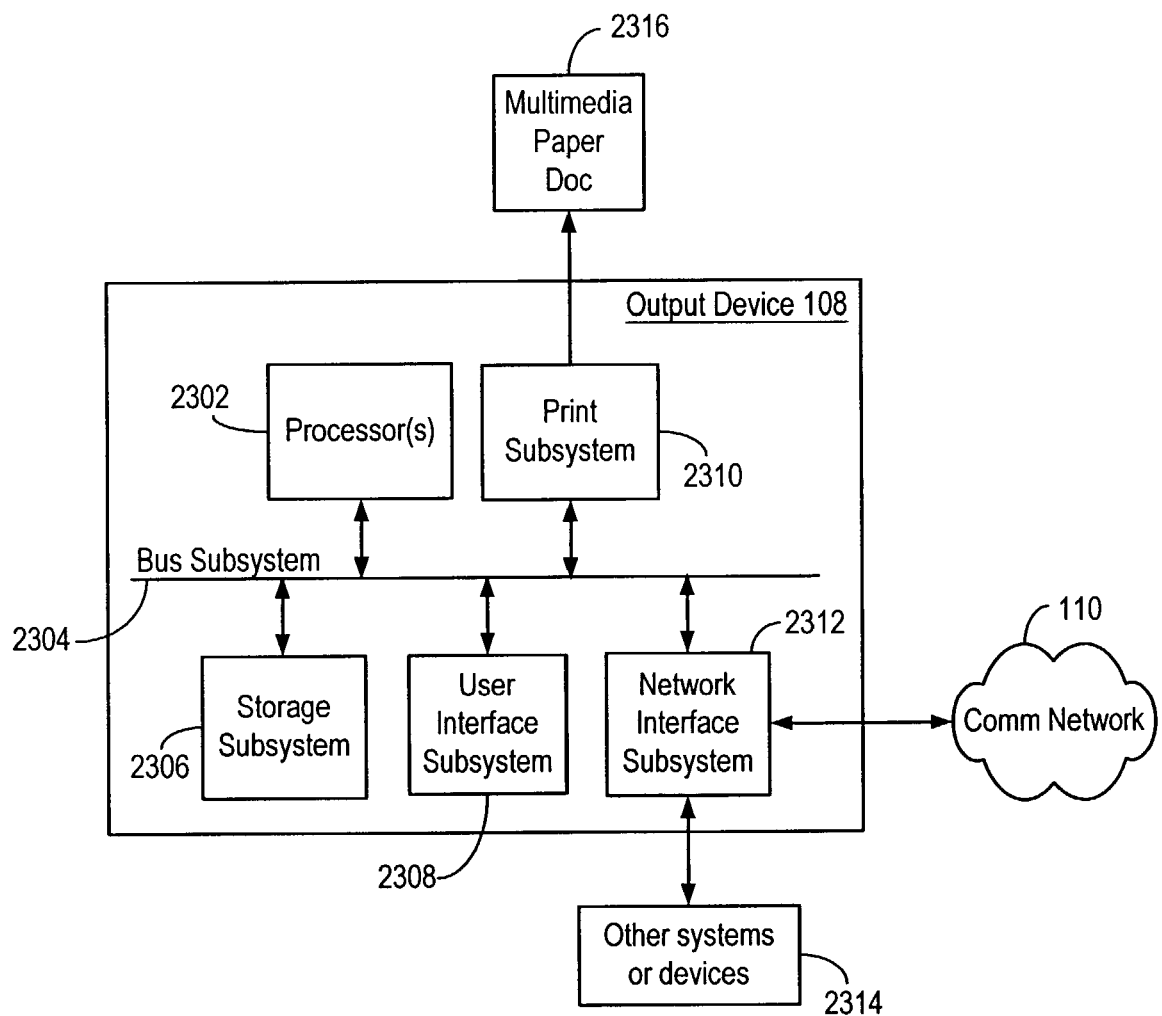
FIG. 23 is a simplified block diagram of an output device that is configured to generate multimedia paper documents according to an embodiment of the present invention.

As described above, according to an embodiment of the present invention, output device 108 may be configured to generate a multimedia paper document according to the teachings of the present invention. FIG. 23 is a simplified block diagram of an output device 108 that is configured to generate multimedia paper documents according to an embodiment of the present invention. As depicted in FIG. 1, output device 108 is coupled to communication network 110 and other systems or devices 2314 via one or more communication links. Output device 108 depicted in FIG. 23 is merely illustrative of an embodiment of the present invention and does not limit the scope of the invention as recited in the claims. One of ordinary skill in the art would recognize other variations, modifications, and alternatives.

The communication links that are used to couple output device 108 to communication network 110 or to other systems or devices 2314 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

As described above while describing FIG. 1, communication network 110 may itself be comprised of many interconnected computer systems and communication links. Communication network 110 may be embodied as a direct connection, a LAN, a wide area network (WAN), a wireless network, an Intranet, the Internet, a private network, a public network, a switched network, or any other suitable communication network.

As shown in FIG. 23, output device 108 includes a processor 2302 that communicates with a number of peripheral subsystems via a bus subsystem 2304. These peripheral subsystems may include a storage subsystem 2306, a user interface subsystem 2308, a print subsystem 2310, and a network interface subsystem 2312.

Bus subsystem 2304 provides a mechanism for letting the various components and subsystems of output device 108 communicate with each other as intended. Although bus subsystem 2304 is shown schematically as a single bus, alternative embodiments of the bus subsystem may utilize multiple buses.

User interface subsystem 2308 facilitates user interaction with output device 108. A user may be a human user, a device, a process, another computer, and the like. User interface subsystem 2308 may be implemented using a touch pad, a touch screen, mechanical buttons, and the like. According to an embodiment of the present invention, interface 2308 allows the user to send a signal or a request to output device 108 requesting generation of a multimedia paper document for a multimedia document. User interface subsystem 2308 also serves as an interface for outputting information to the user. For example, information related to the status of output device 108 or status of the operation(s) performed by output device 108 may be output to the user via interface 2308. According to an embodiment of the present invention, user interface subsystem 2308 may also allow a user to preview contents of multimedia documents for which multimedia paper documents are generated by output device 108. Examples of user interfaces are depicted in FIGS. 2A and 2B and described above.

Network interface subsystem 2312 provides an interface to other computer systems (e.g., MIPSS 104), networks, and devices. Network interface system 2312 facilitates transfer or communication of information to and from output device 108 in an appropriate format. Embodiments of network interface subsystem 2312 include an Ethernet card, a modem (telephone, satellite, cable, ISDN, etc.), (asynchronous) digital subscriber line (DSL) units, and the like.

According to an embodiment of the present invention, network interface subsystem 2312 may also provide an interface for attaching or coupling external systems or devices to output device 108. For example, network interface subsystem 2312 may provide a coupler or socket for attaching an external memory module (e.g., a memory stick, a memory card, a Flash memory card, etc.) to output device 108. As another example, network interface subsystem 2312 may provide a cradle for receiving a PDA (e.g., a Palm™ device).

Processor 2302 performs or controls the overall functioning of output device 108. For example, processor 2302 may execute a program that controls the functions of the various subsystems of output device 108.

Storage subsystem 2306 may be configured to store the basic programming and data constructs that provide the functionality of output device 108. For example, according to an embodiment of the present invention, software modules and control programs implementing the functionality of output device 108 may be stored in storage subsystem 2306. Processor 2302 may execute these software modules. Storage subsystem 2306 may also provide a repository or database for storing information according to the teachings of the present invention. For example, as described below, the multimedia documents corresponding to multimedia paper documents generated by output device 108 may be stored in storage subsystem 2306.

Print subsystem 2310 is configured to generate a multimedia paper document 2316 based upon a printable representation for a multimedia document. Print subsystem 2310 may also print or generate other paper documents.

Output device 108 may be embodied in various forms including a printer, a copier, a facsimile machine, a multi-function device, or any other device that is capable of producing multimedia paper documents.

Figure 24:
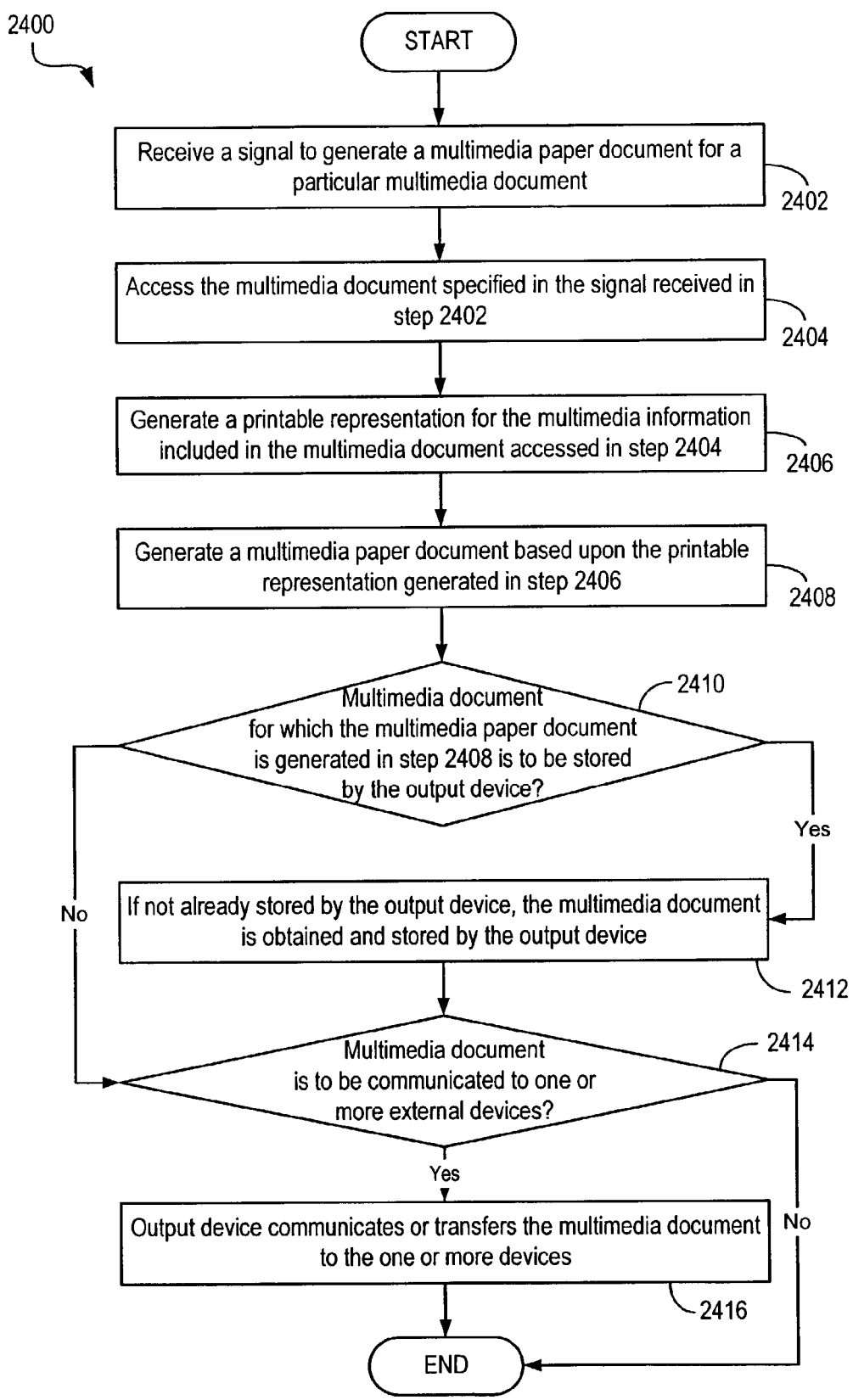
FIG. 24 is a simplified high-level flowchart depicting a method performed by an output device to generate a multimedia paper document according to an embodiment of the present invention.

FIG. 24 is a simplified high-level flowchart 2400 depicting a method performed by an output device to generate a multimedia paper document according to an embodiment of the present invention. The processing depicted in FIG. 24 may be performed by software modules executing on output device 108, by hardware modules coupled to output device 108, or combinations thereof. The processing depicted in FIG. 24 is merely illustrative of an embodiment incorporating the present invention and does not limit the scope of the invention as recited in the claims. One of ordinary skill in the art would recognize other variations, modifications, and alternatives.

As depicted in FIG. 24, processing is initiated when output device 108 receives a signal to generate a multimedia paper document for a particular multimedia document (step 2402). The signal received in step 2402 may be generated in response to a request to generate a multimedia paper document for the particular multimedia document. According to an embodiment of the present invention, a user may configure the request via user interface subsystem 2308 of output device 108. As described above, output device 108 may display various user interfaces (e.g., interfaces depicted in FIGS. 2A and 2B) that allow a user to select a multimedia document for which a multimedia paper document is to be generated. The signal may also be received from another system coupled to output device 108 or from communication network 110.

Output device 108 then accesses the multimedia document specified in the signal received in step 2402 (step 2404). According to an embodiment of the present invention, the multimedia document may be stored by output device 108. In other embodiments, output device 108 may access the multimedia document from a memory location accessible to output device 108. For example, the multimedia document specified in the signal received in step 2402 may be stored on a disk that is provided to output device 108, may be stored on a device coupled to output device 108, and the like. In step 2404 output device 108 is configured to access the particular multimedia document from its storage location.

Output device 108 then generates a printable representation for the multimedia information included in the multimedia document accessed in step 2404 (step 2406). The printable representation may be generated according to the various techniques described above. Output device 108 then uses the printable representation generated in step 2406 to generate a multimedia paper document (step 2408). According to an embodiment of the present invention, the multimedia paper document is generated by printing the printable representation on a paper medium.

According to an embodiment of the present invention, output device 108 may be configured to store the multimedia document for which the multimedia paper document is generated. In this embodiment, output device 108 determines if the multimedia document for which the multimedia paper document is generated in step 2408 is to be stored by output device 108 (step 2410). According to an embodiment of the present invention, the output device may be configured to always store multimedia documents corresponding to multimedia paper documents generated by the output device. According to another embodiment of the present invention, the output device may be configured to store a multimedia document corresponding to a multimedia paper document generated by the output device if so indicated by the user.

If it is determined in step 2410 that the multimedia document corresponding to the multimedia paper document generated in step 2408 is to be stored by output device 108, and if the multimedia document is not already stored by output device 108, a copy of the multimedia document is obtained and stored by output device 108 (step 2412). The multimedia document may be stored in storage subsystem 2306 of output device 108.

Output device 108 stores the multimedia document in such a manner that its contents can be retrieved by a user of the multimedia paper document generated for the multimedia paper document. For example, as depicted in FIGS. 13A and 13B and described above, a user may use a multimedia paper document to access or retrieve portions of the multimedia document for which the multimedia paper document was generated by selecting segments or user-selectable identifiers printed on the multimedia paper document. According to an embodiment of the present invention, the multimedia document stored by output device 108 is used to facilitate a user's request for multimedia information corresponding to user-selected segments or identifiers. In this embodiment, the multimedia information corresponding to the segments or identifiers selected by the user is communicated from output device 108 to one or more devices specified by the user for receiving the multimedia information. As described above, user-specified devices for receiving the multimedia information may include a user's PDA, a data processing system specified by a user, a user's cellphone, and the like. According to an embodiment of the present invention, the device that a user uses to select identifiers or segments from a multimedia paper document is also the device specified by the user for receiving the requested multimedia information.

If it is determined in step 2410 that the multimedia document corresponding to the multimedia paper document generated in step 2408 is not to be stored by output device 108, processing continues with step 2414.

In certain embodiments, along with generating the multimedia paper document, output device 108 may also be configured to communicate the multimedia document to one or more external devices or systems. The external devices may be coupled to output device 108 via an interface provided by network interface subsystem 2312 of output device 108 or may be coupled to output device 108 via a communication link. Examples of such external devices include a memory module (e.g., a memory card, a memory stick) that may be coupled to the output device via an interface (e.g., a coupler, a socket) provided by output device 108, a PDA coupled to a cradle attached to the output device, a disk inserted in output device 108, a data processing system coupled to output device 108 via a communication link (e.g., a wireless communication link, a wired link), and the like.

Output device 108 determines if the multimedia document is to be communicated (or transferred) to one or more external devices (step 2414). If it is determined in step 2414 that the multimedia document is to be communicated to one or more external devices, output device 108 communicates or transfers the multimedia document to the one or more external devices (step 2416). The external device to which the information is to be communicated may be specified by a user of the output device or by a user of the multimedia paper document generated by output device 108. If the external device is coupled to output device 108 via an interface provided by output device 108, then the multimedia document may be communicated to the external device via that interface. For example, if a PDA is connected to a cradle attached to output device 108, the multimedia document may be communicated to the PDA via the cradle interface. As another example, if a memory module is attached to output device 108 via an interface (e.g., coupler, socket) provided by output device 108, then the multimedia document is communicated to the memory module via the interface.

If the external device is coupled to output device 108 via a communication link, output device 108 communicates the multimedia document to the external device via the communication link. According to an embodiment of the present invention, network interface subsystem 2312 of output device 108 is configured to communicate the information via the communication link. In a preferred embodiment a wireless communication link may be used to communicate the multimedia document to the external device. As part of step 2414, the printable representation of the multimedia document generated in step 2406 may also be communicated to the external device.

Processing ends if it is determined in step 2414 that the multimedia document is not to be communicated to one or more external devices.

As described above, the multimedia information from the multimedia document stored by output device 108 can be subsequently accessed by a user. For example, output device 108 may receive a signal from a user identifying a particular user-selectable identifier selected by a user from one or more user-selectable identifiers printed on a particular multimedia paper document. Upon receiving the signal identifying the particular user-selected identifier, output device 108 is configured to determine multimedia information corresponding to the particular user-selected identifier from a multimedia document stored by output device 108 for which the particular multimedia paper document was generated. The multimedia information corresponding to the particular user-selectable identifier determined by the output device 108 is then communicated from the output device 108 to a device specified by the user for receiving the multimedia information portion. In this manner, the multimedia document stored on output device 108 provides the source for multimedia information requested by a user.

According to an embodiment of the present invention, a single device may be used by the user for selecting one or more user-selectable identifiers from a multimedia paper document and for receiving multimedia information corresponding to the user selected identifier. For example, if barcodes are used as user-selectable identifiers, a user's PDA (e.g., an iPAQ™ device provided by Compaq™, a device provided by Palm™, Inc.) may be configured as a barcode scanner for selecting one or more barcodes, and may also be configured to receive and output multimedia information corresponding to the selected barcodes.

Using the multimedia document stored by an output device to provide multimedia information to a user is preferable in several situations where it is more cost effective (possibly due to reduced distances) to communicate multimedia information from the output device rather than from the memory location (e.g., on some server) where the original multimedia document is stored. Since an output device (e.g., a printer) used by a user to print documents is more likely to be in close proximity to the user, in many situations it will be more cost effective to relay the multimedia information to the user from the output device.

For example, consider a situation where a particular multimedia document is stored on a server situated in New York. Further, consider that the New York server is coupled via a communication network (such as communication network 110 depicted in FIG. 1) to an output device 108 (e.g., a printer) situated in San Francisco. According to the processing depicted in FIG. 24, when a user situated in San Francisco (i.e., situated local to output device 108) sends a signal to the printer in San Francisco to generate a multimedia paper document for the particular multimedia document stored on the New York server, as part of the processing, a copy of the particular multimedia document is accessed from the New York server and stored on the printer situated in San Francisco according to step 2412 depicted in FIG. 24. Subsequently, when the user of the multimedia paper document requests multimedia information corresponding to one or more user-selected portions of the multimedia paper document, the multimedia information corresponding to the user-selected portions of the multimedia paper document are communicated to the user (e.g., to a device specified by the user to receive the multimedia information) from the printer situated in San Francisco rather than from the server situated in New York. This provides a cost effective and efficient way for providing multimedia information to the user. In this situation, this may be the only way to provide the requested multimedia information to the user as it may not be possible to communicate the requested multimedia information from New York to the user in San Francisco. Thus, the multimedia information is made accessible to the user by storing it in on a printer that is situated local to the user.

Figure 25:
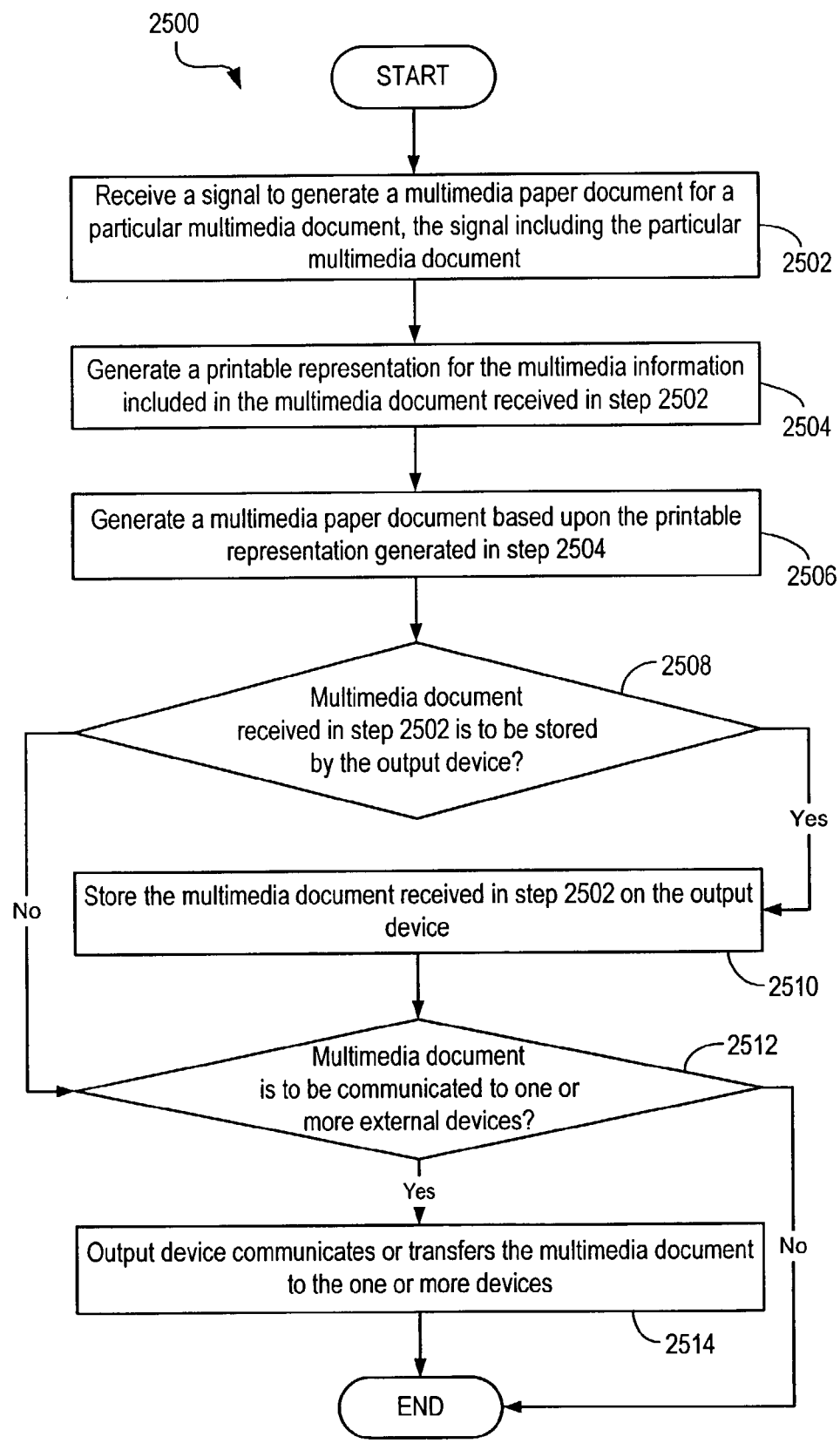
FIG. 25 is a simplified high-level flowchart depicting a method performed by an output device to generate a multimedia paper document according to an embodiment of the present invention.

FIG. 25 is a simplified high-level flowchart 2500 depicting another method performed by an output device to generate a multimedia paper document according to an embodiment of the present invention. The processing depicted in FIG. 25 may be performed by software modules executing on output device 108, by hardware modules coupled to output device 108, or combinations thereof. The processing depicted in FIG. 25 is merely illustrative of an embodiment incorporating the present invention and does not limit the scope of the invention as recited in the claims. One of ordinary skill in the art would recognize other variations, modifications, and alternatives.

As depicted in FIG. 25, processing is initiated when output device 108 receives a signal to generate a multimedia paper document for a particular multimedia document, the signal comprising the multimedia document for which the multimedia paper document is to be generated (step 2502). The signal received in step 2502 may be generated in response to a request to generate a multimedia paper document for the particular multimedia document. According to an embodiment of the present invention, a user may configure the request via user interface subsystem 2308 of output device 108. As described above, output device 108 may display various user interfaces (e.g., interfaces depicted in FIGS. 2A and 2B) that allow a user to select a multimedia document for which a multimedia paper document is to be generated. The signal may also be received from another system coupled to output device 108 or from communication network 110.

Output device 108 then generates a printable representation for the multimedia information included in the multimedia document received in step 2502 (step 2504). The printable representation may be generated according to the various techniques described above. Output device 108 then generates a multimedia paper document based upon the printable representation generated in step 2504 (step 2506). According to an embodiment of the present invention, the multimedia paper document is generated by printing the printable representation on a paper medium.

Output device 108 then determines if the multimedia document received in step 2502 is to be stored by output device 108 (step 2508). According to an embodiment of the present invention, the output device may be configured to always store multimedia documents corresponding to multimedia paper documents generated by the output device. According to another embodiment of the present invention, the output device may be configured to store a multimedia document corresponding to a multimedia paper document generated by the output device if so indicated by the user.

If it is determined in step 2508 that the multimedia document received in step 2502 is to be stored by output device 108, the multimedia document is stored by output device 108 (step 2510). The multimedia document may be stored in storage subsystem 2306 of output device 108. The multimedia document is stored in such a manner that its contents can be retrieved by a user of the multimedia paper document generated for the multimedia paper document. If it is determined in step 2508 that the multimedia document received in step 2502 is not to be stored by output device 108, processing continues with step 2512.

Output device 108 determines if the multimedia document is to be communicated (or transferred) to one or more external devices (step 2512). If it is determined in step 2512 that the multimedia document is to be communicated to one or more external devices, output device 108 communicates or transfers the multimedia document to the one or more external devices (step 2514). The external device to which the information is to be communicated may be specified by a user of output device 108 or by a user of the multimedia paper document generated by output device 108.

If the external device is coupled to output device 108 via an interface provided by output device 108, then the multimedia document may be communicated via that interface. For example, if a PDA is connected to a cradle attached to output device 108, the multimedia document may be communicated to the PDA via the cradle interface. As another example, if a memory module is attached to output device 108 via an interface (e.g., coupler, socket) provided by output device 108, then the multimedia document is communicated to the memory module via the interface.

If the device is coupled to output device 108 via a communication link, output device 108 communicates the multimedia document to the device via the communication link. According to an embodiment of the present invention, network interface subsystem 2312 of output device 108 is configured to communicate the information to the external device via the communication link. In a preferred embodiment a wireless communication link may be used to communicate the multimedia document to the external device. As part of step 2514, the printable representation of the multimedia document generated in step 2504 may also be communicated to the external device.

Processing ends if it is determined in step 2512 that the multimedia document is not to be communicated to one or more devices.

As described above, the multimedia information from the multimedia document stored by output device 108 can be subsequently accessed by a user.

Figure 26:
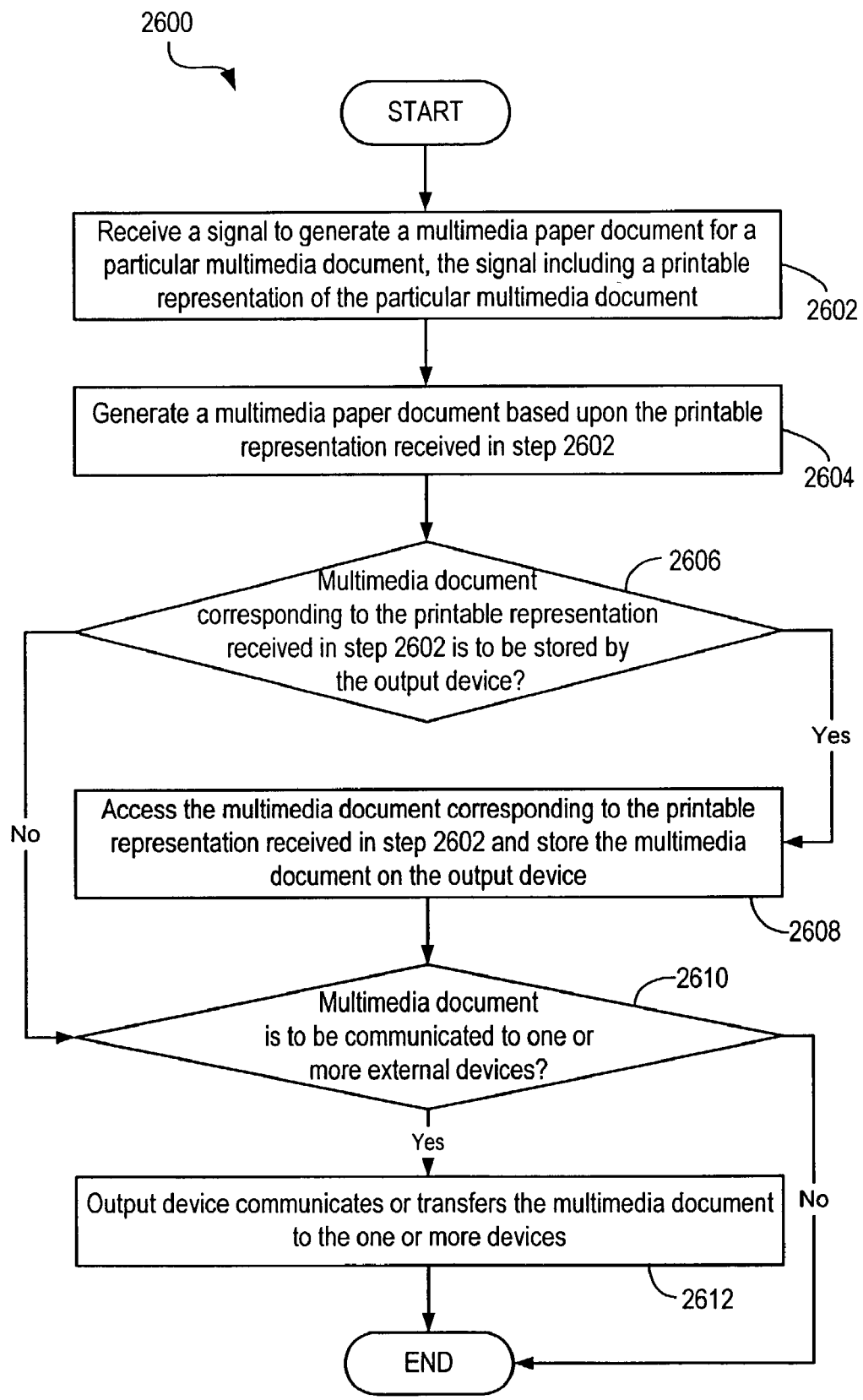
FIG. 26 is a simplified high-level flowchart depicting a method performed by an output device to generate a multimedia paper document according to an embodiment of the present invention.

FIG. 26 is a simplified high-level flowchart 2600 depicting another method performed by an output device to generate a multimedia paper document according to an embodiment of the present invention. The processing depicted in FIG. 26 may be performed by software modules executing on output device 108, by hardware modules coupled to output device 108, or combinations thereof. The processing depicted in FIG. 26 is merely illustrative of an embodiment incorporating the present invention and does not limit the scope of the invention as recited in the claims. One of ordinary skill in the art would recognize other variations, modifications, and alternatives.

As depicted in FIG. 26, processing is initiated when output device 108 receives a signal to generate a multimedia paper document for a particular multimedia document, the signal comprising a printable representation of the particular multimedia document (step 2602). According to an embodiment of the present invention, the signal may be received from MIPSS 104 that has performed the processing to generate the printable representation.

The printable representation received in step 2602 is then used to generate a multimedia paper document (step 2604). According to an embodiment of the present invention, the multimedia paper document is generated by printing the printable representation received in step 2602 on a paper medium.

Output device 108 then determines if the particular multimedia document corresponding to the printable representation received in step 2602 is to be stored by output device 108 (step 2606). According to an embodiment of the present invention, the output device may be configured to always store multimedia documents corresponding to multimedia paper documents generated by the output device. According to another embodiment of the present invention, the output device may be configured to store a multimedia document corresponding to a multimedia paper document generated by the output device if so indicated by the user.

If it is determined in step 2606 that the particular multimedia document corresponding to the printable representation received in step 2602 is to be stored by output device 108, the multimedia document corresponding to the printable representation is accessed and a copy of the document is stored by output device 108 (step 2608). The multimedia document may be stored in storage subsystem 2306 of output device 108. The multimedia document is stored in such a manner that its contents can be retrieved by a user of the multimedia paper document generated for the multimedia paper document. If it is determined in step 2606 that the multimedia document is not to be stored by output device 108, processing continues with step 2610.

Output device 108 then determines if the multimedia document is to be communicated (or transferred) to one or more external devices (step 2610). If it is determined in step 2610 that the multimedia document is to be communicated to one or more external devices, output device 108 communicates or transfers the multimedia document to the one or more external devices (step 2612). The external device to which the information is to be communicated may be specified by a user of output device 108 or by a user of the multimedia paper document generated by output device 108.

If the external device is coupled to output device 108 via an interface provided by output device 108, then the multimedia document may be communicated to the external device via that interface. For example, if a user PDA is connected to a cradle attached to output device 108, the multimedia document may be communicated to the PDA via the cradle interface. As another example, if a memory module is attached to output device 108 via an interface (e.g., coupler, socket) provided by output device 108, then the multimedia document is communicated to the memory module via the interface.

If the external device is coupled to output device 108 via a communication link, output device 108 communicates the multimedia document to the external device via the communication link. According to an embodiment of the present invention, network interface subsystem 2312 of output device 108 is configured to communicate the information to the external device via the communication link. In a preferred embodiment a wireless communication link may be used to communicate the multimedia document to the external device. As part of step 2612, the printable representation of the multimedia document received in step 2602 may also be communicated to the external device.

Processing ends if it is determined in step 2610 that the multimedia document is not to be communicated to any external device.

As described above, the multimedia information from the multimedia document stored by output device 108 can be subsequently accessed by a user.

FIGS. 27A–27E depict ways in which a multimedia document output device may be coupled to multimedia information sources of various types according to embodiments of the present invention. It should be apparent that the configurations depicted in FIGS. 27A–27E are merely illustrative of various embodiments incorporating the present invention and do not limit the scope of the invention as recited in the claims. One of ordinary skill in the art would recognize other variations, modifications, and alternatives.

Figure 27A:
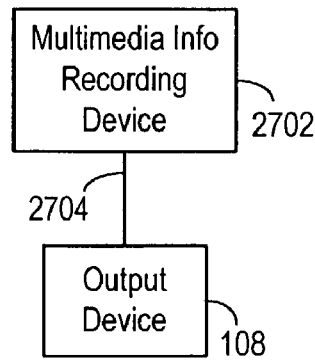
FIGS. 27A–27E depict ways in which a multimedia document output device may be coupled to multimedia information sources of different types according to various embodiments of the present invention.

In FIG. 27A, output device 108 (such as a printer) is coupled to a multimedia information recording device 2702 via link 2704. Examples of multimedia information recording devices 2702 include digital video recorders (DVRs), digital video disc (DVD) players, video players, and the like. A DVR is a device that is capable of recording TV broadcasts for replay at a later time. A DVR is generally a data processing system that includes a storage subsystem (e.g., a hard drive) for storing the recorded TV broadcasts. The DVR is capable of recording one or more TV broadcasts during time intervals that may be specified by the user. DVRs generally also provide a user interface for navigating and controlling playback of the recorded TV broadcast information. During playback of the recorded TV broadcast, the user can pause, fast forward, rewind, or perform other operations on the recorded TV broadcast information similar to operations that can be performed by a video cassette recorder (VCR) system. According to an embodiment of the present invention, functions provided by a DVR can be controlled with a TV remote control device. Examples of DVRs include devices provided by TiVo™ Inc., ReplayTV™ devices, set-top boxes, and the like.

Link 2704 may be a hardwire link, optical link, wireless communications link, wave propagation link, various types of video links (e.g., S-video link, composite video link, component video links, etc.) or any other mechanism for communication of multimedia information.

In the embodiment depicted in FIG. 27A, multimedia information recording device 2702 is configured to record multimedia information. Multimedia information recording device 2702 may also be configured to perform processing to generate a printable representation of the multimedia information. In this embodiment, multimedia information recording device 2702 may communicate the printable representation to output device 108. Output device 108 may then generate a multimedia paper document based upon the printable representation received from multimedia information recording device 2702.

In alternative embodiments, the processing to generate the printable representation may be performed by output device 108. In this embodiment, multimedia information recording device 2702 is configured to communicate a multimedia document to output device 108. The multimedia information communicated to output device 108 may be pre-recorded by multimedia information recording device 2702 or may be recorded in real time by multimedia information recording device 2702. Output device 108 generates a printable representation for the multimedia document and then generates a multimedia paper document based upon the generated printable representation.

According to an embodiment of the present invention, a single device (e.g., a barcode scanner, a remote control) may be provided that allows a user to control the operation of multimedia information recording device 2702 and output device 108. The single device may also be configured to allow a user to select one or more user-selectable identifiers from a multimedia paper document. Accordingly, the single device may be used to control playback of the recorded multimedia information and also to generate a multimedia paper document for the multimedia information.

In the embodiment depicted in FIG. 27A, output device 108 may or may not store the multimedia information for which a multimedia paper document is generated by output device 108. In the embodiment where output device 108 stores the multimedia information, the multimedia information stored on output device 108 may be used to satisfy user's requests for multimedia information corresponding to an multimedia paper document. If the multimedia information is not stored by output device 108, then in response to a user request for multimedia information corresponding to a multimedia paper document, output device 108 may send a signal to multimedia information recording device 2702 requesting multimedia information corresponding to the user request. The multimedia information received by output device 108 from multimedia information recording device 2702 in response to the request communicated to multimedia information recording device 2702 may then be communicated by output device 108 in response to the user's request.

Figure 27B:
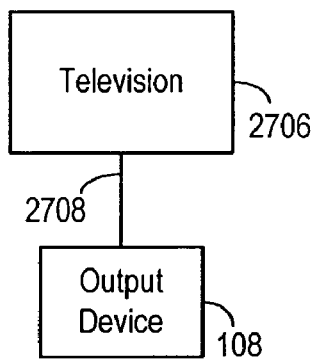

In FIG. 27B, output device 108 (such as a printer) is coupled to a television 2706 via link 2708. In this embodiment, output device 108 is configured to generate printable representations for television broadcast signals received from television 2706. Output device 108 may generate printable representations for television signals that are received from television 2706 and recorded by output device 108 or for signals received by output device 108 from television 2706 in real time. Output device 108 is also configured to generate multimedia paper documents based upon the printable representations.

Link 2704 may be a hardwire link, optical link, wireless communications link, wave propagation link, various video links (e.g., a S-video link, a composite video link, component video links, etc.) or any other mechanism for communication of multimedia information from television 2706 to output device 108.

According to an embodiment of the present invention, a television remote control device that is used to control operations of television 2706 may also be used to control the functioning of output device 108. Accordingly, the television remote control device may be used to generate a multimedia paper document for the television multimedia information. The television remote control device may also be configured to allow a user to select one or more user-selectable identifiers from a multimedia paper document.

Figure 27C:
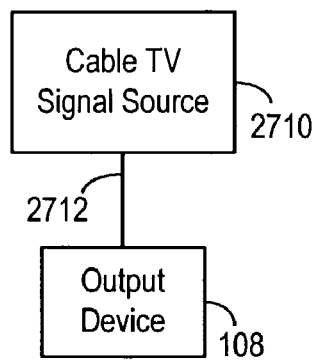

In FIG. 27C, output device 108 (such as a printer) is coupled to a cable television signal source 2710 via link 2712. In this embodiment, output device 108 is configured to generate printable representations for multimedia information signals received from cable source 2710. Output device 108 may generate printable representations for cable signals that are received from cable source 2710 and recorded by output device 108 or for signals received by output device 108 in real time. Output device 108 may also configured to generate multimedia paper documents based upon the printable representations.

Link 2712 may be a hardwire link such as a coaxial cable, optical link, wireless communications link, wave propagation link, various video links (e.g., S-video link, composite video link, component video links, etc.) or any other mechanism for communication of multimedia information from cable television signal source 2710 to output device 108.

According to an embodiment of the present invention, a cable remote control device that is used to control operations of cable television may also be used to control the functioning of output device 108. Accordingly, the cable remote control device may be used to generate a multimedia paper document for the cable television multimedia information. The cable remote control device may also be configured to allow a user to select one or more user-selectable identifiers from a multimedia paper document.

Figure 27D:
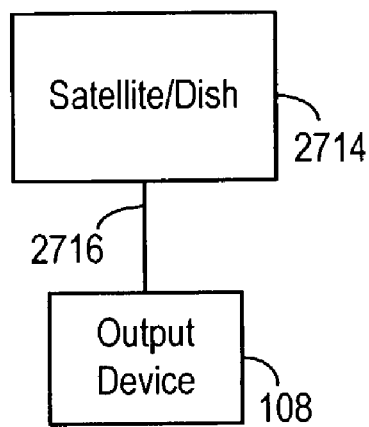

In FIG. 27D, output device 108 (such as a printer) is coupled to a satellite or dish 2714 via link 2716. Examples of satellite or dish equipment include a satellite dish and receiver provided by Dish Networks™, Inc., satellite and dish equipment provided by DIRECTV™, Inc., and the like. In this embodiment, output device 108 may receive multimedia information and/or printable representation of multimedia information from satellite or dish 2714 via link 2716. Link 2716 may be a hardwire link, optical link, wireless communications link, wave propagation link, or any other mechanism for communication of multimedia information from satellite or dish 2714 to output device 108.

Output device 108 may be configured to generate printable representations for multimedia information signals received from satellite or dish 2714. Printable representations generated by output device 108 or printable representations received by output device 108 from satellite or dish 2714 may be printed on a paper medium by output device 108 to generate multimedia paper documents.

Figure 27E:
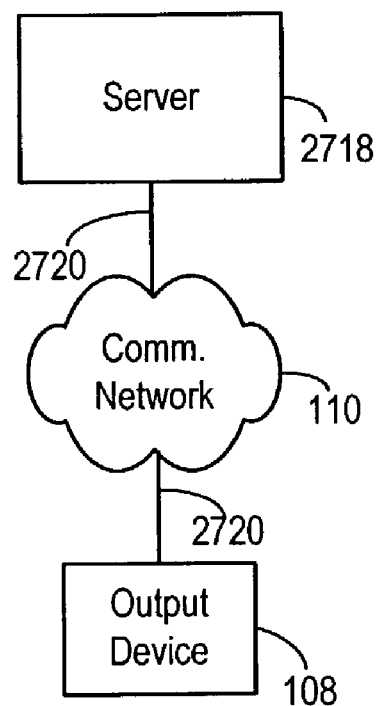

In FIG. 27E, output device 108 (such as a printer) is coupled to a server 2718 via communication network 110 and communication links 2720. Server 2718 (e.g., a network server) may store electronic multimedia documents for which multimedia paper documents are to be generated. According to an embodiment of the present invention, server 2718 is configured to generate printable representations for the multimedia documents stored by server 2718. The printable representations are then communicated to output device 108 that generates multimedia paper documents based upon the printable representations.

In alternative embodiments, server 2718 is configured to communicate one or more multimedia information documents to output device 108. In this embodiment, output device 108 generates printable representation for the multimedia documents received from server 2718 and generates multimedia paper documents based upon the generated printable representations.

Communication network 110 may itself be comprised of many interconnected computer systems and communication links. While in one embodiment, communication network 110 is the Internet, in other embodiments, communication network 110 may be any suitable communication network including a local area network (LAN), a wide area network (WAN), a wireless network, an intranet, a private network, a public network, a switched network, and the like. Communication links 2720 may be hardwire links, optical links, satellite or other wireless communications links, wave propagation links, or any other mechanisms for communication of information. Various communication protocols may be used to facilitate communication of information from server 2718 to output device 108. These communication protocols may include TCP/IP, HTTP protocols, extensible markup language (XML), wireless application protocol (WAP), protocols under development by industry standard organizations, vendor-specific protocols, customized protocols, and others.

For the various configurations described above, different types of user interfaces may be provided to facilitate generation of multimedia paper documents. Examples of such user interfaces are depicted in FIGS. 2A and 2B and described above. The user interfaces allow a user to select a multimedia document for generation of multimedia paper document. The user interfaces may also allow the user to preview the content of a user-selected multimedia document. For example, a user interface provided by an output device 108 may allow a user to playback contents of a user-selected multimedia document.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of generating, using an output device, a multimedia paper document for a multimedia document storing multimedia information, the method comprising:
    receiving, at the output device, a first signal comprising a printable representation of multimedia information stored by the multimedia document to generate a multimedia paper document for the multimedia document;
    generating, according to the printable representation included in the first signal, the multimedia paper document for the multimedia document using the output device;
    storing the multimedia document corresponding to the printable representation included in the first signal on the output device;
    receiving, at the output device, a second signal from a user device requesting a first portion of the multimedia document, the second signal comprising information indicating selection of a first user-selectable identifier from one or more user-selectable identifiers printed on the multimedia paper document; and
    responsive to the second signal, communicating the first portion of the multimedia document stored by the output device from the output device to the user device;
    wherein communicating the first portion of multimedia document comprises:
        identifying a portion of the multimedia document stored by the output device corresponding to the first user-selectable identifier, and
        communicating the portion of the multimedia document corresponding to the first user-selectable identifier from the output device to the user device.

2. The method of claim 1 wherein generating, according to the printable representation included in the first signal, the multimedia paper document for the multimedia document using the output device comprises:
    accessing the printable representation included in the first signal; and
    printing the printable representation of the multimedia information included in the first signal on a paper medium to generate the multimedia paper document.

3. The method of claim 1 wherein:
    the first signal received by the output device further comprises the multimedia document for which the multimedia paper document is to be generated;
    generating, according to the printable representation included in the first signal, the multimedia paper document for the multimedia document using the output device comprises:
        printing the printable representation of the multimedia information on a paper medium to generate the multimedia paper document; and
    storing the multimedia document corresponding to the printable representation on the output device comprises storing the multimedia document included in the first signal on the output device.

4. The method of claim 1 further comprising communicating the multimedia document from the output device to a first external device.

5. The method of claim 4 wherein:
    the first external device is coupled to the output device via a first interface provided by the output device; and
    communicating the multimedia document from the output device to the first external device comprises communicating the multimedia document from the output device to the first external device via the first interface.

6. The method of claim 4 wherein:
    the first external device is coupled to the output device via a first communication link; and
    communicating the multimedia document from the output device to the first external device comprises communicating the multimedia document from the output device to the first external device via the first communication link.

7. The method of claim 4 wherein the first external device is a memory module.

8. The method of claim 4 wherein the first external device is a data processing system.

9. The method of claim 1 wherein the one or more user-selectable identifiers include one or more barcodes printed on the multimedia paper document.

10. The method of claim 1 further comprising:
    outputting a portion of multimedia information stored by the multimedia document using the output device.

11. In a system comprising a multimedia information source coupled to an output device, a method of generating a multimedia paper document for multimedia information, the method comprising:
    receiving, at the output device, multimedia information from the multimedia information source;
    generating, at the output device, a printable representation of the multimedia information received from the multimedia information source;
    printing the printable representation of the multimedia information on a paper medium to generate the multimedia paper document;
    storing the multimedia information, corresponding to the printable representation, received from the multimedia information source on the output device;
    receiving, at the output device, a signal from a user device requesting a first portion of the multimedia information, the signal indicating selection of a user-selectable identifier from one or more user-selectable identifiers printed on the multimedia paper document; and
    responsive to the signal, identifying a portion of the multimedia information stored by the output device corresponding to the user-selectable identifier and communicating the portion of the multimedia information corresponding to the user-selectable identifier from the output device to the user device.

12. The method of claim 11 wherein the multimedia information source is at least one of a multimedia information recording device, a television, a cable television signal source, a satellite receiver device, a dish device, and a server.

13. The method of claim 11 wherein a single controller is used to control operations of the multimedia information source and the output device.

14. In a system comprising a multimedia information source coupled to an output device, a method of generating a multimedia paper document for multimedia information, the method comprising:
   receiving, at the output device, a printable representation of the multimedia information from the multimedia information source;
   generating, at the output device, the multimedia paper document for the multimedia information based upon the printable representation received by the output device from the multimedia information source;
   storing the multimedia information, corresponding to the printable representation received from the multimedia information source, on the output device;
   receiving, at the output device, a first signal from a user device requesting a first portion of the multimedia information, the first signal comprising information indicating selection of a user-selectable identifier from one or more user-selectable identifiers printed on the multimedia paper document; and
   responsive to the first signal, communicating the first portion of the multimedia information from the output device to the user device;
   wherein communicating the first portion of multimedia information comprises:
      identifying a portion of the multimedia information stored by the output device corresponding to the user-selectable identifier; and
      communicating the portion of the multimedia information corresponding to the user-selectable identifier from the output device to the user device.

15. The method of claim 14 wherein:
   generating the multimedia paper document comprises:
      receiving, at the output device, the multimedia information corresponding to the printable representation from the multimedia information source; and
      storing the multimedia information on the output device in response to the receiving of the multimedia information; and
   communicating the first portion of the multimedia information from the output device to the user device comprises communicating the first portion from the multimedia information stored by the output device.

16. The method of claim 14 wherein communicating the first portion of the multimedia information from the output device to the user device comprises:
   responsive to the first signal, communicating a second signal from the output device to the multimedia information source requesting the first portion of the multimedia information from the multimedia information source;
   receiving, at the output device, the first portion of the multimedia information from the multimedia information source; and
   communicating the first portion of the multimedia information received from the multimedia information source from the output device to the user device.

17. An output device for generating a multimedia paper document for a multimedia document storing multimedia information, the output device comprising:
   a communication module configured to receive a first signal comprising a printable representation of multimedia information stored by the multimedia document to generate a multimedia paper document for the multimedia document;
   a processor;
   a memory coupled to the processor, the memory configured to store a plurality of code modules for execution by the processor, the plurality of code modules comprising a code module for accessing the printable representation of multimedia information included in the first signal, a code module for generating, according to the printable representation of multimedia information included in the first signal, the multimedia paper document for the multimedia document, the memory configured to store the multimedia document corresponding to the printable representation of the multimedia information included in the first signal; and
   a print module configured to print the printable representation of multimedia information on a paper medium to generate the multimedia paper document.

18. The output device of claim 17:
   wherein the first signal further includes the multimedia document for which the multimedia paper document is to be generated; and
   wherein the memory is configured to store the multimedia document, corresponding to the printable representation, included in the first signal.

19. The output device of claim 17 wherein the communication module is further configured to communicate the multimedia document to a first external device.

20. The output device of claim 19 wherein:
   the first external device is coupled to the output device via a first interface; and
   the communication module is configured to communicate the multimedia document to the first external device comprises via the first interface.

21. The output device of claim 19 wherein:
   the first external device is coupled to the output device via a first communication link; and
   the communication module is configured to communicate the multimedia document to the first external device via the first communication link.

22. The output device of claim 19 wherein the first external device is a memory module.

23. The output device of claim 19 wherein the first external device is a data processing system.

24. The output device of claim 17 wherein:
   the communication module is configured to receive a second signal from a first user device, the second signal comprising information indicating selection of a first user-selectable identifier from one or more user-selectable identifiers printed on the multimedia paper document;
   the plurality of code modules stored in the memory comprises a code module for identifying a portion of the multimedia document stored in the memory corresponding to the first user-selectable identifier; and
   the communication module is configured to communicate the portion of the multimedia document corresponding to the first user-selectable identifier to the first user device.

25. The output device of claim 24 wherein the one or more user-selectable identifiers include one or more barcodes printed on the multimedia paper document.

26. The output device of claim 17 further comprising:
   an output module configured to output a portion of multimedia information stored by the multimedia document.

27. A system for generating a multimedia paper document for multimedia information, the system comprising:
a multimedia information source; and
an output device coupled to the multimedia information source, wherein the output device is configured to:
receive multimedia information from the multimedia information source;
generate printable representation of the multimedia information received from the multimedia information source;
print the printable representation of the multimedia information on a paper medium to generate the multimedia paper document;
store the multimedia information, corresponding to the printable representation, received from the multimedia information source on the output device;
receive, at the output device, a signal from a user device requesting a first portion of the multimedia information, the signal indicating selection of a user-selectable identifier from one or more user-selectable identifiers printed on the multimedia paper document;
identify, responsive to the signal, a portion of the multimedia information stored by the output device corresponding to the user-selectable identifier; and
communicate the portion of the multimedia information corresponding to the user-selectable identifier from the output device to the user device.

28. The system of claim 27 wherein the multimedia information source is at least one of a multimedia information recording device, a television, a cable television signal source, a satellite receiver device, a dish device, and a server.

29. The system of claim 27 wherein a single controller is used to control operations of the multimedia information source and the output device.

30. A system for generating a multimedia paper document for multimedia information, the system comprising:
a multimedia information source; and
an output device coupled to the multimedia information source, wherein the output device is configured to:
receive a printable representation of the multimedia information from the multimedia information source for which the multimedia paper document is to be generated;
generate the multimedia paper document for the multimedia information based upon the printable representation received from the multimedia information source;
store the multimedia information, corresponding to the printable representation, received from the multimedia information source on the output device;
receive a first signal from a user device requesting a portion of the multimedia information, the first signal comprising information indicating selection of a user-selectable identifier from one or more user-selectable identifiers printed on the multimedia paper document;
identify a portion of the multimedia information stored by the output device corresponding to the user-selectable identifier; and
responsive to the first signal, communicate the portion of the multimedia information corresponding to the user-selectable identifier from the output device to the user device.

31. The system of claim 30 wherein the output device is configured to:
receive the multimedia information, corresponding to the printable representation, from the multimedia information source;
communicate the portion of multimedia information from the multimedia information stored by the output device.

32. The system of claim 30 wherein the output device is configured to:
responsive to the first signal, communicate a second signal to the multimedia information source requesting the portion of the multimedia information from the multimedia information source;
receive the portion of the multimedia information from the multimedia information source; and
communicate the portion of the multimedia information received from the multimedia information source to the user device.

33. A computer program product stored on a computer-readable storage medium for generating a multimedia paper document for a multimedia document storing multimedia information, the computer program product comprising:
code for receiving, at an output device, a first signal comprising a printable representation of multimedia information stored by the document to generate a ultimedia paper document for the multimedia document, wherein the first signal further comprises the multimedia document for which paper document is to be generated;
code for generating, at the output device, the multimedia paper document for the multimedia document according to the printable representation included in the first signal, the code for generating the multimedia paper document including code for printing the printable representation of the multimedia information on a paper medium to generate the multimedia paper document;
code for storing the multimedia document, included in the first signal, corresponding to the printable representation include in the first signal on the output device.

34. The computer program product of claim 33 wherein the code for generating the multimedia paper document for the multimedia document at the output device according to the printable representation included in the first signal comprises:
code for accessing the printable representation included in the first signal;
code for printing the printable representation of the multimedia information on a paper medium to generate the multimedia paper document.

35. The computer program product of claim 33 further comprising code for communicating the multimedia document from the output device to a first external device.

36. The computer program product of claim 35 wherein:
the first external device is coupled to the output device via a first interface provided by the output device; and
the code for communicating the multimedia document from the output device to the first external device comprises code for communicating the multimedia document from the output device to the first external device via the first interface.

37. The computer program product of claim 35 wherein:
the first external device is coupled to the output device via a first communication link; and
the code for communicating the multimedia document from the output device to the first external device comprises code for communicating the multimedia document from the output device to the first external device via the first communication link.

38. The computer program product of claim 35 wherein the first external device is a memory module.

39. The computer program product of claim 35 wherein the first external device is a data processing system.

40. The computer program product of claim 33 further comprising:
- code for receiving, at the output device, a second signal from a first user device requesting a first portion of the multimedia document;
- code responsive to the second signal for communicating the first portion of the multimedia document stored by the output device from the output device to the first user device.

41. The computer program product of claim 40 wherein:
- the code for receiving the second signal comprises code for receiving information indicating selection of a first user-selectable identifier from one or more user-selectable identifiers printed on the multimedia paper document; and
- the code for communicating the first portion of multimedia document comprises:
  - code for identifying a portion of the multimedia document stored by the output device corresponding to the first user-selectable identifier; and
  - code for communicating the portion of the multimedia document corresponding to the first user-selectable identifier from the output device to the first user device.

42. The computer program product of claim 41 wherein the one or more user-selectable identifiers include one or more barcodes printed on the multimedia paper document.

43. The computer program product of claim 33 further comprising:
- code for outputting a portion of multimedia information stored by the multimedia document using the output device.

44. A computer program product stored on a computer-readable storage medium for generating a multimedia paper document for multimedia information, the computer program product comprising:
- code for receiving, at the output device, multimedia information from the multimedia information source;
- code for generating, at the output device, a printable representation of the multimedia information received from the multimedia information source;
- code for printing the printable representation of the multimedia information on a paper medium to generate the multimedia paper document;
- code for storing the multimedia information, corresponding to the printable representation, received from the multimedia information source on the output device;
- code for receiving, at the output device, a signal from a user device requesting a first portion of the multimedia information, the signal indicating selection of a user-selectable identifier from one or more user-selectable identifiers printed on the multimedia paper document;
- code for identifying, responsive to the signal, a portion of the multimedia information stored by the output device corresponding to the user-selectable identifier, and
- code for communicate the portion of the multimedia information corresponding to the user-selectable identifier from the output device to the user device.

45. The computer program product of claim 44 wherein the multimedia information source is at least one of a multimedia information recording device, a television, a cable television signal source, a satellite receiver device, a dish device, and a server.

46. A computer program product stored on a computer-readable storage medium for generating a multimedia paper document for multimedia information, the computer program product comprising:
- code for receiving, at the output device, a printable representation of the multimedia information from the multimedia information source for which the multimedia paper document is to be generated;
- code for generating, at the output device, the multimedia paper document for the multimedia information based upon the printable representation received by the output device from the multimedia information source;
- code for storing the multimedia information, corresponding to the printable representation, received from the multimedia information source on the output device;
- code for receiving, at the output device, a first signal from a user device requesting a first portion of the multimedia information, the first signal comprising information indicating selection of a user-selectable identifier from one or more user-selectable identifiers printed on the multimedia paper document;
- code for identifying a portion of the multimedia information stored by the output device corresponding to the user-selectable identifier; and;
- code responsive to the first signal for communicating the first portion of the multimedia information corresponding to the user-selectable identifier from the output device to the user device.

47. The computer program product of claim 46 wherein:
- the code for generating the multimedia paper document comprises:
  - code for receiving, at the output device, the multimedia information, corresponding to the printable representation, from the multimedia information source; and
- the code for communicating the first portion of the multimedia information from the output device to the user device comprises code for communicating the first portion from the multimedia information stored by the output device.

48. The computer program product of claim 46 wherein the code for communicating the first portion of the multimedia information from the output device to the user device comprises:
- code responsive to the first signal for communicating a second signal from the output device to the multimedia information source requesting the first portion of the multimedia information from the multimedia information source;
- code for receiving, at the output device, the first portion of the multimedia information from the multimedia information source; and
- code for communicating the first portion of the multimedia information received from the multimedia information source from the output device to the user device.

* * * * *